United States Patent [19]

Hosoi et al.

[11] Patent Number: 4,931,642
[45] Date of Patent: Jun. 5, 1990

[54] RADIATION IMAGE READ-OUT APPARATUS

[75] Inventors: Yuichi Hosoi; Kenji Takahashi; Satoshi Arakawa, all of Kanagawa, Japan

[73] Assignee: Fuji Photo Film Co., Ltd., Kanagawa, Japan

[21] Appl. No.: 214,795

[22] Filed: Jul. 5, 1988

Related U.S. Application Data

[63] Continuation of Ser. No. 5,998, Jan. 21, 1987, abandoned.

[30] Foreign Application Priority Data

| Jan. 21, 1986 | [JP] | Japan | 61-10753 |
| Jan. 21, 1986 | [JP] | Japan | 61-10754 |
| Jan. 22, 1986 | [JP] | Japan | 61-11657 |
| Jan. 22, 1986 | [JP] | Japan | 61-11658 |
| Jan. 22, 1986 | [JP] | Japan | 61-11659 |
| Mar. 4, 1986 | [JP] | Japan | 61-47097 |
| Mar. 4, 1986 | [JP] | Japan | 61-47098 |
| Mar. 12, 1986 | [JP] | Japan | 61-53895 |

[51] Int. Cl.$^5$ .......................... G01N 23/04
[52] U.S. Cl. ................................. 250/327.2
[58] Field of Search ................ 250/327.2, 484.1

[56] References Cited

U.S. PATENT DOCUMENTS

| 4,543,479 | 9/1985 | Kato | 250/327.2 |
| 4,661,704 | 4/1987 | de Leeuw et al. | 250/484.1 |
| 4,691,232 | 9/1987 | Lange | 358/111 |

Primary Examiner—Carolyn E. Fields
Attorney, Agent, or Firm—Sughrue, Mion, Zinn, Macpeak & Seas

[57] ABSTRACT

A radiation image read-out apparatus is constituted for exposing a recording material provided with a stimulable phosphor and carrying a radiation image stored thereon to stimulating rays which cause the recording material to emit light in proportion to the stored radiation energy, and photoelectrically detecting the emitted light to read out the radiation image. The apparatus is provided with a multi-layer optical filter whose reflectivity with respect to stimulating rays increases as the angle of incidence of stimulating rays increases. The multi-layer optical filter is disposed in the optical path of stimulating rays in the vicinity of the recording material or formed on the surface of the recording material on the stimualting ray irradiation side, thereby increasing the efficiency of utilization of stimulating rays. In one embodiment, a second multi-layer optical filter is disposed in the vicinity of or formed on the surface of the recording material on the emitted light detection side. The second filter substantially reflects stimulating rays and substantially transmits the emitted light.

49 Claims, 24 Drawing Sheets

F I G. 14
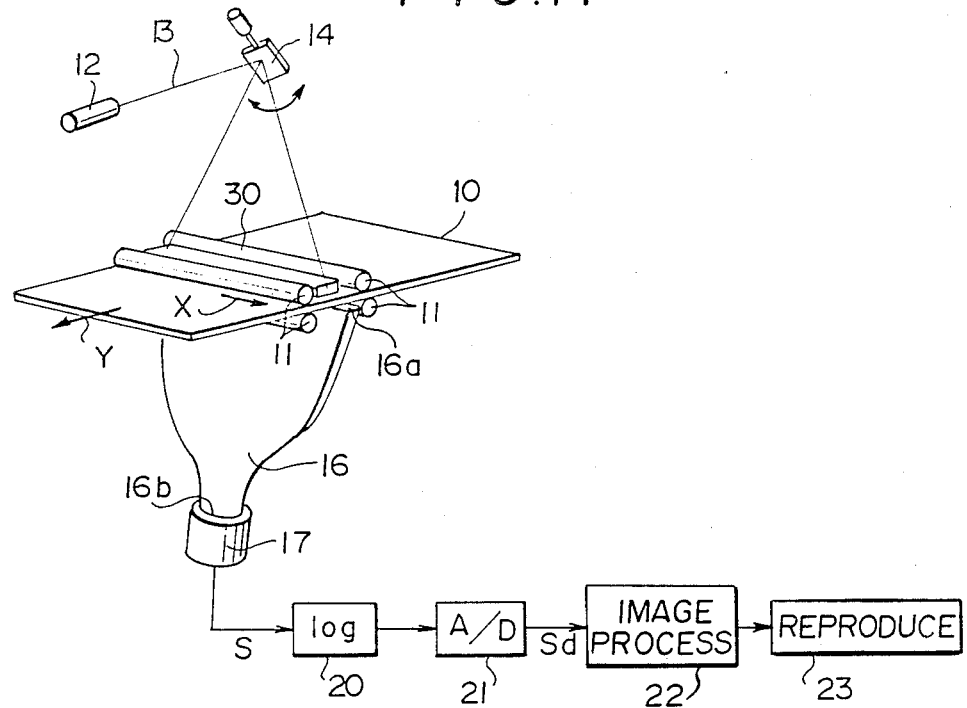
F I G. 15
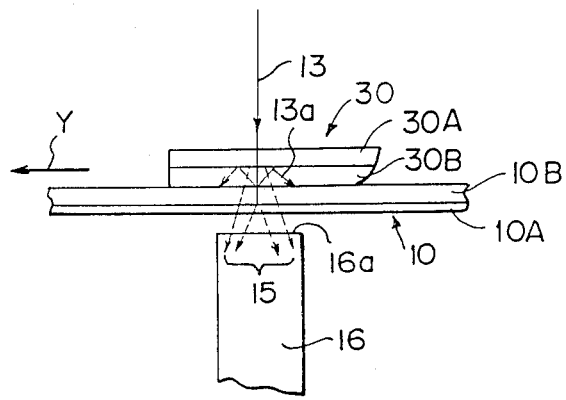

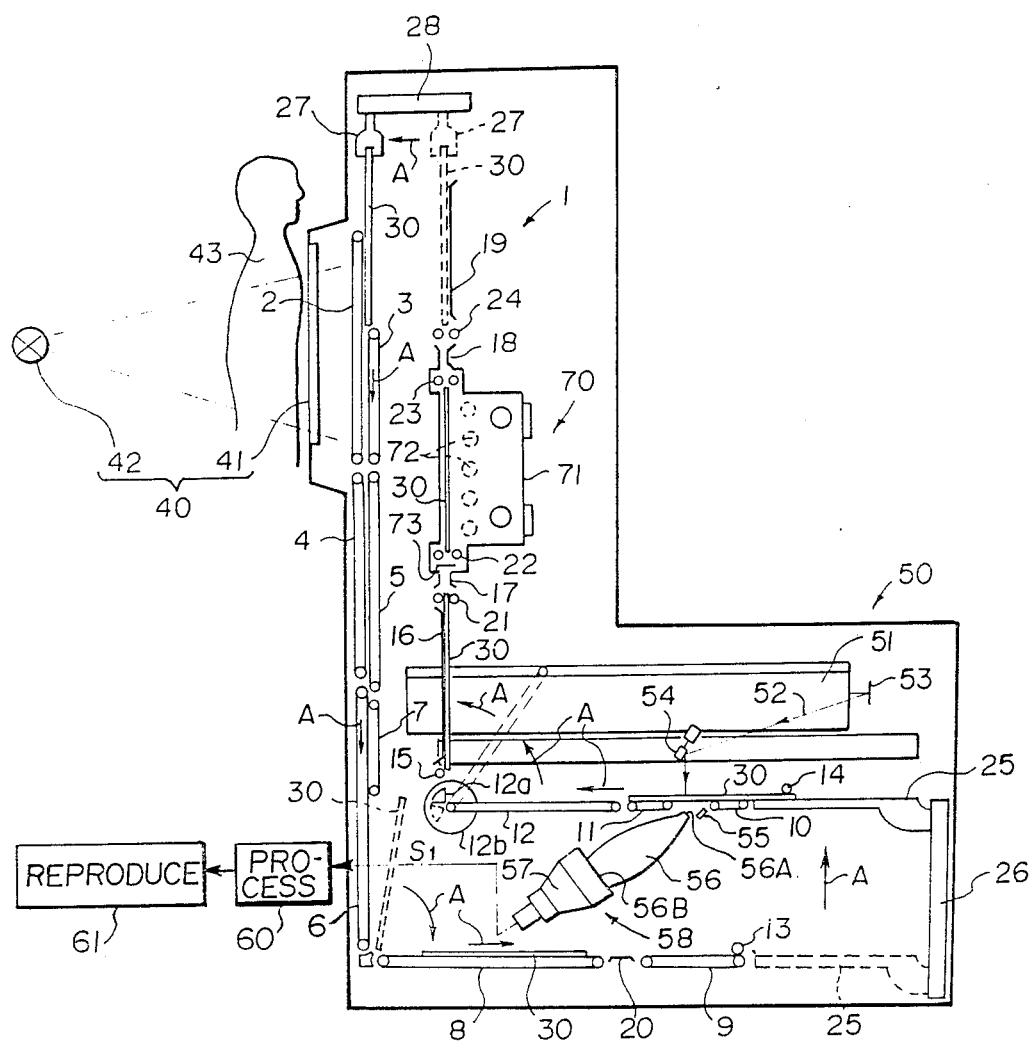
F I G. 31

F I G. 37
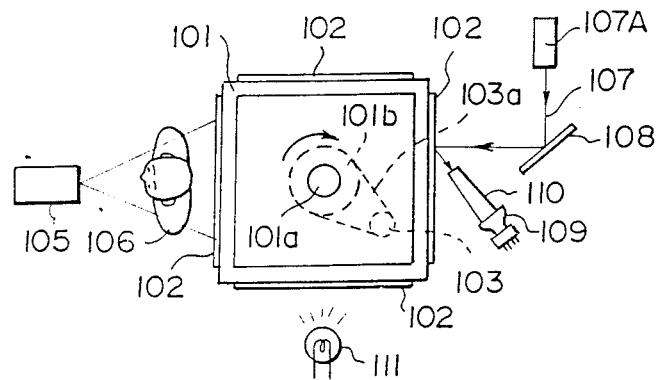
F I G. 38
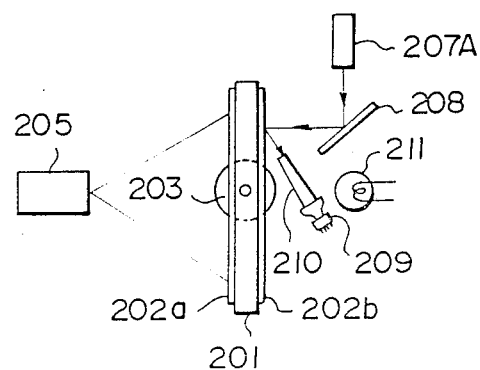

RADIATION IMAGE READ-OUT APPARATUS

This is a continuation of application Ser. No. 07/005,998, filed Jan. 21, 1987, now abandoned.

BACKGROUND OF THE INVENTION

1. Field of the Invention

This invention relates to a radiation image read-out apparatus for reading out a radiation image stored on a recording material composed of a stimulable phosphor, such as a stimulable phosphor sheet, by exposing the recording material to stimulating rays which cause it to emit light in proportion to the stored radiation energy, and photoelectrically detecting the light emitted by the recording material. This invention particularly relates to a radiation image read-out apparatus wherein the efficiency of utilizing the stimulating rays is improved by use of a multi-layer optical filter.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then exposed to stimulating rays which cause the stimulable phosphor sheet to emit light in proportion to the stored radiation energy. The light emitted by the stimulable phosphor sheet upon stimulation thereof is photoelectrically detected and converted to an electric image signal by a photodetector, and the radiation image of the object is reproduced as a visible image by use of the image signal on a recording medium such as a photographic film, a display device such as a cathode ray tube (CRT), or the like.

The radiation image recording and reproducing system using a stimulable phosphor sheet is advantageous over conventional radiography using a silver halide photographic material in that the image can be recorded over a very wide range (latitude) of radiation exposure. More specifically, since the amount of light emitted upon stimulation after the radiation energy is stored on the stimulable phosphor sheet varies over a wide range in proportion to the amount of said stored energy, it is possible to obtain an image having desirable density regardless of the amount of exposure of the stimulable phosphor sheet to the radiation, by reading out the emitted light with an appropriate read-out gain and converting it into an electric signal to reproduce a visible image on a recording medium or a display device.

In the aforesaid radiation image recording and reproducing system, read-out of the light emitted by the stimulable phosphor sheet is conducted by one of the two methods as described below. In a first read-out method, division into picture elements is effected by the scanning with stimulating rays, and the light emitted by the stimulable phosphor sheet is detected by a light receiving device having a wide light receiving face, for example, a photomultiplier. The first read-out method is realized by a radiation image read-out apparatus wherein the stimulable phosphor sheet carrying a radiation image stored thereon is two-dimensionally scanned with stimulating rays, and the light emitted by the scanned portion of the stimulable phosphor sheet is photoelectrically detected by use of a photodetector. On the other hand, in a second read-out method, division into picture elements is effected by a light receiving device such as a two-dimensional solid state image pickup device or a semiconductor line sensor, and image signals are sequentially generated by an electric circuit. The second read-out method is realized by a radiation image read-out apparatus comprising a stimulating ray source for emitting stimulating rays to the stimulable phosphor sheet carrying a radiation image stored thereon, and a photodetector constituted by a photoelectric conversion device divided into picture elements and disposed to face the stimulable phosphor sheet.

On the other hand, in the aforesaid radiation image recording and reproducing system, the stimulable phosphor sheet is used to temporarily store the radiation image in order to reproduce the final visible image therefrom on a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examinations, it is disadvantageous to load the mobile X-ray diagnostic station with a large number of stimulable phosphor sheets, and the number of the stimulable phosphor sheets which can be loaded on the mobile X-ray diagnostic station is limited. Therefore, it is desired to load the mobile X-ray diagnostic station with stimulable phosphor sheets which can be used repeatedly, once store the radiation images of the objects respectively on the stimulable phosphor sheets, transfer the electric image signals read out from the stimulable phosphor sheets to a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examination. This is very advantageous in practical use.

In order to reuse stimulable phosphor sheets as described above, the radiation energy remaining on the stimulable phosphor sheet after it is scanned with stimulating rays to read out the radiation image stored thereon should be erased by exposure to light or heat as described, for example, in U.S. Pat. No. 4,400,619 or Japanese Unexamined Patent Publication No. 56(1981)-12599. The stimulable phosphor sheet should then be used again for radiation image recording.

From the aforesaid viewpoint, the applicant proposed two types of the radiation image read-out apparatuses (i.e. radiation image recording and read-out apparatuses) as described below which comprise, built in a single unit, an image recording section for storing a radiation image of an object on a recording material composed of a stimulable phosphor, such as a stimulable phosphor sheet, an image read-out section for exposing the recording material to stimulating rays and photoelectrically reading out light emitted by the recording material in proportion to the stored radiation energy to obtain an image signal, and an erasing section for releasing residual radiation energy from the recording material before image recording is conducted on the recording material subjected to image read-out, whereby the recording material is circulated and reused in the apparatus.

One of the aforesaid two types of the radiation image recording and read-out apparatuses comprises:

(i) a circulation and conveyance means for conveying at least one stimulable phosphor sheet for recording a radiation image thereon along a predetermined circulation path, (ii) an image recording section positioned on said circulation path for recording a radiation image on said stimulable phosphor sheet by exposing said stimulable phosphor sheet to a radiation carrying image information, (iii) an image read-out section positioned on said circulation path and provided with a stimulating ray source for emitting stimulating rays for scanning said stimulable phosphor sheet carrying said radiation image stored thereon at said image recording section, and a photoelectric read-out means for detecting light emitted by said stimulable phosphor sheet scanned by said stimulating rays to obtain an electric image signal, and (iv) an erasing section positioned on said circulation path for, prior to the next image recording on said stimulable phosphor sheet for which the image read-out has been conducted at said image read-out section, having said stimulable phosphor sheet release the radiation energy remaining on said stimulable phosphor sheet. This type of the radiation image recording and read-out apparatus is disclosed in Japanese Unexamined Patent Publication No. 59(1984)-192240, and will hereinbelow be referred to as the built-in type apparatus I.

The other of the aforesaid two types of the radiation image recording and read-out apparatuses comprises:

(a) a supporting material, (b) at least one recording material fixed on said supporting material and comprised of a stimulable phosphor layer capable of storing a radiation image, (c) an image recording section for exposing said recording material to a radiation passing through an object to have a radiation image of the object stored on said recording material, (d) an image read-out section provided with a stimulating ray source for emitting stimulating rays for scanning said recording material carrying said radiation image stored thereon, and a photoelectric read-out means for obtaining an electric image signal by reading out light emitted by said recording material scanned and stimulated with the stimulating rays, (e) a means for circulating said recording material on said supporting material with respect to said image read-out section for enabling reuse of said recording material by repeatedly moving said supporting material and said image read-out section with respect to each other, and (f) an erasing means for eliminating the radiation energy remaining on said recording material prior to image recording on said recording material after the radiation image is read out therefrom at said image read-out section. This type of the radiation image recording and read-out apparatus is disclosed in Japanese Unexamined Patent Publication No. 58(1983)-200269, and will hereinbelow be referred to as the built-in type apparatus II.

On the other hand, in the aforesaid radiation image read-out apparatus, the drawback that the efficiency of utilization of stimulating rays is low has heretofore been found to arise. Specifically, most of stimulating rays is reflected by the surface of the recording material composed of a stimulable phosphor, such as the stimulable phosphor sheet, and is not efficiently utilized for stimulation of the stimulable phosphor. Therefore, particularly in the case where image read-out is to be conducted with a high sensitivity, a stimulating ray source having a large output becomes necessary, and the power requirement becomes large.

SUMMARY OF THE INVENTION

The primary object of the present invention is to provide a radiation image read-out apparatus which substantially improves the efficiency of utilization of stimulating rays.

Another object of the present invention is to provide a radiation image read-out apparatus which conducts image read-out with a high sensitivity by use of a stimulating ray source having a small output.

The present invention provides, in its broad aspect, a radiation image read-out apparatus for exposing a recording material provided with a stimulable phosphor and carrying a radiation image stored thereon to stimulating rays which cause said recording material to emit light in proportion to the stored radiation energy, and photoelectrically detecting the emitted light to read out said radiation image, wherein the improvement comprises the provision of a multi-layer optical filter whose reflectivity with respect to said stimulating rays increases as the angle of incidence of said stimulating rays upon said multi-layer optical filter increases, said multi-layer optical filter being disposed in the optical path of said stimulating rays in the vicinity of said recording material or formed on the surface of said recording material on the stimulating ray irradiation side.

The present invention also embraces the following aspects:

[I] A radiation image read-out apparatus for two-dimensionally scanning a stimulable phosphor sheet, which carries a radiation image stored thereon, with stimulating rays which cause said stimulable phosphor sheet to emit light in proportion to the stored radiation energy, and photoelectrically reading out the light emitted by the scanned portion of said stimulable phosphor sheet by use of a photodetector, wherein the improvement comprises the provision of a multi-layer optical filter whose reflectivity with respect to said stimulating rays increases as the angle of incidence of said stimulating rays upon said multi-layer optical filter increases, said multi-layer optical filter being disposed in the optical path of said stimulating rays in the vicinity of said stimulable phosphor sheet or formed on the surface of said stimulable phosphor sheet on the stimulating ray irradiation side.

[II] A radiation image read-out apparatus including a stimulating ray source for emitting stimulating rays to a stimulable phosphor sheet carrying a radiation image stored thereon, and a photodetector constituted by a photoelectric conversion device, which is divided into picture elements, and disposed to face said stimulable phosphor sheet, wherein the improvement comprises the provision of a multi-layer optical filter whose reflectivity with respect to said stimulating rays increases as the angle of incidence of said stimulating rays upon said multi-layer optical filter increases, said multi-layer optical filter being disposed in the optical path of said stimulating rays in the vicinity of said stimulable phosphor sheet or formed on the surface of said stimulable phosphor sheet on the stimulating ray irradiation side.

[III] A built-in type apparatus I as mentioned above, wherein the improvement comprises using, as said stimulable phosphor sheet, a sheet composed of a stimulable phosphor layer and a multi-layer optical filter whose reflectivity with respect to said stimulating rays increases as the angle of incidence of said stimulating rays upon said multi-layer optical filter increases and which is formed on the surface of said stimulable phosphor layer, said stimulable phosphor sheet being disposed with said multi-layer optical filter facing the stimulating ray irradiation side at said image read-out section, or disposing said multi-layer optical filter in the optical path of said stimulating rays in the vicinity of said stimulable phosphor sheet at said image read-out section.

[IV] A built-in type apparatus II as mentioned above, wherein the improvement comprises the provision of a multi-layer optical filter whose reflectivity with respect to said stimulating rays increases as the angle of incidence of said stimulating rays upon said multi-layer optical filter increases, said multi-layer optical filter being formed on the surface of said recording material fixed on said supporting material on the stimulating ray irradiation side, or disposed in the optical path of said stimulating rays in the vicinity of said recording material fixed on said 15 supporting material at said image read-out section.

The multi-layer optical filter is fabricated by sequentially overlaying several to several tens of layers of two or more materials exhibiting different refractive indices to a thickness of predetermined one fourth of the light wavelength on a support. In this case, it is possible to obtain various characteristics by adjusting the refractive indices and the film thicknesses of the respective materials. As a low refractive index material, it is possible to use $SiO_2$, $MgF_2$, or the like. As a high refractive index material, it is possible to use $TiO_2$, $ZrO_2$, $ZnS$, or the like.

The multi-layer optical filter should preferably be adjusted so that the stimulating ray transmittance is not lower than 70%, more preferably not lower than 80%, when the angle of incidence of stimulating rays upon the multi-layer optical filter is not larger than 5° (i.e. the stimulating ray reflectivity is not higher than 30%, more preferably not higher than 20% when the angle of incidence of stimulating rays upon the multi-layer optical filter is not larger than 5°), and the stimulating ray reflectivity is not lower than 60%, more preferably not lower than 80%, when the angle of incidence of stimulating rays upon the multi-layer optical filter is not smaller than 30°.

On the other hand, light emitted by the stimulable phosphor when the recording material such as the stimulable phosphor sheet is exposed to stimulating rays impinges upon the multi-layer optical filter at various angles of incidence. Therefore, the characteristics of the multi-layer optical filter may be adjusted in accordance with the position of the photodetector (i.e. the photoelectric read-out means) for detecting the light emitted by the recording material. Specifically, in the case where the photodetector (photoelectric read-out means) is disposed on the same side as the stimulating ray source with respect to the recording material such as the stimulable phosphor sheet and the light emitted by the recording material is detected on the stimulating ray irradiation side, the multi-layer optical filter may be adjusted so that it transmits the light emitted by the recording material regardless of the angle of incidence of the emitted light. In the case where the photodetector (photoelectric read-out means) is disposed on the side opposite to the stimulating ray source with respect to the recording material and the light emitted by the recording material is detected on the side opposite to the stimulating ray irradiation side, the multi-layer optical filter may be adjusted so that it reflects the light emitted by the recording material regardless of the angle of incidence of the emitted light. In the case where the light emitted by the recording material is detected on the stimulating ray irradiation side, the multi-layer optical filter should preferably be adjusted so that it transmits 60% or more of the light emitted by the recording material, more preferably 80% or more of the light emitted by the recording material, when the angle of incidence of the emitted light upon the multi-layer optical filter is within the range of 0° to 40°. On the other hand, in the case where the light emitted by the recording material is detected on the side opposite to the stimulating ray irradiation side, the multi-layer optical filter should preferably be adjusted so that it reflects 60% or more of the light emitted by the recording material, more preferably 80% or more of the light emitted by the recording material.

The term "disposing a multi-layer optical filter in the vicinity of a recording material provided with a stimulable phosphor" embraces not only the case where the multi-layer optical filter is disposed in close contact with the recording material but also the case where the multi-layer optical filter is disposed in slightly spaced relation to the recording material.

Particularly, in the case where the photodetector is disposed on the stimulating ray irradiation side with respect to the stimulable phosphor sheet in the radiation image read-out apparatus mentioned in [II] above, the photodetector may also be of the type transmitting stimulating rays therethrough. As the photodetector of this type, it is possible to use a photodetector comprising a transparent support, and a light shielding layer provided with a slit or small holes for allowing stimulating rays to pass therethrough, a first transparent electrode layer, a photoconductor layer, and a second transparent electrode layer which are overlaid sequentially on the transparent support as disclosed in, for example, Japanese Unexamined Patent Publication No. 60(1985)-111568, or a photodetector wherein a light shielding support is used instead of the aforesaid transparent support and provided with through holes for allowing stimulating rays to pass therethrough, thereby eliminating the aforesaid light shielding layer, as proposed in Japanese Patent Application No. 59(1984)-148440. It is also possible to utilize a general photodetector which does not allow passage of stimulating rays. In the case where such a photodetector is utilized, the photodetector may be disposed so that the light reception axis of the photodetector is at an angle with respect to the axis of incidence of stimulating rays upon the stimulable phosphor sheet, and the multi-layer optical filter may be disposed in the vicinity of the stimulable phosphor sheet. In this case, a single photodetector may be disposed, or two photodetectors may be disposed with the axis of incidence of stimulating rays intervening therebetween. On the other hand, in the case where the photodetector is disposed on the side opposite to the stimulating ray irradiation side with respect to the stimulable phosphor sheet, the layout of the photodetector in relation to the optical path of stimulating rays need not be considered. Therefore, the photodetector may be disposed at any position suitable for efficiently receiving the light emitted by the stimulable phosphor sheet. Also, as said photodetector, it is possible to use an ordinary photodetector having a configuration which does not allow stimulating rays to pass therethrough, for example, a photodetector comprising a light shielding support, and an electrode layer, a photoconductor layer, and a divided transparent electrode layer which are overlaid on the light shielding support as disclosed in, for example, Japanese Unexamined Patent Publication No. 60(1985)-111568.

When the multi-layer optical filter is disposed in the optical path of stimulating rays in the vicinity of the recording material composed of a stimulable phosphor or formed on the surface of the recording material on the stimulating ray irradiation side, stimulating rays impinging upon the recording material at a substantially small angle of incidence (usually, at an angle of incidence as close to 0° as possible) substantially pass through the multi-layer optical filter and impinge upon the recording material. The stimulating rays impinging upon the recording material and are randomly reflected thereby return toward the multi-layer optical filter at various angles. At this time, most of the stimulating rays impinging upon the multi-layer optical filter at a large angle of incidence are reflected by the multi-layer optical filter toward the recording material. Thus the stimulating rays reflected by the recording material are confined between the recording material and the multi-layer optical filter and are efficiently utilized for stimulation of the stimulable phosphor. Also, it becomes possible to substantially detect the light emitted by the recording material by adjusting the characteristics of the multi-layer optical filter as mentioned above. Accordingly, with the radiation image read-out apparatus in accordance with the present invention, it is possible to substantially increase the radiation image read-out sensitivity by use of a stimulating ray source having a small output and by decreasing the power requirement.

BRIEF DESCRIPTION OF THE DRAWINGS

FIG. 14 is a schematic perspective view showing a third embodiment of the radiation image read-out apparatus in accordance with the present invention, FIG. 15 is an enlarged side view showing the major part of the third embodiment, FIG. 31 is a schematic perspective view showing a seventh embodiment of the radiation image read-out apparatus in accordance with the present invention, FIG. 37 is a schematic view showing a tenth embodiment of the radiation image read-out apparatus in accordance with the present invention, FIG. 38 is a schematic view showing a eleventh embodiment of the radiation image read-out apparatus in accordance with the present invention.

DESCRIPTION OF THE PREFERRED EMBODIMENTS

The present invention will hereinbelow be described in further detail with reference to the accompanying drawings.

Figure 1:
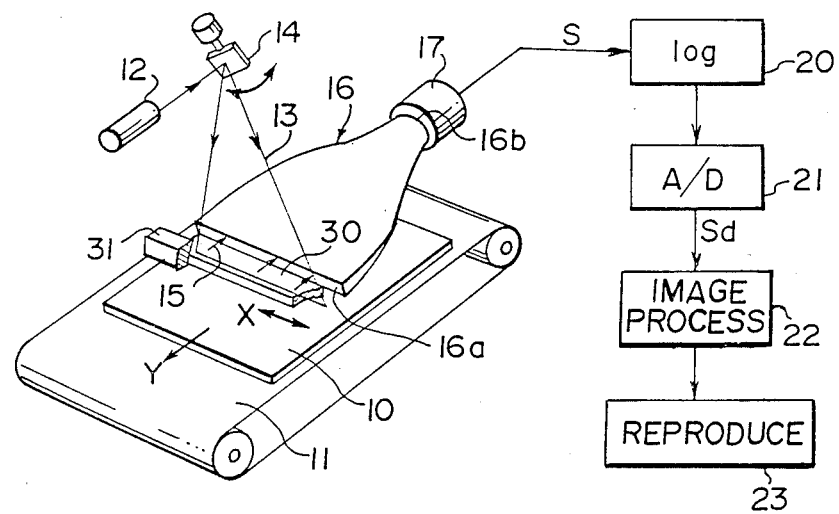
FIG. 1 is a schematic perspective view showing a first embodiment of the radiation image read-out apparatus in accordance with the present invention.
Figure 2:
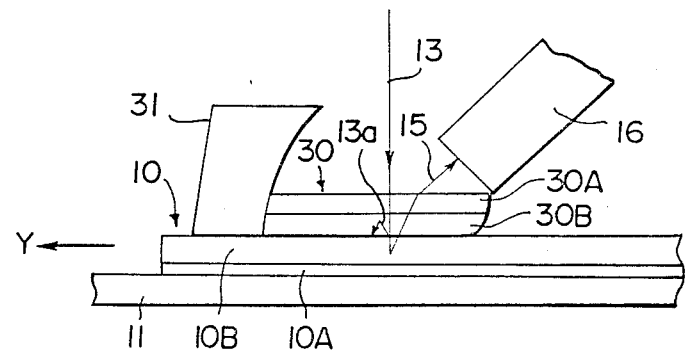
FIG. 2 is an enlarged side view showing the major part of the first embodiment.

Referring to FIGS. 1 and 2 showing a first embodiment of the radiation image read-out apparatus in accordance with the present invention, a stimulable phosphor sheet 10 carrying a radiation image of an object such as the human body stored thereon by being exposed to a radiation such as X-rays passing through the object is conveyed by a sheet conveyance means 11 comprising an endless belt or the like in a sub-scanning direction as indicated by the arrow Y as shown in FIG. 1. A laser beam 13 emitted as stimulating rays by a laser beam source 12 is deflected by a galvanometer mirror 14 swinging in both ways, passes through a multi-layer optical filter 30 described in detail later, and scans the stimulable phosphor sheet 10 in a main scanning direction as indicated by the arrow X approximately normal to the sub-scanning direction as indicated by the arrow Y. When the stimulable phosphor sheet 10 is exposed to the laser beam 13, the exposed portion of the sheet 10 emits light 15 in an amount proportional to the stored radiation energy. The emitted light 15 passes through the multi layer optical filter 30, is guided by a light guide member 16, and is photoelectrically detected by a photomultiplier 17 acting as a photodetector. The light guide member 16 is made by forming a light guiding material such as an acrylic plate, and has a linear light input face 16a positioned to extend along the beam scanning line on the stimulable phosphor sheet 10, and a ring-shaped light output face 16b closely contacted with a light receiving face of the photomultiplier 17. The emitted light 15 entering the light guide member 16 from its light input face 16a is guided through total reflection inside of the light guide member 16, emanates from the light output face 16b, and is received by the photomultiplier 17. In this manner, the amount of the emitted light 15 carrying the radiation image information is detected by the photomultiplier 17. As shown in FIG. 2, a light guiding mirror 31 is disposed along the main scanning line on the stimulable phosphor sheet 10 in the vicinity of the surface of the sheet 10. The emitted light 15 advancing to sides other than the light guide member 16 is reflected by the light guiding mirror 31 and is efficiently guided to the light guide member 16.

An analog output signal (read-out image signal) S generated by the photomultiplier 17 is amplified by a logarithmic amplifier 20, and digitized with a predetermined scale factor by an A/D converter 21. A digital read-out image signal Sd thus obtained is sent to an image reproducing apparatus 23 such as a light beam scanning recording apparatus via an image processing device 22, and the radiation image which was stored on the stimulable phosphor sheet 10 is reproduced as a visible image by the image reproducing apparatus 23.

Figure 3:
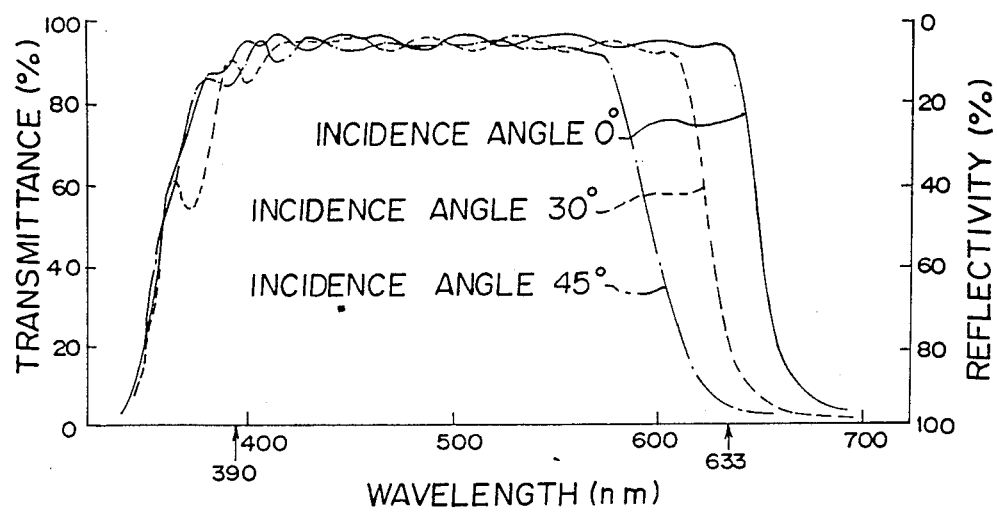
FIGS. 3 and 4 are graphs showing examples of spectral transmittance characteristics of the multi-layer optical filter in the first embodiment at different angles of incidence of light.
Figure 8:
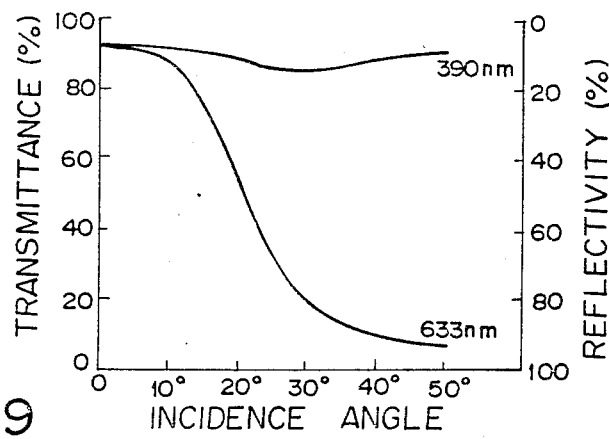
FIGS. 8 and 9 are graphs showing examples of dependency of the transmittance of the multi-layer optical filter employed in the first embodiment on the angles of incidence of stimulating rays and light emitted by the stimulable phosphor in proportion to the stored radiation energy.

Effects of the multi-layer optical filter 30 will hereinbelow be described in detail. By way of example, the multi-layer optical filter 30 is a short pass filter exhibiting the spectral transmittance characteristics as shown in FIG. 3. As shown in FIG. 2, the multi-layer optical filter 30 is composed of a glass support 30A and a multi-layer film 30B formed on the surface of the glass support 30A. In this embodiment, the multi-layer optical filter 30 is disposed so that the multi-layer film 30B directly contacts a stimulable phosphor layer 10B overlaid on a supporting material 10A (which is formed of a carbon-containing polyethylene terephthalate, i.e. carbon-containing PET, or the like) of the stimulable phosphor sheet 10. The multi-layer optical filter 30 little absorbs light, and therefore a value calculated by subtracting the transmittance shown in FIG. 3 from 1 (100%) represents the reflectivity. In this embodiment, a beam having a wavelength of 633nm emitted by a He-Ne laser is used as the laser beam 13 acting as stimulating rays. As shown in FIG. 3, the transmittance of the multi-layer optical filter 30 with respect to the laser beam 13 is approximately 90%, 20%, and 5% respectively when the angle of incidence of the laser beam 13 is 0°, 30°, and 45°. Thus the transmittance of the multi-layer optical filter 30 with respect to the laser beam 13 decreases, i.e. the reflectivity thereof increases, sharply as the angle of incidence of the laser beam 13 increases. On the other hand, the stimulable phosphor sheet 10 subjected to image read-out in this embodiment is of the type emitting the light 15 having a wavelength within the range of 360nm to 420nm (mainly a wavelength of 390nm) when the sheet 10 is stimulated by said laser beam 13. As shown in FIG. 3, the multi-layer optical filter 30 substantially allows the light having a wavelength within the aforesaid range with a transmittance of approximately 90% regardless of the angle of incidence of the light. Dependency of the transmittance with respect to the light having a wavelength of 390nm and the light having a wavelength of 633nm on the angle of incidence is shown in FIG. 8.

As shown in FIG. 2, the laser beam 13 as stimulating rays is made to impinge upon the stimulable phosphor sheet 10 at an angle of incidence near 0°. Therefore, the laser beam 13 substantially passes through the multi-layer optical filter 30 with a transmittance of approximately 90%, impinges upon the stimulable phosphor sheet 10, and stimulates the stimulable phosphor 10B as mentioned above. The laser beam 13 is reflected to some extent by the surface of the stimulable phosphor layer 10B of the stimulable phosphor sheet 10 toward the multi-layer optical filter 30. At this time, the reflection of the laser beam 13 is random reflection, and reflected light 13a impinges upon the multi-layer optical filter 30 at various angles of incidence. Of the reflected light 13a, light impinging upon the multi-layer optical filter 30 at a large angle of incidence is reflected with a high reflectivity by the multi-layer optical filter 30 having the aforesaid characteristics to the stimulable phosphor sheet 10, and again stimulates the stimulable phosphor layer 10B. Thus, in this embodiment, the laser beam 13 as stimulating rays is confined between the multi-layer optical filter 30 and the stimulable phosphor sheet 10, and is efficiently utilized for stimulating the stimulable phosphor layer 10B.

Though also the light 15 emitted by the stimulable phosphor sheet 10 impinges upon the multi-layer optical filter 30 at various angles of incidence, since the multi-layer optical filter 30 substantially allows the emitted light 15 to pass therethrough regardless of the angle of incidence as mentioned above, the emitted light 15 efficiently impinges upon the light guide member 16.

The effects of the multi-layer optical filter 30 will hereinbelow be described in more detail with reference to nonlimitative examples. Image read-out was conducted with the apparatuses (1) and (2) (comparative examples) and with the apparatuses (3), (4) and (5) (examples in accordance with the present invention) as described below, and the read-out sensitivity was measured in each case. In the respective comparative examples and the examples in accordance with the present invention, the configuration of the apparatus other than the requirement specified below was the same as the configuration of the apparatus shown in FIG. 1.

(1) An apparatus provided with no multi-layer optical filter 30.

(2) An apparatus wherein only the glass support 30A is disposed in lieu of the multi-layer optical filter 30.

Figure 4:
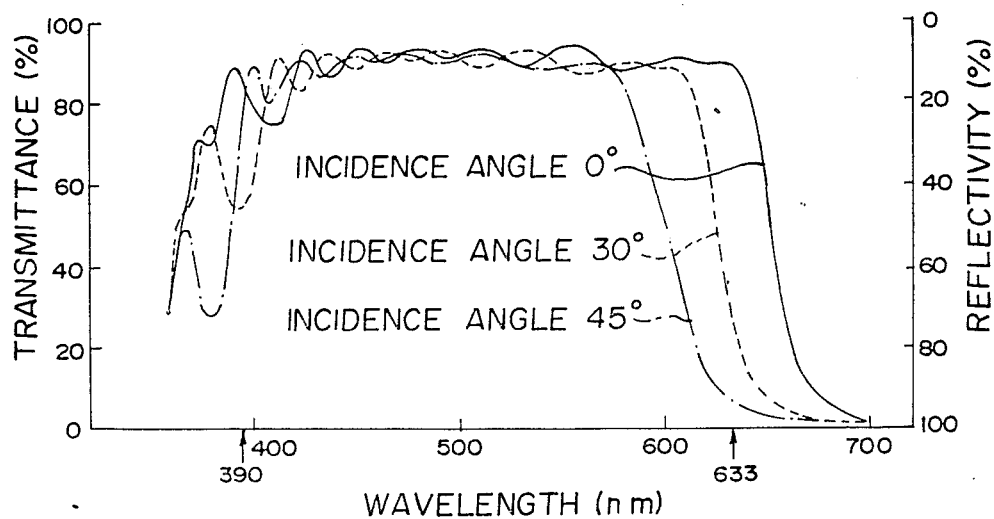

(3) An apparatus wherein the multi-layer optical filter exhibiting the spectral transmittance as shown in FIG. 4 is used in lieu of the multi-layer optical filter 30.

Figure 5:
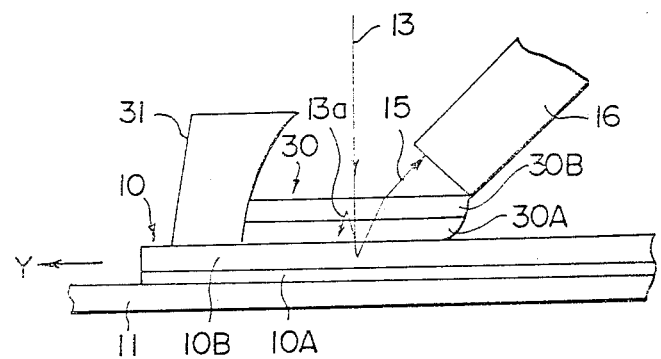
FIGS. 5 and 6 are side views showing modified forms of the first embodiment.

(4) An apparatus as shown in FIG. 5 wherein the same multi-layer optical filter as in (3) is used, and the glass support 30A is disposed on the side of the stimulable phosphor sheet 10.

(5) An apparatus of the aforesaid embodiment.

The read-out sensitivity in each case is shown in Table 1 below. The read-out sensitivity is the value relative to the sensitivity in the conventional apparatus (1) taken as 100. The contrast transfer function (CTF) of the read-out image was also measured. CTF1 and CTF2 are respectively the CTF for one line/mm and the CTF for two lines/mm. For measurement, a value in single line scanning was measured for eight lines, and the mean value of the eight values was taken as the measured value.

TABLE 1

| Example | Sensitivity | CTF1 | CTF2 |
|---|---|---|---|
| (1) | 100 | 70.0 | 29.5 |
| (2) | 79 | 66.1 | 27.9 |
| (3) | 189 | 48.7 | 12.8 |
| (4) | 183 | 28.8 | −0 |

TABLE 1-continued

| Example | Sensitivity | CTF1 | CTF2 |
|---|---|---|---|
| (5) | 206 | 46.0 | 13.5 |

As clear from Table 1, with the radiation image read-out apparatus in accordance with the present invention [apparatuses (3), (4) and (5)], it is possible to increase the read-out sensitivity by approximately two times the sensitivity obtained with the conventional apparatus while maintaining the energy of stimulating rays at the same level as in the conventional apparatus. With the apparatus of the present invention, the contrast transfer function of the read-out image deteriorates as compared with the conventional apparatus. This will presumably be because stimulating rays scattered on the stimulable phosphor sheet 10 are utilized for stimulation of the stimulable phosphor sheet 10, and therefore stimulation is effected with partially blurred stimulating rays. However, it is possible to improve the contrast transfer function by, for example, making the stimulable phosphor layer 10B of the stimulable phosphor sheet 10 thin. Also, in the case where the contrast transfer function need not be so much high and a high sensitivity is required, processing for improving the contrast transfer function need not be conducted.

Figure 6:
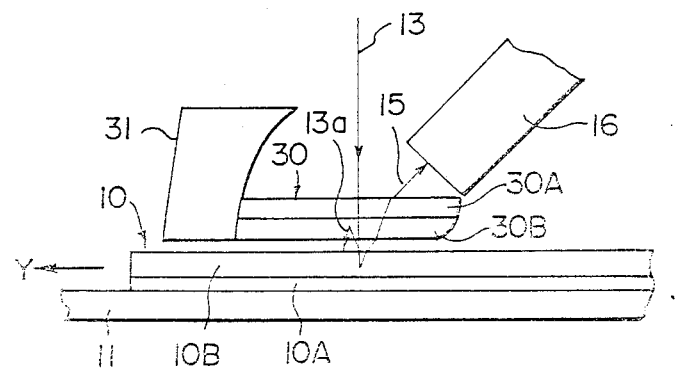

Though the multi-layer optical filter 30 is disposed to contact the stimulable phosphor sheet 10, the multi-layer optical filter 30 may also be disposed in slightly spaced relation to the stimulable phosphor sheet 10 as shown in FIG. 6. In general, read-out of the radiation image is conducted by moving the stimulable phosphor sheet 10 in the sub-scanning direction. Therefore, when the multi-layer optical filter 30 is disposed in slightly spaced relation to the stimulable phosphor sheet 10, it becomes possible to prevent the stimulable phosphor sheet 10 and the multi-layer optical filter 30 from wearing. In the case where the multi-layer optical filter 30 is disposed in this manner, since the contrast transfer function further deteriorates, the aforesaid processing for improving the contrast transfer function should be conducted when necessary.

Figure 7:
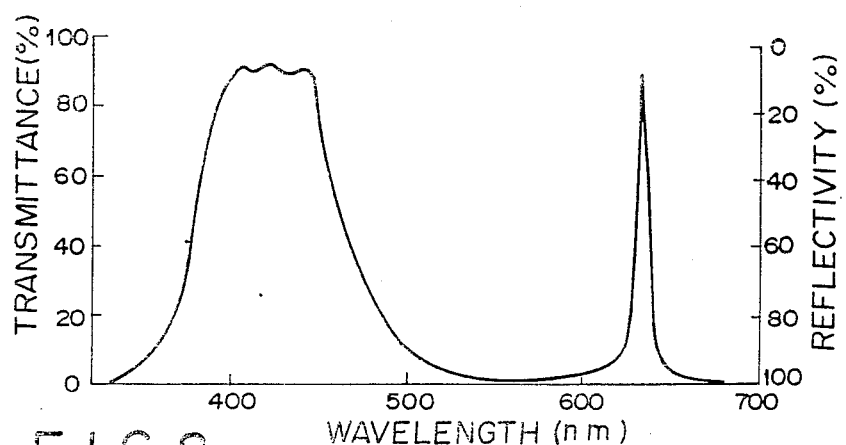
FIG. 7 is a graph showing spectral transmittance characteristics of a different multi-layer optical filter usable in the first embodiment.
Figure 9:
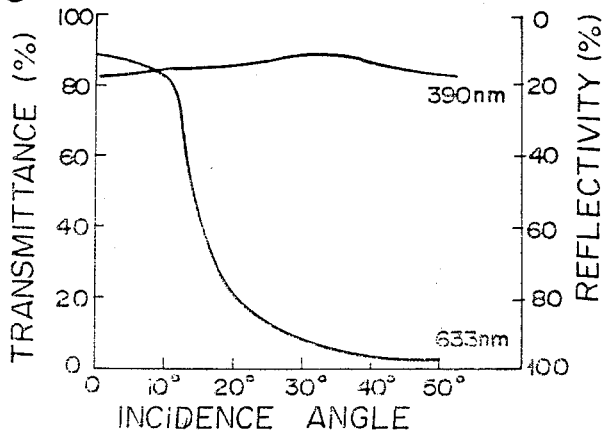

Though the short pass filter exhibiting the spectral transmittance characteristics as shown in FIG. 3 or in FIG. 4 is used as the multi-layer optical filter in the aforesaid embodiment, it is also possible to use a multi-layer optical filter in the form of a band pass filter (its approximate spectral transmittance characteristics are shown in FIG. 7). The same effects as in the aforesaid embodiment are obtained when a multi-layer optical filter exhibiting such spectral transmittance characteristics that the reflectivity with respect to stimulating rays increases as the angle of incidence increases and the light emitted by the stimulable phosphor sheet is substantially allowed to pass regardless of the angle of incidence is used as the band pass filter type multi-layer optical filter. An example of dependency of the transmittance of the band pass filter type multi-layer optical filter on the angle of incidence is shown in FIG. 9.

Figure 10:
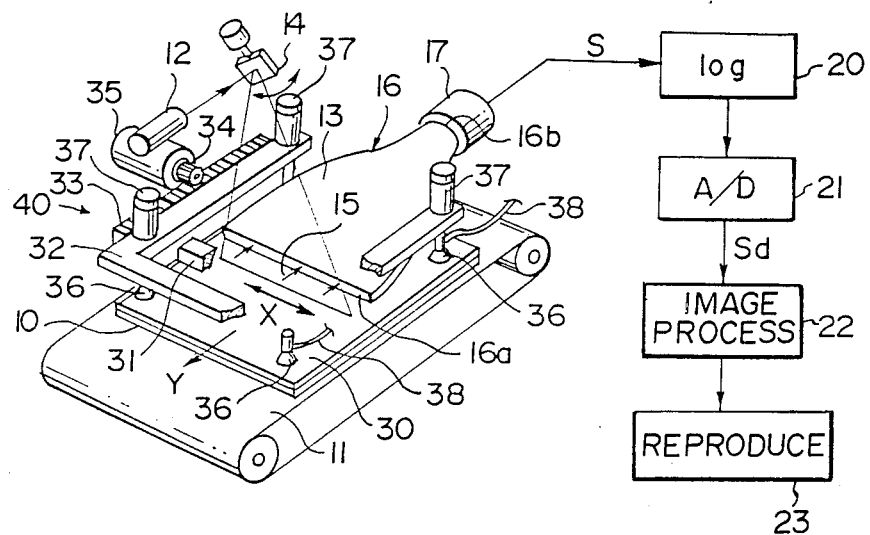
FIG. 10 is a schematic perspective view showing a second embodiment of the radiation image read-out apparatus in accordance with the present invention.
Figure 11:
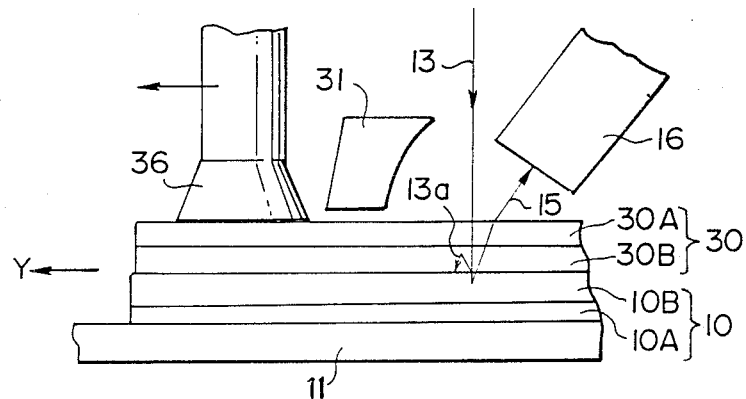
FIG. 11 is an enlarged side view showing the major part of the second embodiment.

FIGS. 10 and 11 show a second embodiment of the radiation image read-out apparatus in accordance with the present invention. In FIGS. 10 and 11, similar elements are numbered with the same reference numerals with respect to FIGS. 1 and 2.

In the second embodiment, the multi-layer optical filter 30 is the short pass filter exhibiting the spectral transmittance characteristics as shown in FIG. 3 like the multi-layer optical filter 30 used in the aforesaid first embodiment. As shown in FIG. 11, the multi-layer optical filter 30 is composed of the glass support 30A and the multi-layer film 30B overlaid on the surface of the glass support 30a. Unlike the first embodiment, the multi-layer optical filter 30 is formed to approximately the same size as the stimulable phosphor sheet 10, and is disposed on the sheet 10 in close contact therewith. Specifically, a filter feed means 40 is disposed above the sheet conveyance means 11. The filter feed means 40 is constituted by a moveable base 32 for movement in the sub-scanning direction as indicated by the arrow Y and reversely, a motor 35 for moving the moveable base 32 in the aforesaid directions via a rack 33 and a pinion 34, air suction cups 36, 36, . . . (by way of example, four air suction cups) mounted on the moveable base 32 to face down, and air cylinders 37, 37, . . . for vertically moving the air suction cups 36, 36, . . . The air suction cups 36, 36, . . . are connected to a negative pressure source such as a vacuum pump via air pipes 38, 38, . . . , and air suction from the air suction cups 36, 36, . . . is controlled by a control means such as a control valve (not shown). The moveable base 32 is made to wait above the sheet feed position (i.e. the position on the right end side in FIG. 10) on the sheet conveyance means 11 before the stimulable phosphor sheet 10 is fed to the sheet feed position. At this time, air suction from the air suction cups 36, 36, . . . is effected, and the multi-layer optical filter 30 is sucked and held by the air suction cups 36, 36, . . . approximately horizontally. When the stimulable phosphor sheet 10 is fed onto the sheet conveyance means 11, the motor 35 is operated to move the moveable base 32 at a speed equal to the conveyance speed of the sheet conveyance means 11. At the same time, the air cylinders 37, 37, . . . are activated to move the air suction cups 36, 36, . . . down by a predetermined distance, and the multi-layer optical filter 30 held by the air suction cups 36, 36, . . . is superposed on the stimulable phosphor sheet 10. The multi-layer optical filter 30 is maintained in close contact with the stimulable phosphor sheet 10 by slight pushing force of the air cylinders 37, 37, . . . Therefore, when radiation image read-out is conducted, the laser beam 13 passing through the multi-layer optical filter 30 impinges upon the stimulable phosphor sheet 10.

When the image read-out is finished, the air cylinders 37, 37, . . . are operated in the reverse direction, and the air suction cups 36, 36, . . . are moved up by the predetermined distance. As a result, the multi-layer optical filter 30 is separated from the stimulable phosphor sheet 10 from which the radiation image has been read out. The motor 35 is then rotated reversely, and the moveable base 32 is returned to the sheet feed position. The aforesaid operations are repeated, and the multi-layer optical filter 30 is always disposed in close contact with the stimulable phosphor sheet 10 subjected to radiation image read-out.

In the second embodiment, like the first embodiment, a beam having a wavelength of 633nm emitted by a He-Ne laser is used as the laser beam 13 acting as stimulating rays, and the stimulable phosphor sheet 10 subjected to radiation image read-out is of the type emitting light 15 having a wavelength within the range of 360nm to 420nm (mainly a wavelength of 390nm) when the sheet 10 is stimulated by said laser beam 13. Therefore, the effects of the multi-layer optical filter 30 are the same as in the first embodiment. Specifically, when image read-out was conducted with the apparatuses (1) and (2) (comparative examples) and with the apparatuses (3), (4) and (5) (examples in accordance with the present invention) as described below, and the read-out sensitivity was measured in each case in the same manner as in the first embodiment, almost the same results as with (1) to (5) listed in Table 1 were obtained with the apparatuses (1) to (5) shown below.

(1) An apparatus provided with no multi-layer optical filter 30.

(2) An apparatus wherein only the glass support 30A is disposed in lieu of the multi-layer optical filter 30.

(3) An apparatus wherein the multi-layer optical filter exhibiting the spectral transmittance as shown in FIG. 4 is used in lieu of the multi-layer optical filter 30.

Figure 12:
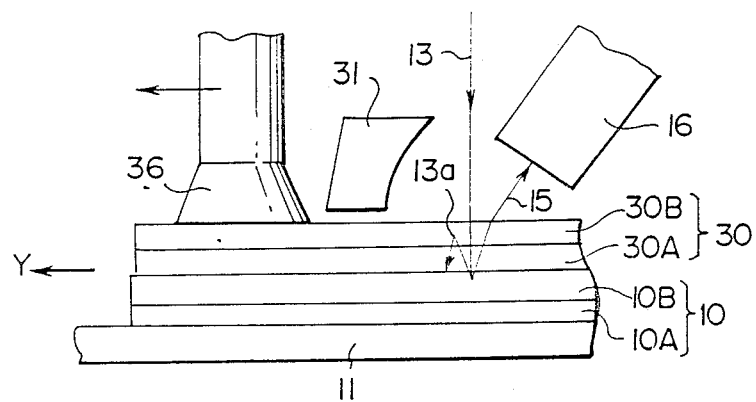
FIGS. 12 and 13 are side views showing modified forms of the second embodiment.

(4) An apparatus as shown in FIG. 12 wherein the same multi-layer optical filter as in (3) is used, and the glass support 30A is disposed on the side of the stimulable phosphor sheet 10.

(5) An apparatus of the second embodiment.

In order to maintain the multi-layer optical filter 30 in close contact with the stimulable phosphor sheet 10, instead of utilizing the slight pushing force of the air cylinders 37, 37, . . . , side end portions of the multi-layer optical filter 30 and the stimulable phosphor sheet 10 may also be grasped by nip rollers. Also, in the case where the multi-layer optical filter 30 is comparatively heavy, the means for pushing the multi-layer optical filter 30 against the stimulable phosphor sheet 10 may be omitted, and the multi-layer optical filter 30 may merely be placed on the stimulable phosphor sheet 10. In this case, conveyance of the multi-layer optical filter 30 in the sub-scanning direction during image read-out may be conducted by the sheet conveyance means 11.

Figure 13:
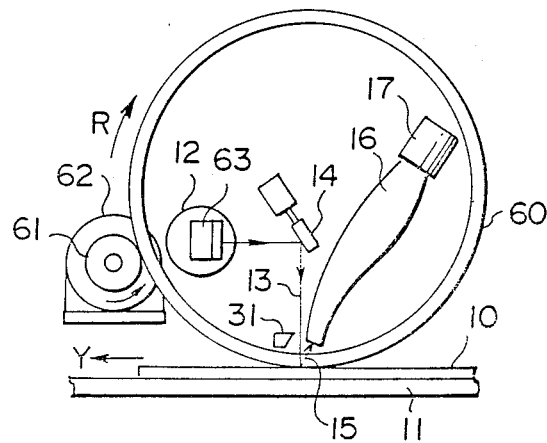

A modified form of the second embodiment will now be described with reference to FIG. 13. In FIG. 13, a cylindrical multi-layer optical filter 60 composed of a cylindrical glass support and a multi-layer film of the type as mentioned above overlaid on the cylindrical glass support is used. The cylindrical multi-layer optical filter 60 is rotated by a motor 62 via a roller 61 in the direction as indicated by the arrow R at a circumferential speed equal to the conveyance speed of the sheet conveyance means 11. The galvanometer mirror 14, the light guide member 16, the photomultiplier 17, and the light guiding mirror 31 are disposed inside of the cylindrical multi-layer optical filter 60, and the laser beam 13 emitted by the laser beam source 12 is reflected by a mirror 63 toward the galvanometer mirror 14.

Also in the modified form of FIG. 13, when radiation image read-out from the stimulable phosphor sheet 10 is conducted, the laser beam 13 as stimulating rays passes the cylindrical multi-layer optical filter 60 and impinges upon the stimulable phosphor sheet 10. Therefore, the same effects as in the aforesaid embodiments are obtained. Instead of the cylindrical multi-layer optical filter 60, an endless belt-like multi-layer optical filter composed of a flexible transparent member as the filter support may also be used.

In the case where the cylindrical or endless belt-like multi-layer optical filter is used, the multi-layer optical filter need not necessarily be disposed in close contact with the stimulable phosphor sheet over the overall sheet surface, and may be disposed in close contact with the stimulable phosphor sheet only at the stimulating ray incidence portion of the sheet. Therefore, when the size of the stimulable phosphor sheet is large, it is possible to make the size of the expensive multi-layer optical filter smaller than the sheet size. Thus the configuration of FIG. 13 is advantageous from economical viewpoint.

Though the short pass filter exhibiting the spectral transmittance characteristics as shown in FIG. 3 or in FIG. 4 is used as the multi-layer optical filter in the aforesaid second embodiment and its modified form, it is also possible to use a multi-layer optical filter in the form of a band pass filter (its approximate spectral transmittance characteristics are shown in FIG. 7, and an example of dependency of the transmittance on the angle of incidence is shown in FIG. 9).

In the aforesaid first and second embodiments, the multi-layer optical filter should preferably be adjusted so that the stimulating ray transmittance is not lower than 70%, more preferably not lower than 80%, when the angle of incidence of stimulating rays is not larger than 5° (i.e. the stimulating ray reflectivity is not higher than 30%, more preferably not higher than 20% when the angle of incidence of stimulating rays is not larger than 5°), the stimulating ray reflectivity is not lower than 60%, more preferably not lower than 70%, when the angle of incidence of stimulating rays is not smaller than 30°, and the transmittance with respect to the light emitted by the stimulable phosphor sheet is not lower than 60%, more preferably not lower than 80%, when the angle of incidence of the emitted light is within the range of 0° to 40°.

A third embodiment of the radiation image read-out apparatus in accordance with the present invention will hereinbelow be described with reference to FIGS. 14 and 15. A stimulable phosphor sheet 10 carrying a radiation image of an object such as the human body stored thereon by being exposed to a radiation such as X-rays passing through the object is conveyed by a sheet conveyance means 11 comprising two pairs of nip rollers or the like in a sub-scanning direction as indicated by the arrow Y as shown in FIG. 14. A laser beam 13 emitted as stimulating rays by a laser beam source 12 is deflected by a galvanometer mirror 14 swinging in both ways, passes through a multi-layer optical filter 30 described in detail later, and scans the stimulable phosphor sheet 10 in a main scanning direction as indicated by the arrow X approximately normal to the sub-scanning direction as indicated by the arrow Y. When the stimulable phosphor sheet 10 is exposed to the laser beam 13, the exposed portion of the sheet 10 emits light 15 in an amount proportional to the stored radiation energy. The emitted light 15 is guided by a light guide member 16 which is of the same type as the light guide member 16 used in the aforesaid first and second embodiments but is disposed on the side opposite to the stimulating ray irradiation side with respect to the stimulable phosphor sheet 10 unlike the first and second embodiments.

The analog output signal (read-out image signal) S generated by the photomultiplier 17 is processed in the same manner as in the first and second embodiments, and the radiation image which was stored on the stimulable phosphor sheet 10 is reproduced as a visible image by the image reproducing apparatus 23.

Figure 16:
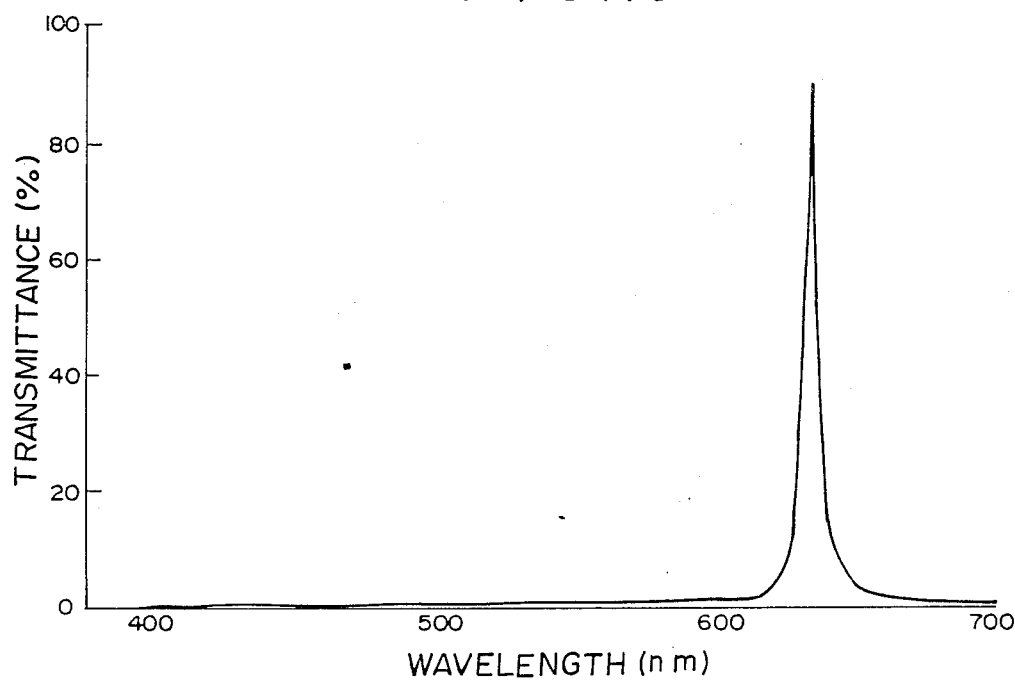
FIGS. 16 is a graph showing transmission spectrum of a different multi-layer optical filter employed in the third embodiment.

Effects of the multi-layer optical filter 30 in the third embodiment will hereinbelow be described in detail. By way of example, the multi layer optical filter 30 is a band pass filter exhibiting the spectral transmittance characteristics as shown in FIG. 16 when the angle of incidence upon the filter is 0°. As shown in FIG. 15, the multi-layer optical filter 30 is composed of a glass support 30A and a multi-layer film 30B formed on the surface of the glass support 30A. In this embodiment, the stimulable phosphor sheet 10 is composed of a transparent supporting material 10A and a stimulable phosphor layer 10B overlaid on the supporting material 10A. The multi-layer optical filter 30 is disposed so that the multi-layer film 30B directly contacts the stimulable phosphor layer 10B. The laser beam 13 is made to impinge upon the multi-layer optical filter 30 in an approximately normal direction, i.e. at an angle of incidence of approximately 0°. The transparent supporting material 10A need not necessarily be provided, and a transparent protective film or the like may be overlaid on the upper surface of the stimulable phosphor layer 10B. The multi-layer optical filter 30 little absorbs light, and therefore a value calculated by subtracting the transmittance shown in FIG. 16 from 1 (100%) represents the reflectivity. In this embodiment, a beam having a wavelength of 633nm emitted by a He-Ne laser is used as the laser beam 13 acting as stimulating rays. As shown in FIG. 16, the transmittance of the multi-layer optical filter 30 with respect to the laser beam 13 is approximately 90% when the angle of incidence of the laser beam 13 is 0°, i.e. when the laser beam 13 impinges upon the stimulable phosphor sheet 10 for stimulating it. The transmittance of the multi-layer optical filter 30 with respect to light having a wavelength outside of the range from 630nm to 650nm is nearly 0% when the angle of incidence is 0°.

On the other hand, the stimulable phosphor sheet 10 subjected to image read-out in this embodiment is of the type emitting the light 15 having a wavelength within the range of 360nm to 420nm (mainly a wavelength of 390nm) when the sheet 10 is stimulated by said laser beam 13. Dependency of the transmittance of the multi-layer optical filter 30 with respect to the light having a wavelength of 390nm and the light having a wavelength of 633nm on the angle of incidence is shown in FIG. 17.

As mentioned above, the laser beam 13 as stimulating rays is made to impinge upon the stimulable phosphor sheet 10 at an angle of incidence near 0°. Therefore, the laser beam 13 substantially passes through the multi-layer optical filter 30 with a transmittance of approximately 90%, impinges upon the stimulable phosphor sheet 10, and stimulates the stimulable phosphor 10B as mentioned above. The laser beam 13 is reflected to some extent by the surface of the stimulable phosphor layer 10B of the stimulable phosphor sheet 10 toward the multi-layer optical filter 30. At this time, the reflection of the laser beam 13 is random reflection, and reflected light 13a impinges upon the multi-layer optical filter 30 at various angles of incidence. Of the reflected light 13a, light impinging upon the multi-layer optical filter 30 at a large angle of incidence is reflected with a high reflectivity by the multi-layer optical filter 30 having the aforesaid characteristics to the stimulable phosphor sheet 10, and again stimulates the stimulable phosphor layer 10B. Thus, in this embodiment, like the aforesaid first and second embodiments, the laser beam 13 as stimulating rays is confined between the multi-layer optical filter 30 and the stimulable phosphor sheet 10, and is efficiently utilized for stimulating the stimulable phosphor layer 10B.

Figure 17:
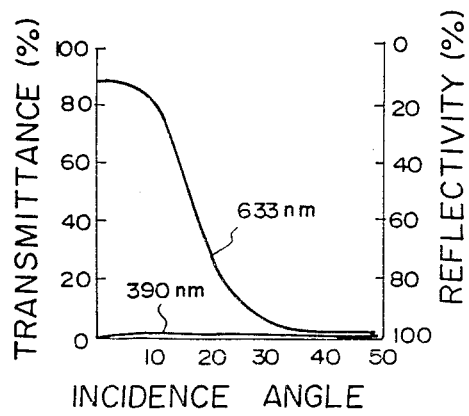
FIG. 17 is a graph showing examples of dependency of the transmittance of the multi-layer optical filter shown in FIG. 16 on the angles of incidence of stimulating rays and light emitted by the stimulable phosphor in proportion to the stored radiation energy.

Though also the light 15 emitted by the stimulable phosphor sheet 10 impinges upon the multi-layer optical filter 30 at various angles of incidence, the multi-layer optical filter 30 always reflects nearly 100% of the emitted light 15 regardless of the angle of incidence as shown in FIG. 17 unlike the multi-layer optical filter used in the first and second embodiments. Therefore, as shown in FIG. 15, most of the light 15 emitted toward the multi-layer optical filter 30 is reflected by the multi-layer optical filter 30, and made to impinge upon the light input face 16a of the light guide member 16 disposed below the stimulable phosphor sheet 10. With this embodiment, since said multi-layer optical filter 30 is used, it is possible to increase the amount of the light emitted by the stimulable phosphor sheet by efficiently utilizing the laser beam as stimulating rays, and to efficiently detect the emitted light, thereby markedly increasing the sensitivity of the read-out apparatus as compared with the conventional apparatus.

The multi-layer optical filter used in the third embodiment exhibits such very preferable characteristics that it reflects nearly 100% of the light emitted by the stimulable phosphor sheet and impinging upon the multi-layer optical filter and transmits approximately 90% of stimulating rays when the angle of incidence of stimulating rays is 0°. In general, the desirable effects of increasing the sensitivity can be achieved in the case where the stimulating ray transmittance is not lower than 70%, more preferably not lower than 80%, when the angle of incidence of stimulating rays is within the range of 0° to 5°, the stimulating ray reflectivity is not lower than 60%, more preferably not lower than 70%, when the angle of incidence of stimulating rays is not smaller than 30°, and the reflectivity with respect to the light emitted by the stimulable phosphor sheet is not lower than 60%, more preferably not lower than 80%. As the support for supporting the multi-layer film, besides the aforesaid glass support, it is also possible to use a transparent plastic material sheet formed of polyethylene terephthalate, polyethylene, polyvinylidene chloride, polyamide, or the like.

The effects of the multi-layer optical filter 30 in the third embodiment will further be illustrated by the following nonlimitative example.

EXAMPLE OF THIRD EMBODIMENT

A dispersion containing a bivalent europium activated barium fluorobromide stimulable phosphor (BaFBr:0.001Eu$^{2+}$) in the dispersed form was prepared by adding methyl ethyl ketone to a mixture of the stimulable phosphor with a linear polyester resin and further adding nitrocellulose of a nitration degree of 11.5%. After adding tricresyl phosphate, n-butanol and methyl ethyl ketone to the dispersion, the mixture was mixed intimately with stirring by use of a propeller mixer to prepare a coating composition containing the stimulable phosphor in the uniformly dispersed form wherein the mixing ratio of the binder to the stimulable phosphor was 1:10 and the viscosity was within the range of 25 to 35PS at 25° C.

A transparent glass plate (supporting material, thickness: 1mm) was placed horizontally, and the coating composition was applied uniformly onto the supporting material. The supporting material provided with a coating film of the coating composition was introduced into a dryer, and the coating film was dried by gradually increasing the temperature inside of the dryer from 25° C to 100° C. In this manner, a stimulable phosphor layer having a film thickness of 250μm was formed on the supporting material.

On the other hand, a transparent glass plate (glass support, thickness: approximately 1mm) heated to approximately 350° C was introduced into a vacuum vessel, and a multi-layer optical filter (band pass filter) exhibiting the transmittance and reflectivity characteristics as shown in FIG. 17 was formed to a total film thickness (total of approximately 20 layers overlaid one upon another) of approximately 2μm on the glass plate by alternately repeating vacuum deposition of $TiO_2$ and $SiO_2$ while controlling the film thickness of each layer.

The stimulable phosphor sheet and the multi-layer optical filter made as described above were incorporated in the apparatus as shown in FIG. 14.

COMPARATIVE EXAMPLE

The same procedure as in the Example was followed, except that the multi-layer optical filter was omitted.

The apparatus of the Example and the apparatus of the Comparative Example were evaluated by conducting the sensitivity test as described below.

The stimulable phosphor sheet was exposed to X-rays emitted at a tube voltage of 80kVp, and then exposed to a He-Ne laser beam (wavelength: 633nm) to measure the sensitivity.

Table 2 shows the results obtained.

TABLE 2

|  | Relative sensitivity |
|---|---|
| Example of Third Embodiment | 180 |
| Comparative Example | 100 |

As clear from Table 2, with the read-out apparatus provided with the multi-layer optical filter in accordance with the present invention, the sensitivity was improved markedly as compared with the conventional read-out apparatus provided with no multi-layer optical filter.

Figure 18:
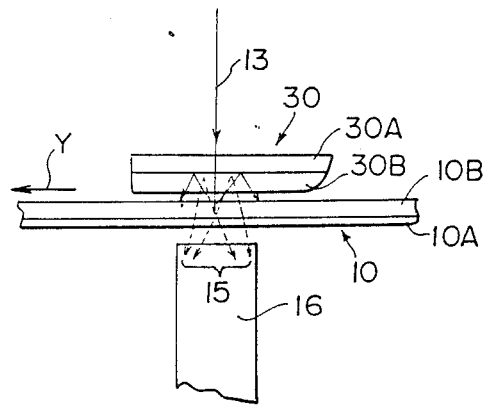
FIG. 18 is a side view showing a modified form of the third embodiment.

In the third embodiment, though the multi-layer optical filter 30 is disposed to contact the stimulable phosphor sheet 10, the multi-layer optical filter 30 may also be disposed in slightly spaced relation to the stimulable phosphor sheet 10 as shown in FIG. 18. In general, read-out of the radiation image is conducted by moving the stimulable phosphor sheet 10 in the sub-scanning direction. Therefore, when the multi-layer optical filter 30 is disposed in slightly spaced relation to the stimulable phosphor sheet 10, it becomes possible to prevent the stimulable phosphor sheet 10 and the multi-layer optical filter from wearing.

Also, it is only necessary that the multi-layer optical filter be disposed in the optical path of stimulating rays in the vicinity of the stimulable phosphor sheet. Besides the configuration wherein the multi-layer optical filter is moved relative to the stimulable phosphor sheet as mentioned above, the multi-layer optical filter may be temporarily closely contacted with, for example, the overall scanning region of the stimulable phosphor sheet, and a filter feed means may be disposed in addition to the sub-scanning means for the stimulable phosphor sheet to feed the multi-layer optical filter together with the stimulable phosphor sheet in the sub-scanning direction.

In the first, second, and third embodiments mentioned above, the multi-layer optical filter is disposed in the optical path of stimulating rays in the vicinity of the stimulable phosphor sheet. However, it is also possible to form the multi-layer optical filter on the surface of the stimulable phosphor sheet on the stimulating ray irradiation side.

Figure 19:
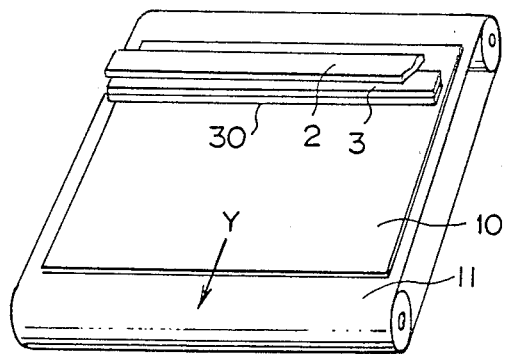
FIG. 19 is a schematic perspective view showing a fourth embodiment of the radiation image read-out apparatus in accordance with the present invention.

A fourth embodiment of the radiation image readout apparatus in accordance with the present invention will hereinbelow be described with reference to FIGS. 19, 20 and 21. In the fourth embodiment, the read-out section is constituted as, by way of example, a line sensor. As shown in FIG. 19, the stimulable phosphor sheet 10 is conveyed by the sheet conveyance means 11 constituted by an endless belt or the like in the sub-scanning direction as indicated by the arrow Y. A line sensor 3 is disposed above the stimulable phosphor sheet 10 in close relation thereto. The line sensor 3 is disposed to extend over the overall width of the recording region of the stimulable phosphor sheet 10 in the direction approximately normal to the sub-scanning direction as indicated by the arrow Y. A linear stimulating ray source 2 extending along the line sensor 3 is disposed above the line sensor 3. As the linear stimulating ray source 2, it is possible to use, for example, an array comprising light emitting diodes or semiconductor lasers arrayed in a line and turned on simultaneously, or a non-directional light source such as a combination of a fluorescent lamp or a Xe lamp with an aperture member provided with a slit or a series of small holes.

Figure 20:
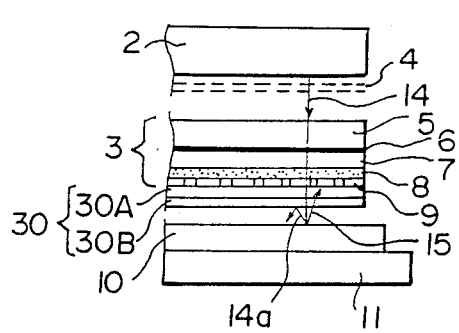
FIGS. 20 and 21 are a sectional front view and a sectional side view showing the major part of the fourth embodiment.
Figure 21:
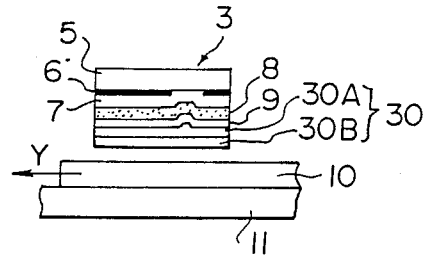

FIGS. 20 and 21 are respectively a sectional front view and a sectional side view of the line sensor 3. The line sensor 3 will hereinbelow be described in detail with reference to FIGS. 20 and 21. The line sensor 3 is fabricated by stacking a light shielding layer 6 provided with a slit or a series of small holes, a transparent electrode layer 7, a thin photoconductor layer 8, and a transparent electrode layer 9 on a transparent support 5. By dividing the transparent electrode layer 7 and/or the transparent electrode layer 9 in accordance with picture elements, many solid state photoelectric conversion devices corresponding to the picture elements are formed in the stack. In this embodiment, by way of example, the transparent electrode layer 9 is divided in accordance with the picture elements. A multi-layer optical filter 30 as described later is formed on the surface of the transparent electrode layer 9 facing the stimulable phosphor sheet 10.

When the radiation image is to be read out from the stimulable phosphor sheet 10, the sheet 10 is linearly exposed to stimulating rays 14 emitted by the stimulating ray source 2 via the line sensor 3, i.e. via the transparent support 5, the slit or series of small holes in the light shielding layer 6, the transparent electrode layer 7, the photoconductor layer 8, and the transparent electrode layer 9. The light 15 emitted by the stimulable phosphor sheet 10 in proportion to the stored radiation energy when it is exposed to the stimulating rays 14 is received by the photoconductor layer 8 via the transparent electrode layer 9. The photoconductor layer 8 is constituted by a photoconductor exhibiting an energy gap Eg larger than the energy $hc/"1$ ($=h\nu1$) of the stimulating rays 14 and smaller than the energy $hc/\lambda2$ ($=h\nu2$) of the light 15 emitted by the stimulable phosphor sheet 10. For example, it is possible to constitute the photoconductor layer 8 by using ZnS, ZnSe, CdS, $TiO_2$, ZnO, or the like when rare earth activated alkaline earth metal fluorohalide phosphor as disclosed in U.S. Pat. No. 4,239,968 is used as the stimulable phosphor.

When the stimulating rays 14 contain a short wave component, a short wave cut filter 4 is inserted between the stimulating ray source 2 and the line sensor 3, thereby allowing passage of only a long wave component. The transparent electrode layer 9 (constituted, e.g. by ITO) is divided into very small units in the longitudinal direction of the line sensor 3. The difference in potential arising between one divided unit of the transparent electrode layer 9 and the transparent electrode layer 7, i.e. the difference in potential generated by accumulation of signals caused by photocarriers generated upon receiving of the light emitted by the stimulable phosphor sheet 10 inside of the transparent electrode layer between the transparent electrode layers 7 and 9, corresponds to an image signal of one picture element. The signals caused by photocarriers, which are obtained at the divided electrode units are time-serially read out by use of a shift register as described later. In this manner, image signals of one scanning line are obtained. Thereafter, the aforesaid operation is repeated each time the stimulable phosphor sheet 10 is moved with respect to the stimulating ray source 2 and the line sensor 3 by a distance equal to the spacing of one scanning line in the direction as indicated by the arrow Y, and the radiation image over the overall surface of the stimulable phosphor sheet 10 is read out as time-serial image signals.

Figure 22:
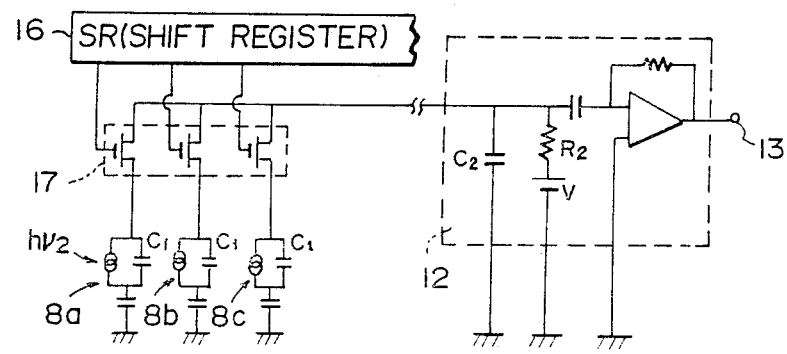
FIG. 22 is a circuit diagram showing the scanning circuit employed in the fourth embodiment.

A scanning circuit following the line sensor 3 will be described hereinbelow. FIG. 22 is an equivalent circuit diagram showing a line sensor using a photoconductor and a scanning circuit. Signals caused by photocarriers generated when light ($h\nu2$) emitted by a stimulable phosphor sheet impinges upon solid state photoelectric conversion devices 8a, 8b, and 8c using a photoconductor are accumulated at capacitors C1, C1, C1 of the solid state photoelectric conversion devices 8a, 8b, and 8c. The accumulated signals of the photocarriers are sequentially read out by switching of a switch section 17 carried out by a shift register 16, and time-serial image signals are obtained thereby. The image signals are then amplified by an amplifier 12 and are sent out from an output terminal 13 of the amplifier 12.

The MOS section comprising the switch section 17 and the shift register 16 may be replaced by a charge coupled device (CCD). Also, the line sensor 3 may be constituted by a photodiode array as disclosed in, for example, Japanese Unexamined Patent Publication No. 60(1985)-111568. Further, instead of disposing the light shielding layer 6 provided with a slit or a series of small holes as mentioned above, the support 5 may be formed as a light shielding support and provided with through holes for passage of stimulating rays as proposed in Japanese Patent Application No. 59(1984)-148440.

Also, though the photodetector is constituted as the line sensor comprising a plurality of the solid state photoelectric conversion devices arrayed in a line in the fourth embodiment, the photodetector may be constituted as a point sensor composed of a single solid state photoelectric conversion device, or a surface sensor composed of solid state photoelectric conversion devices arrayed two-dimensionally.

Effects of the multi-layer optical filter 30 in the fourth embodiment will hereinbelow be described in detail. By way of example, the multi-layer optical filter 30 is of the same type as the short pass filter used in the aforesaid first and second embodiments, and exhibits the spectral transmittance characteristics as shown in FIG. 3. As shown in FIG. 21, the multi-layer optical filter 30 is composed of a light-permeable support 30A and a multi-layer film 30B formed on the surface of the glass support 30A. In this embodiment, the multi-layer optical filter 30 is disposed so that the support 30A closely contacts the transparent electrode layer 9 of the line sensor 3 and the multi-layer film 30B is slightly spaced from the stimulable phosphor sheet 10. In this embodiment, like the first and second embodiments, a beam having a wavelength of 633nm is used as the stimulating rays 14, and the stimulable phosphor sheet 10 subjected to image read-out is of the type emitting the light 15 having a wavelength within the range of 360nm to 420nm (mainly a wavelength of 390nm) when the sheet 10 is stimulated by said stimulating rays 14. Dependency of the transmittance of the multi-layer optical filter 30 with respect to the light having a wavelength of 390nm and the light having a wavelength of 633nm on the angle of incidence is shown in FIG. 8.

As shown in FIG. 20, the stimulating rays 14 are made to impinge upon the stimulable phosphor sheet 10 at an angle of incidence near 0°. Therefore, the multi-layer optical filter 30 has the same effects as in the aforesaid first and second embodiments. Thus, in this embodiment, the stimulating rays 14 are confined between the multi-layer optical filter 30 and the stimulable phosphor sheet 10, and are efficiently utilized for stimulating the stimulable phosphor. Though also the light 15 emitted by the stimulable phosphor sheet 10 impinges upon the multi-layer optical filter 30 at various angles of incidence, since the multi-layer optical filter 30 substantially allows the emitted light 15 to pass therethrough regardless of the angle of incidence, the emitted light 15 efficiently impinges upon the line sensor 3.

Experiments conducted by the inventors revealed that, when the efficiency of utilization of stimulating rays is increased by the provision of the multi-layer optical filter 30, it is possible to increase the read-out sensitivity by approximately two times the sensitivity obtained without providing the multi-layer optical filter 30.

A lens optical system for guiding the light emitted by the stimulable phosphor sheet 10 (for example, a rod lens array)may be disposed between the multi-layer optical filter 30 formed on the line sensor 3 and the stimulable phosphor sheet 10. In this case, the stimulating rays (reflected light rays) 14a reflected by the surface of the stimulable phosphor sheet 10 and returning to the multi-layer optical filter 30 via the lens optical system are reflected by the multi-layer optical filter 30, made to again pass along nearly the same optical path in the lens optical system, and returns onto the stimulable phosphor sheet 10. Therefore, the stimulating rays 14a are tuned back to nearly the same position on the stimulable phosphor sheet 10, and the stimulation efficiency becomes high.

Figure 23:
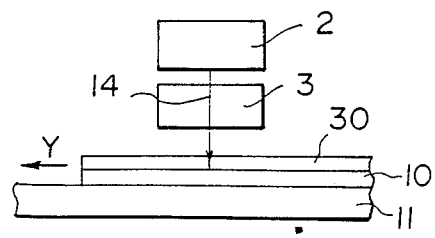
FIGS. 23 and 24 are side views showing modified forms of the fourth embodiment.
Figure 24:
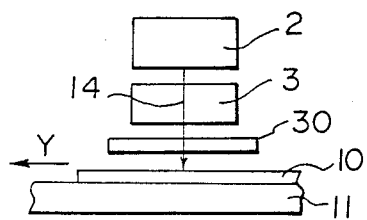

Also, as shown in FIG. 23, instead of forming the multi-layer optical filter 30 on the line sensor 3, the multi-layer optical filter 30 may be placed on or closely contacted with the stimulable phosphor sheet 10, and conveyed together with the sheet 10. Also in this case, since the multi-layer optical filter 30 is disposed in the optical path of stimulating rays between the stimulable phosphor sheet 10 and the line sensor 3, the same effects as mentioned above are obtained. In this case, the multi-layer optical filter 30 may be provided on every stimulable phosphor sheets 10. Alternately, the operations of returning the multi-layer optical filter 30 from the stimulable phosphor sheet 10, on which the image read-out has been finished, to the read-out start position and then superposing the multi-layer optical filter 30 on the next sheet 1 sent to the image read-out step may be repeated. With the latter method, only a single multi-layer optical filter 30 may be provided. Further, as shown in FIG. 24, the multi-layer optical filter 30 may be disposed in slightly spaced relation to the line sensor 3 and the stimulable phosphor sheet 10.

Also in the fourth embodiment, instead of the short pass filter exhibiting the spectral transmittance characteristics as shown in FIG. 3 and the dependency of the transmittance on the angle of incidence as shown in FIG. 8, it is possible to use, as the multi-layer optical filter 30, a band pass filter exhibiting the spectral transmittance characteristics as shown in FIG. 7 and the dependency of the transmittance on the angle of incidence as shown in FIG. 9.

Also in the fourth embodiment, like the aforesaid first and second embodiments, the multi-layer optical filter should preferably be adjusted so that the stimulating ray transmittance is not lower than 70%, more preferably not lower than 80%, when the angle of incidence of stimulating rays is not larger than 5° (i.e. the stimulating ray reflectivity is not higher than 30%, more preferably not higher than 20% when the angle of incidence of stimulating rays is not larger than 5°), the stimulating ray reflectivity is not lower than 60%, more preferably not lower than 70%, when the angle of incidence of stimulating rays is not smaller than 30°, and the transmittance with respect to the light emitted by the stimulable phosphor sheet is not lower than 60%, more preferably not lower than 80%, when the angle of incidence of the emitted light is within the range of 0° to 40°.

Figure 25:
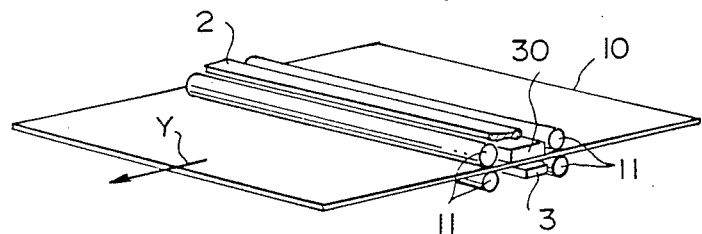
FIG. 25 is a schematic perspective view showing a fifth embodiment of the radiation image read-out apparatus in accordance with the present invention.

A fifth embodiment of the radiation image read-out apparatus in accordance with the present invention will hereinbelow be described with reference to FIGS. 25, 26 and 27. In the fifth embodiment, the read-out section is constituted as, by way of example, a line sensor. As shown in FIG. 25, the stimulable phosphor sheet 10 is conveyed by the sheet conveyance means 11 constituted by two pairs of nip rollers or the like in the sub-scanning direction as indicated by the arrow Y. A line sensor 3 is disposed below the stimulable phosphor sheet 10 in close relation thereto. The line sensor 3 is disposed to extend over the overall width of the recording region of the stimulable phosphor sheet 10 in the direction approximately normal to the sub-scanning direction as indicated by the arrow Y. A linear stimulating ray source 2 extending to face the line sensor 3 with the stimulable phosphor sheet 10 intervening therebetween is disposed above the stimulable phosphor sheet 10. The linear stimulating ray source 2 may be of the same type as in the aforesaid fourth embodiment.

Figure 26:
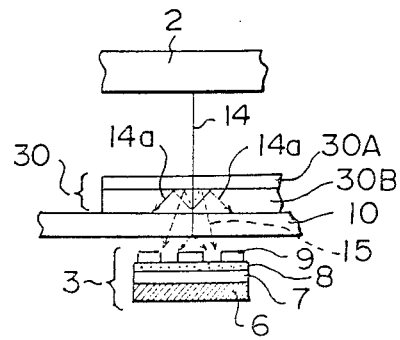
FIGS. 26 and 27 are a sectional front view and a sectional side view showing the major part of the fifth embodiment.
Figure 27:
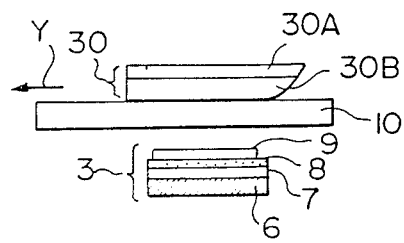

FIGS. 26 and 27 are respectively a sectional front view and a sectional side view of the line sensor 3. The line sensor 3 will hereinbelow be described in detail with reference to FIGS. 26 and 27. The line sensor 3 is fabricated by stacking a transparent electrode layer 7, a thin photoconductor layer 8, and a transparent electrode layer 9 on a light shielding support 6. By dividing the transparent electrode layer 7 and/or the transparent electrode layer 9 in accordance with picture elements, many solid state photoelectric conversion devices corresponding to the picture elements are formed in the stack. In this embodiment, by way of example, the transparent electrode layer 9 is divided in accordance with the picture elements. When the radiation image is to be read out from the stimulable phosphor sheet 10, the sheet 10 is linearly exposed to stimulating rays 14 emitted by the stimulating ray source 2. The light 15 emitted by the stimulable phosphor sheet 10 in proportion to the stored radiation energy when it is exposed to the stimulating rays 14 is received by the photoconductor layer 8 via the transparent electrode layer 9.

The transparent electrode layer 9 is divided into very small units in the longitudinal direction of the line sensor 3. The difference in potential arising between one divided unit of the transparent electrode layer 9 and the transparent electrode layer 7, i.e. the difference in potential generated by accumulation of signals caused by photocarriers generated upon receiving of the light emitted by the stimulable phosphor sheet 10 inside of the transparent electrode layer between the transparent electrode layers 7 and 9, corresponds to an image signal of one picture element. The signals caused by photocarriers, which are obtained at the divided electrode units are time-serially read out by use of a shift register of the same type as in the fourth embodiment. In this manner, image signals of one scanning line are obtained. Thereafter, the aforesaid operation is repeated each time the stimulable phosphor sheet 10 is moved with respect to the stimulating ray source 2 and the line sensor 3 by a distance equal to the spacing of one scanning line in the direction as indicated by the arrow Y, and the radiation image over the overall surface of the stimulable phosphor sheet 10 is read out as time-serial image signals.

The scanning circuit following the line sensor 3 may be of the same type as in the fourth embodiment. Also, the photodetector is not limited to the line sensor comprising a plurality of the solid state photoelectric conversion devices arrayed in a line, and may be constituted as a point sensor composed of a single solid state photoelectric conversion device, or a surface sensor composed of solid state photoelectric conversion devices arrayed two-dimensionally.

Effects of the multi-layer optical filter 30 in the fifth embodiment will hereinbelow be described in detail. By way of example, the multi-layer optical filter 30 is of the same type as the band pass filter used in the aforesaid third embodiment, and exhibits the spectral transmittance characteristics as shown in FIG. 16 when the angle of incidence upon the filter is 0°. As shown in FIGS. 26 and 27, the multi-layer optical filter 30 is composed of a glass support 30A and a multi-layer film 30B formed on the surface of the glass support 30A, and is disposed so that the multi-layer film 30B directly contacts the stimulable phosphor sheet 10. The laser beam 14 is made to impinge upon the multi-layer optical filter 30 in an approximately normal direction, i.e. at an angle of incidence of approximately 0°. In this embodiment, as in the third embodiment, a beam having a wavelength of 633nm emitted by a He-Ne laser is used as the laser beam 14, and the stimulable phosphor sheet 10 subjected to image read-out is of the type emitting the light 15 having a wavelength within the range of 360nm to 420nm (mainly a wavelength of 390nm) when the sheet 10 is stimulated by said laser beam 14. Dependency of the transmittance of the multi-layer optical filter 30 with respect to the light having a wavelength of 390nm and the light having a wavelength of 633nm on the angle of incidence is as shown in FIG. 17.

As mentioned above, the laser beam 14 as stimulating rays is made to impinge upon the stimulable phosphor sheet 10 at an angle of incidence near 0°. Therefore, the multi-layer optical filter 30 has the same effects as in the third embodiment. Thus, in this embodiment, the laser beam 14 as stimulating rays is confined between the multi-layer optical filter 30 and the stimulable phosphor sheet 10, and is efficiently utilized for stimulating the stimulable phosphor sheet 10. On the other hand, though the light 15 emitted by the stimulable phosphor sheet 10 impinges upon the multi-layer optical filter 30 at various angles of incidence, the multi-layer optical filter 30 always reflects nearly 100% of the emitted light 15 regardless of the angle of incidence as shown in FIG. 17. Therefore, as shown in FIG. 26, most of the light 15 emitted toward the multi-layer optical filter 30 is reflected by the multi-layer optical filter 30, and made to impinge upon the line sensor 3 disposed below the stimulable phosphor sheet 10. With this embodiment, since said multi-layer optical filter 30 is used, it is possible to increase the amount of the light emitted by the stimulable phosphor sheet by efficiently utilizing the laser beam as stimulating rays, and to efficiently detect the emitted light, thereby markedly increasing the sensitivity of the read-out apparatus and the S/N ratio as compared with the conventional apparatus.

The multi-layer optical filter used in the fifth embodiment exhibits such very preferable characteristics that it reflects nearly 100% of the light emitted by the stimulable phosphor sheet and impinging upon the multi-layer optical filter and transmits approximately 90% of stimulating rays when the angle of incidence of stimulating rays is 0°. In general, as in the third embodiment, the desirable effects of increasing the sensitivity can be achieved in the case where the stimulating ray transmittance is not lower than 70%, more preferably not lower than 80%, when the angle of incidence of stimulating rays is within the range of 0° to 5°, the stimulating ray reflectivity is not lower than 60%, more preferably not lower than 70%, when the angle of incidence of stimulating rays is not smaller than 30°, and the reflectivity with respect to the light emitted by the stimulable phosphor sheet is not lower than 60%, more preferably not lower than 80%. As the support for supporting the multi-layer film, besides the aforesaid glass support, it is also possible to use a transparent plastic material sheet formed of polyethylene terephthalate, polyethylene, polyvinylidene chloride, polyamide, or the like.

Experiments conducted by the inventors revealed that, when the efficiency of utilization of stimulating rays is increased by the provision of the multi-layer optical filter 30, it is possible to increase the read-out sensitivity by approximately two times the sensitivity obtained without providing the multi-layer optical filter 30.

Figure 28:
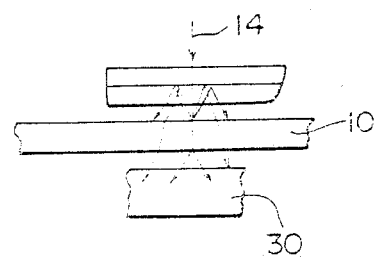
FIG. 28 is a side view showing a modified form of the fifth embodiment.

In the fifth embodiment, though the multi-layer optical filter 30 is disposed to contact the stimulable phosphor sheet 10, the multi-layer optical filter 30 may also be disposed in slightly spaced relation to the stimulable phosphor sheet 10 as shown in FIG. 28. In general, read-out of the radiation image is conducted by moving the stimulable phosphor sheet 10 in the sub-scanning direction. Therefore, when the multi-layer optical filter 30 is disposed in slightly spaced relation to the stimulable phosphor sheet 10, it becomes possible to prevent the stimulable phosphor sheet 10 and the multi-layer optical filter from from wearing.

Also, it is only necessary that the multi-layer optical filter be disposed in the optical path of stimulating rays in the vicinity of the stimulable phosphor sheet. Besides the configuration wherein the multi-layer optical filter is moved relative to the stimulable phosphor sheet as mentioned above, the multi-layer optical filter may be temporarily closely contacted with, for example, the overall scanning region of the stimulable phosphor sheet, and a filter feed means may be disposed in addition to the sub-scanning means for the stimulable phosphor sheet to feed the multi-layer optical filter together with the stimulable phosphor sheet in the sub-scanning direction. In this case, only a single multi-layer optical filter 30 may be provided when the operations of returning the multi-layer optical filter 30 from the stimulable phosphor sheet 10, on which the image read-out has been finished, to the read-out start position and then superposing the multi-layer optical filter 30 on the next sheet 1 sent to the image read-out step is repeated.

Sixth, seventh, and eighth embodiments of the radiation image read-out apparatus in accordance with the present invention, wherein the multi-layer optical filter whose reflectivity with respect to stimulating rays increases as the angle of incidence of stimulating rays increases is applied to the aforesaid built-in type apparatus I, will hereinbelow be described.

Figure 30:
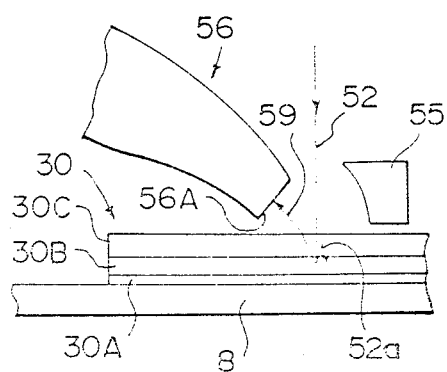
FIG. 30 is an enlarged side view showing the major part of the sixth embodiment.
Figure 29:
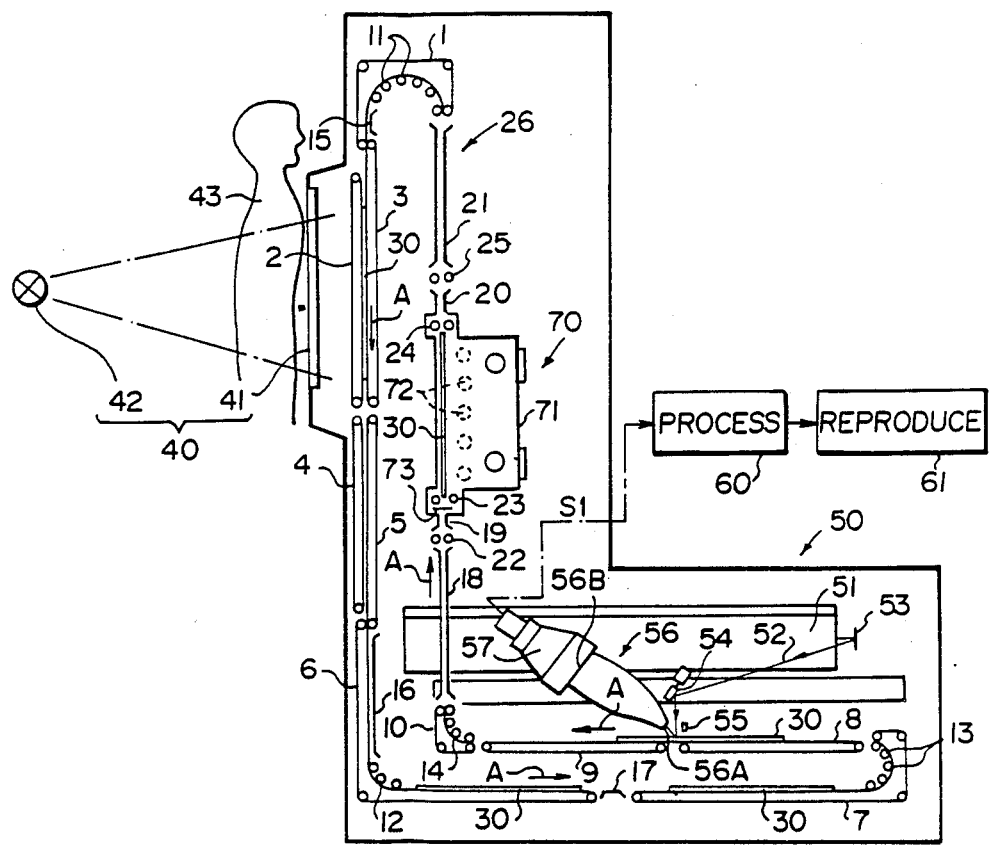
FIG. 29 is a schematic perspective view showing a sixth embodiment of the radiation image read-out apparatus in accordance with the present invention.

FIGS. 29 and 30 show the sixth embodiment of the radiation image read-out apparatus, i.e. the radiation image recording and read-out apparatus, in accordance with the present invention. As shown in FIG. 29, this embodiment is provided with a sheet conveyance circulation path 26 constituted by endless belts 1, 2, 3, 4, 5, 6, 7, 8, 9 and 10, guide rollers 11, 12, 13 and 14 which are rotated respectively by the endless belts 1, 6, 7 and 10, guide plates 15, 16, 17, 18, 19, 20 and 21, and nip rollers 22, 23, 24 and 25. A plurality of (by way of example, five) stimulable phosphor sheets 30, 30, . . . are positioned in spaced relation to each other on the circulation path 26 and are conveyed in the direction as indicated by the arrow A by the endless belts 1 to 10 and nip rollers 22, 23, 24 and 25 as the sheet circulation and conveyance means.

The endless belts 2 and 3 are positioned to vertically hold the stimulable phosphor sheet 30 therebetween. An image recording section 40 is constituted by an image recording stand 41 positioned on the left side of the endless belts 2 and 3, and a radiation source 42, e.g. an X-ray source, spaced from the image recording stand 41 to face the endless belts 2 and 3. When a radiation image of an object 43 is recorded on the sheet 30, the sheet 30 is held between the endless belts 2 and 3 as shown, and the radiation source 42 is activated with the object 43 standing in front of the image recording stand 41. In this manner, the sheet 30 is exposed to a radiation passing through an object 43 to have a radiation image of the object 43 stored on the sheet 30.

An image read-out section 50 is positioned at the lower section of the circulation path 26. At the image read-out section 50, a laser beam source 51 is positioned above the endless belt 8 constituting a part of the image read-out section 50, and a mirror 53 and a galvanometer mirror 54 are disposed for scanning a laser beam 52 emitted by the laser beam source 51 in the width direction of the sheet 30 placed on the endless belt 8. The galvanometer mirror 54 is swung in both ways to scan the laser beam 52 in the main scanning direction on the sheet 30 carrying the radiation image stored thereon. The sheet 30 which has been subjected to image recording at the image recording section 40 is then conveyed by the sheet circulation and conveyance means to the image read-out section 50. A light guiding reflection mirror 55 and a light guide member 56 are disposed along the main scanning line at the scanning portion of the laser beam 52 on the sheet 30. When the sheet 30 is exposed to the laser beam 52, the sheet 30 emits light in proportion to the stored radiation energy. The light emitted by the sheet 30 directly towards the light guide member 56 and the light emitted by the sheet 30 and reflected by the light guiding reflection mirror 55 enter the light guide member 56 from a light input face 56A thereof, and is guided inside of the light guide member 56 through total reflection to a light output face 56B thereof. The light is thus detected by a photomultiplier 57 connected to the light output face 56B of the light guide member 56. Simultaneously with the scanning of the sheet 30 by the laser beam 52 in the main scanning direction, the sheet 30 is moved by the endless belt 8 in the sub-scanning direction as indicated by the arrow A approximately normal to the main scanning direction, so that the radiation image is read out over the whole surface of the sheet 30. The electric image signal S1 generated by the photomultiplier 57 is sent to an image processing circuit 60 for processing the electric image signal S1. The image signal S1 thus processed is then sent to an image reproducing apparatus 61. The image reproducing apparatus 61 may be a display device such as a cathode ray tube (CRT), or a device for recording a visible image by point-by-point scanning on a photographic film. Or, the image signal may be stored on a storage means such as a magnetic tape (not shown).

After image read-out is finished, the stimulable phosphor sheet 30 is conveyed by the endless belts 9 and 10 via the guide plate 18, the nip rollers 22, the guide plate 19 and the nip rollers 23 to an erasing section 70 composed of a case 71 and many erasing light sources 72, 72, . . ., constituted by fluorescent lamps, arranged inside of the case 71. After a shutter 73 is opened, the sheet 30 is conveyed into the case 71 by the nip rollers 23. Thereafter, the shutter 73 is closed, and the erasing light sources 72, 72, . . . are turned on. The erasing light sources 72, 72, . . . mainly emit light having a wavelength within the stimulation wavelength range for the stimulable phosphor constituting the sheet 30. When the sheet 30 is exposed to the erasing light, the radiation energy remaining on the sheet 30 after the image read-out is conducted is released. At this time, since the shutter 73 is closed, no erasing light leaks into the image read-out section 50 and accordingly no noise is generated in the read-out image signal.

After the radiation energy remaining on the stimulable phosphor sheet 30 is erased to such an extent that another image recording on the sheet 30 is possible, the nip rollers 24 are rotated and the sheet 30 is conveyed out of the erasing section 70. Then, the sheet 30 is sent via the guide plate 20 to the nip rollers 25, and then conveyed by the nip rollers 25 along the guide plate 21 onto the endless belt 1 and to the image recording section 40 at which the sheet 30 is reused for image recording.

The image read-out will be described in more detail with reference to FIG. 30 which is an enlarged view showing the major part of the image read-out section 50. As shown in FIG. 30, the stimulable phosphor sheet 30 is composed of a flexible supporting material 30A formed of, for example, carbon-containing PET, a stimulable phosphor layer 30B, and a multi-layer optical filter 30C overlaid on the stimulable phosphor layer 30B. The stimulable phosphor sheet 30 is disposed in the apparatus so that it is exposed to a radiation from the side of the multi-layer optical filter 30C. At the image read-out section 50, the stimulable phosphor sheet 30 is disposed with the multi-layer optical filter 30C facing the laser beam irradiation side, and therefore the laser beam 52 is irradiated onto the stimulable phosphor layer 30B via the multi-layer optical filter 30C.

By way of example, the multi-layer optical filter 30C is of the same type as the short pass filter used in the aforesaid first, second and fourth embodiments, and exhibits the spectral transmittance characteristics as shown in FIG. 3. In this embodiment, as in the embodiments mentioned above, a beam having a wavelength of 633nm emitted by a He-Ne laser is used as the laser beam 52, and the stimulable phosphor layer 30B is of the type emitting the light 15 having a wavelength within the range of 360nm to 420nm (mainly a wavelength of 390nm) when the stimulable phosphor layer 30B is stimulated by said laser beam 52. Dependency of the transmittance of the multi-layer optical filter 30C with respect to the light having a wavelength of 390nm and the light having a wavelength of 633nm on the angle of incidence is as shown in FIG. 8.

As shown in FIG. 30, the laser beam 52 as stimulating rays is made to impinge upon the stimulable phosphor sheet 10 at an angle of incidence near 0°. Therefore, the multi-layer optical filter 30C has the same effects as in the aforesaid first, second and fourth embodiments. Thus, in this embodiment, for the same reasons as mentioned with respect to the first embodiment, the laser beam 52 as stimulating rays is confined between the multi-layer optical filter 30C and the stimulable phosphor layer 30B, and is efficiently utilized for stimulating the stimulable phosphor layer 30B. Experiments conducted by the inventors revealed that, when the efficiency of utilization of stimulating rays is increased in this manner, it is possible to increase the read-out sensitivity by approximately two times the sensitivity obtained without providing the multi-layer optical filter 30C. On the other hand, though the light 59 emitted by the stimulable phosphor sheet 10 impinges upon the multi-layer optical filter 30C at various angles of incidence, the multi-layer optical filter 30C substantially reflects the emitted light 59 regardless of the angle of incidence as mentioned above. Therefore, the emitted light 59 efficiently impinges upon the light guide member 56.

In the sixth embodiment, it is also possible to use a stimulable phosphor sheet comprising the stimulable phosphor layer, and a multi-layer optical filter overlaid on the stimulable phosphor layer and formed as, instead of the short pass filter exhibiting the spectral transmittance characteristics as shown in FIG. 3 and the dependency of the transmittance on the angle of incidence as shown in FIG. 8, a band pass filter exhibiting the spectral transmittance characteristics as shown in FIG. 7 and the dependency of the transmittance on the angle of incidence as shown in FIG. 9.

Also in the sixth embodiment, the multi-layer optical filter formed on the stimulable phosphor sheet should preferably be adjusted so that the stimulating ray transmittance is not lower than 70%, more preferably not lower than 80%, when the angle of incidence of stimulating rays is not larger than 5° (i.e. the stimulating ray reflectivity is not higher than 30%, more preferably not higher than 20% when the angle of incidence of stimulating rays is not larger than 5°), the stimulating ray reflectivity is not lower than 60%, more preferably not lower than 70%, when the angle of incidence of stimulating rays is not smaller than 30°, and the transmittance with respect to the light emitted by the stimulable phosphor sheet is not lower than 60%, more preferably not lower than 80%, when the angle of incidence of the emitted light is within the range of 0° to 40°.

Figure 32:
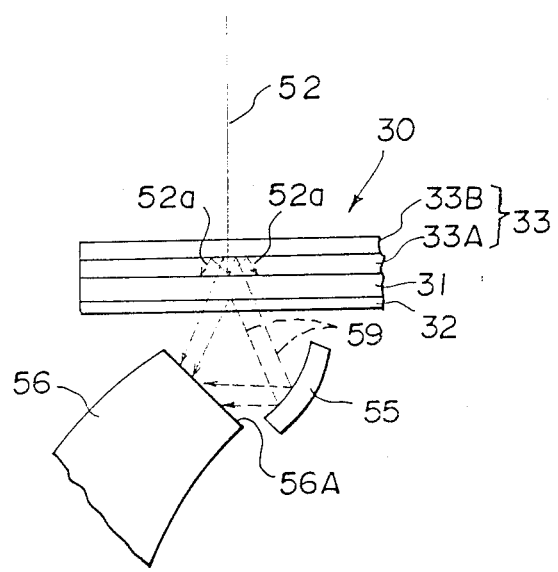
FIG. 32 is an enlarged side view showing the major part of the seventh embodiment.

FIGS. 31 and 32 show the seventh embodiment of the radiation image read-out apparatus, i.e. the radiation image recording and read-out apparatus, in accordance with the present invention. As shown in FIG. 31, in the radiation image recording and read-out apparatus, a circulation path 1 is constituted by a sheet circulation and conveyance means composed of endless belts 2, 3, 4, 5, 6, 7, 8, 9, 10, 11 and 12, guide rollers 13, 14 and 15, guide plates 16, 17, 18, 19 and 20, nip rollers 21, 22, 23 and 24, and a sheet movement means including the endless belt 12 as described later. A plurality of (by way of example, five) stimulable phosphor sheets 30, 30, . . . are positioned in spaced relation to each other on the circulation path 1 and are conveyed in the direction as indicated by the arrow A by the sheet circulation and conveyance means.

The endless belts 2 and 3 are positioned to vertically hold the stimulable phosphor sheet 30 therebetween. An image recording section 40 is constituted by an image recording stand 41 positioned on the left side of the endless belts 2 and 3, and a radiation source 42, e.g. an X-ray source, spaced from the image recording stand 41 to face the endless belts 2 and 3. When a radiation image of an object 453 is recorded on the sheet 30, the sheet 30 is held between the endless belts 2 and 3 as shown, and the radiation source 42 is activated with the object 43 standing in front of the image recording stand 41. In this manner, the sheet 30 is exposed to a radiation passing through an object 43 to have a radiation image of the object 43 stored on the sheet 30.

When image recording is finished at the image recording section 40, the stimulable phosphor sheet 30 is conveyed downwardly by the endless belts 4, 5, 6 and 7. When the rear end portion (i.e. the upper end portion) of the sheet 30 leaves the endless belt 7, the sheet 30 is automatically rotated around its lower end portion as indicated by the broken line in FIG. 31, placed on the endless belt 8, and conveyed in the direction as indicated by the arrow A. The sheet 30 is further conveyed by the endless belt 9 and the guide roller 13 onto a vertically moveable plate 25 disposed at the position as indicated by the broken line in FIG. 31. The vertically moveable plate 25 is then moved up by a drive means (not shown) along a guide member 26 to the position as indicated by the solid line, and makes the sheet 30 contact the guide roller 14. As the guide roller 14 rotates, the sheet 30 is conveyed out of the vertically moveable plate 25 to the image read-out section 50.

At the image read-out section 50, a laser beam source 51 is positioned above the endless belts 10 and 11 constituting a part of the image read-out section 50, and a mirror 53 and a galvanometer mirror 54 are disposed for scanning a laser beam 52 emitted by the laser beam source 51 in the width direction of the sheet 30 placed on the endless belts 10 and 11. The galvanometer mirror 54 is swung in both ways to scan the laser beam 52 in the main scanning direction on the sheet 30 carrying the radiation image stored thereon. A photoelectric read-out means 58 composed of the light guide member 56 and the photomultiplier 57 is disposed at the position below the sheet 30 conveyed to the image read-out section 50 and approximately facing the scanning position of the laser beam 52.

When the sheet 30 is exposed to the laser beam 52, the sheet 30 emits light in proportion to the stored radiation energy. The light emitted by the lower surface side of sheet 30 is photoelectrically detected by the photoelectric read-out means 58. The light guide member 56 is fabricated by forming of a light guiding material such as an acrylic sheet, and has a linear light input face 56A disposed to extend along the beam scanning line on the sheet 30, and a ring shaped light output face 56B closely contacted with the light receiving face of the photomultiplier 57. The light entering the light guide member 56 from its light input face 56A is guided inside of the light guide member 56 through total reflection to the light output face 56B thereof, and detected by the photomultiplier 57. Thus the amount of the light emitted by the sheet 30 and carrying the radiation image information is detected by the photomulplier 57. A light guiding reflection mirror 55 is disposed in the vicinity of the light input face 56A of the light guide member 56, and efficiently reflects the light, which is emitted toward the mirror 55, to the light guide member 56. Simultaneously with the scanning of the sheet 30 by the laser beam 52 in the main scanning direction, the sheet 30 is moved by the endless belts 10 and 11 in the sub-scanning direction as indicated by the arrow A approximately normal to the main scanning direction, so that the radiation image is read out over the whole surface of the sheet 30. The electric image signal S1 generated by the photomultiplier 57 is sent to an image processing circuit 60 for processing the electric image signal S1. The image signal S1 thus processed is then sent to an image reproducing apparatus 61. The image reproducing apparatus 61 may be a display device such as a cathode ray tube (CRT), or a device for recording a visible image by point-by-point scanning on a photographic film. Or, the image signal may be stored on a storage means such as a magnetic tape (not shown).

After image read out is finished, the stimulable phosphor sheet 30 is moved onto the endless belt 12. When the leading end portion of the sheet 30 contacts a stopper 12a disposed at the left end of the endless belt 12, the endless belt 12 is rotated by a motor 12b integrally with the stopper 12a in the direction as indicated by the arrow A. When the endless belt 12 has been rotated by approximately 90°, the sheet 30 is grasped between the guide plate 16 and the endless belt 12, conveyed upward by the endless belt 12 and the roller 15, and sent to the erasing section 70 via the nip rollers 21, the guide plate 17, and the nip rollers 22. The erasing section 70 is composed of a case 71 and many erasing light sources 72, 72, . . . , constituted by fluorescent lamps, arranged inside of the case 71. After a shutter 73 is opened, the sheet 30 is conveyed into the case 71 by the nip rollers 22. Thereafter, the shutter 73 is closed, and the erasing light sources 72, 72, . . . are turned on. The erasing light sources 72, 72, . . . mainly emit light having a wavelength within the stimulation wavelength range for the stimulable phosphor constituting the sheet 30. When the sheet 30 is exposed to the erasing light, the radiation energy remaining on the sheet 30 after the image read-out is conducted is released. At this time, since the shutter 73 is closed, no erasing light leaks into the image read-out section 50 and accordingly no noise is generated in the read-out image signal.

After the radiation energy remaining on the stimulable phosphor sheet 30 is erased to such an extent that another image recording on the sheet 30 is possible, the nip rollers 23 are rotated and the sheet 30 is conveyed out of the erasing section 70. Then, the sheet 30 is sent via the guide plate 18 to the nip rollers 24, conveyed by the nip rollers 24 along the guide plate 19, and grasped by a sheet grasping means 27 which constitutes a part of the sheet movement means and which is disposed at the position as indicated by the broken line above the guide plate 19. The sheet grasping means 27 is moved by a drive means (not shown) in the direction as indicated by the arrow A along a guide member 28, and releases the sheet 30 at the position as indicated by the solid line. The sheet 30 is then conveyed downwardly by the endless bents 2 and 3 to the image recording position, and reused for image recording.

The image read-out in the seventh embodiment will be described in more detail with reference to FIG. 32 which is an enlarged view showing the major part of the image read-out section 50. As shown in FIG. 32, the stimulable phosphor sheet 30 is composed of a transparent supporting material 32, a stimulable phosphor layer 31, and a multi-layer optical filter 33 formed on the whole surface of the stimulable phosphor layer 32 opposite to the surface contacting the supporting material 32. The multi-layer optical filter 33 comprises a transparent glass support 33B, and a multi-layer film 33A formed on the surface of the glass support 33B. The stimulable phosphor sheet 30 is disposed in the apparatus so that the multi-layer optical filter 33 faces the irradiation side of the laser beam 52 at the image read-out section 50. Therefore, at the image read-out section 50, the laser beam 52 impinges upon the stimulable phosphor layer 31 via the multi-layer optical filter 33.

By way of example, the multi-layer optical filter 33 used in the seventh embodiment is of the same type as the band pass filter used in the aforesaid third and fifth embodiments, and exhibits the spectral transmittance characteristics as shown in FIG. 16 when the angle of incidence upon the filter is 0°. In this embodiment, the laser beam 52 is made to impinge upon the multi-layer optical filter 33 in an approximately normal direction, i.e. at an angle of incidence of approximately 0°. Also in this embodiment, a beam having a wavelength of 633nm emitted by a He-Ne laser is used as the laser beam 52, and the stimulable phosphor layer 31 of the stimulable phosphor sheet 30 is of the type emitting the light 59 having a wavelength within the range of 360nm to 420nm (mainly a wavelength of 390nm) when the sheet 30 is stimulated by said laser beam 59. Dependency of the transmittance of the multi-layer optical filter 33 with respect to the light having a wavelength of 390nm and the light having a wavelength of 633nm on the angle of incidence is as shown in FIG. 17.

As mentioned above, the laser beam 52 as stimulating rays is made to impinge upon the stimulable phosphor layer 31 at an angle of incidence near 0°. Therefore, the multi-layer optical filter 33 has the same effects as in the third and fifth embodiments. Thus, in this embodiment, the laser beam 52 as stimulating rays is confined between the multi-layer optical filter 33 and the stimulable phosphor layer 31, and is efficiently utilized for stimulating the stimulable phosphor layer 31. On the other hand, though the light 59 emitted by the stimulable phosphor layer 31 impinges upon the multi-layer optical filter 33 at various angles of incidence, the multi-layer optical filter 33 always reflects nearly 100% of the emitted light 59 regardless of the angle of incidence as shown in FIG. 17. Therefore, as shown in FIG. 32, most of the light 59 emitted toward the multi-layer optical filter 33 is reflected by the multi-layer optical filter 33, and made to enter the light guide member 56 disposed below the stimulable phosphor sheet 30 from the light input face 56A. With this embodiment, since the stimulable phosphor sheet 30 provided with said multi-layer optical filter 33 is used, it is possible to increase the amount of the light emitted by the stimulable phosphor sheet by efficiently utilizing the laser beam as stimulating rays, and to efficiently detect the emitted light, thereby markedly increasing the sensitivity of the read-out apparatus as compared with the conventional apparatus.

The multi-layer optical filter used in the seventh embodiment exhibits such very preferable characteristics that it reflects nearly 100% of the light emitted by the stimulable phosphor sheet and impinging upon the multi-layer optical filter and transmits approximately 90% of stimulating rays when the angle of incidence of stimulating rays is 0°. In general, as in the third and fifth embodiments, the desirable effects of increasing the sensitivity can be achieved in the case where the stimulating ray transmittance is not lower than 70%, more preferably not lower than 80%, when the angle of incidence of stimulating rays is within the range of 0° to 5°, the stimulating ray reflectivity is not lower than 60%, more preferably not lower than 70%, when the angle of incidence of stimulating rays is not smaller than 30°, and the reflectivity with respect to the light emitted by the stimulable phosphor sheet is not lower than 60%, more preferably not lower than 80%. As the support for supporting the multi-layer film, besides the aforesaid glass support, it is also possible to use a transparent plastic material sheet formed of polyethylene terephthalate, polyethylene, polyvinylidene chloride, polyamide, or the like. Also, the supporting material 32 on the stimulable phosphor layer 31 need not necessarily be provided, and the stimulable phosphor sheet 30 may be composed of only the stimulable phosphor layer and the multi-layer optical filter.

Figure 33:
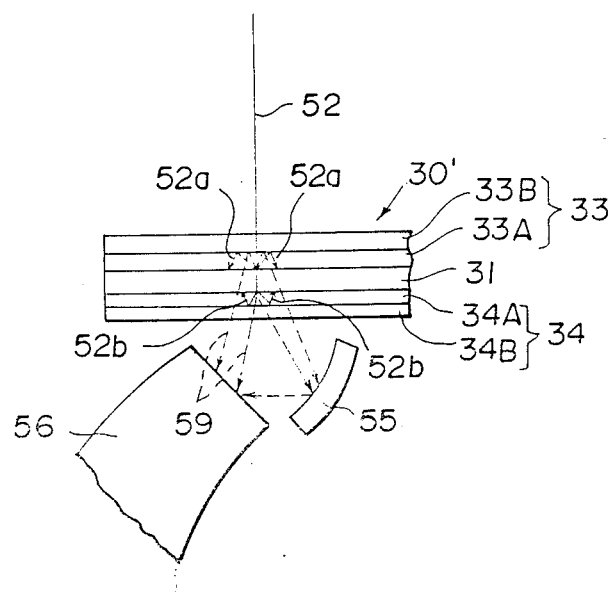
FIG. 33 is an enlarged side view showing the major part of the eighth embodiment.

As mentioned above, a part of the laser beam 52 is reflected by the surface of the stimulable phosphor layer without stimulating it, and another part of the laser beam 52 passes through the stimulable phosphor layer without stimulating it. Therefore, the efficiency of utilization of stimulating rays is caused to become low also by the part of the laser beam 52 passing through the stimulable phosphor layer. A eighth embodiment of the radiation image read-out apparatus in accordance with the present invention, wherein stimulating rays reflected by the surface of the stimulable phosphor layer and stimulating rays passing through the stimulable phosphor layer are utilized efficiently, will hereinbelow be described with reference to FIG. 33. FIG. 33 shows the major part of the read-out section corresponding to FIG. 32 for the seventh embodiment, and the configuration of the apparatus as a whole is common to the configuration shown in FIG. 31.

Figure 34:
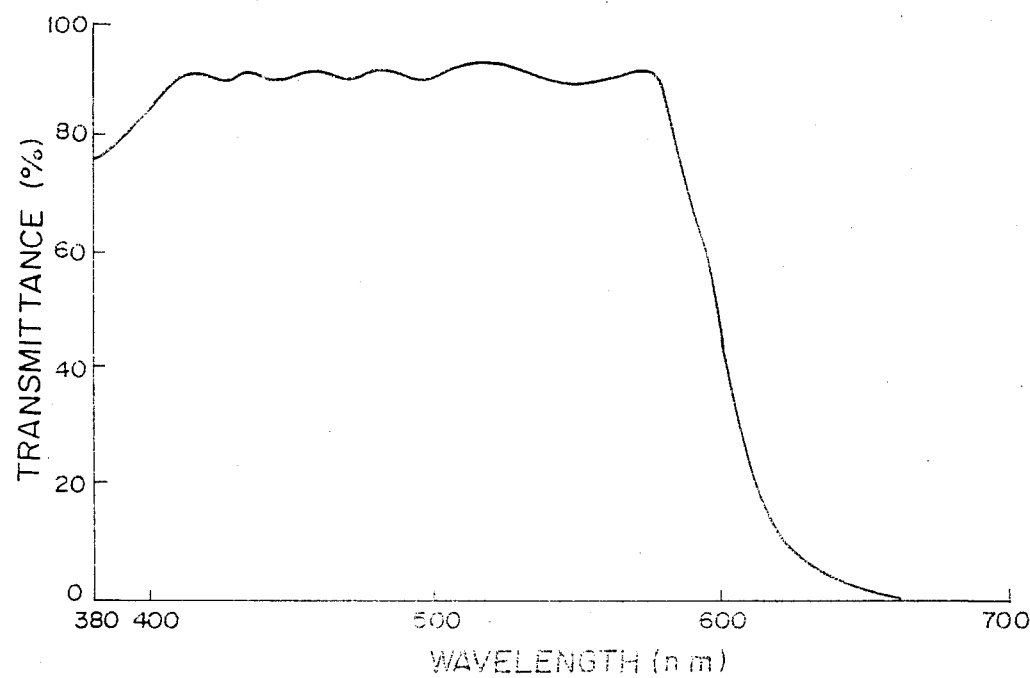
FIG. 34 is a graph showing spectral transmittance characteristics of a second multi-layer optical filter optionally employed in the eighth embodiment.

In the eighth embodiment, a stimulable phosphor sheet 30' comprises a stimulable phosphor layer 31, a multi-layer optical filter (hereinafter referred to as the first multi-layer optical filter) 33 having the same configuration and characteristics as the multi-layer optical filter used in the seventh embodiment and formed on one surface of the stimulable phosphor layer 31, and a second multi-layer optical filter 34 formed on the other surface of the stimulable phosphor layer 31. The stimulable phosphor sheet 30' is disposed so that the first multi-layer optical filter 33 faces the irradiation side of stimulating rays 52, and the second multi-layer optical filter 34 faces the side of the light guide member 56. The second multi-layer optical filter 34 is a dichroic filter exhibiting spectral transmittance characteristics as shown in FIG. 34. As shown in FIG. 33, the second multi-layer optical filter 34 is composed of a glass support 34B, and a multi-layer film 34A formed on the surface of the glass support 34B, and is disposed so that the multi-layer film 34A directly contacts the stimulable phosphor layer 31. The second multi-layer optical filter 34 may be formed by use of the same material and the same method as for the first multi-layer optical filter 33.

The second multi-layer optical filter 34 little absorbs light, and therefore the value calculated by subtracting the transmittance as shown in FIG. 34 from 1 (100%) represents the reflectivity. In this embodiment, since the wavelength of the laser beam 52 is 633nm as mentioned above, the reflectivity of the second multi-layer optical filter 34 with respect to said laser beam 52 is 90%. The transmittance of the second multi-layer optical filter 34 with respect to light having a wavelength within the range of 360nm to 420nm (mainly 390nm) like the light 59 emitted by the stimulable phosphor layer 31 upon stimulation by the laser beam 52 is approximately 80%.

Of the laser beam 52 impinging as stimulating rays upon the stimulable phosphor sheet 30', light 52b passing through the stimulable phosphor layer 31 without stimulating the stimulable phosphor layer 31 is reflected by the second multi-layer optical filter 34 exhibiting the aforesaid characteristics with a high reflectivity toward the stimulable phosphor layer 31, and stimulates the stimulable phosphor layer 31. Thus, since the laser beam 52 is confined between the second multi-layer optical filter 34 and the stimulable phosphor layer 31, the laser beam 52 is efficiently utilized for stimulation of the stimulable phosphor layer 31.

Also the light 59 emitted by the stimulable phosphor layer 31 impinges upon the second multi-layer optical filter 34. However, since the second multi-layer optical filter 34 substantially allows the light 59 to pass therethrough as shown in FIG. 34, the light 59 is efficiently guided by the light guide member 56.

With the eighth embodiment, since the stimulable phosphor sheet provided with the first multi-layer optical filter 33 and the second multi-layer optical filter 34 is used, it is possible to accomplish the same effects as in the seventh embodiment, and to markedly increase the sensitivity of the apparatus by efficiently utilizing the laser beam by use of the second multi-layer optical filter 34 and increasing the amount of light emitted by the stimulable phosphor layer.

Also, since the second multi-layer optical filter 34 is provided, stimulating rays do not pass through the second multi-layer optical filter 34 and only the light emitted by the stimulable phosphor layer passes therethrough and is detected. Therefore, it becomes unnecessary to dispose a special means such as a cut-off filter, which selectively transmits the light emitted by the stimulable phosphor layer to the photomultiplier and cuts off stimulating rays, in front of the photomultiplier.

The second multi-layer optical filter used in the eighth embodiment exhibits such very preferable characteristics that it transmits nearly 80% of the light emitted by the stimulable phosphor layer and impinging upon the multi-layer optical filter and reflects approximately 90% of stimulating rays. In general, the desirable effects of increasing the sensitivity can be achieved in the case where the stimulating ray reflectivity is not lower than 60%, and the transmittance with respect to the light emitted by the stimulable phosphor layer is not lower than 60%. As the support for supporting the multi-layer film 34A, besides the aforesaid glass support, it is also possible to use a transparent plastic material sheet formed of polyethylene terephthalate, polyethylene, polyvinylidene chloride, polyamide, or the like.

The effects of the seventh embodiment using the stimulable phosphor sheet provided with the multi-layer optical filter 33, and the effects of the eighth embodiment using the stimulable phosphor sheet provided with the first multi-layer optical filter 33 and the second multi-layer optical filter 34 will further be illustrated by the following nonlimitative examples.

EXAMPLE OF SEVENTH EMBODIMENT

A dispersion containing a bivalent europium activated barium fluorobromide stimulable phosphor (BaFBr:0.001Eu$^{2+}$) in the dispersed form was prepared by adding methyl ethyl ketone to a mixture of the stimulable phosphor with a linear polyester resin and further adding nitrocellulose of a nitration degree of 11.5%. After adding tricresyl phosphate, n-butanol and methyl ethyl ketone to the dispersion, the mixture was mixed intimately with stirring by use of a propeller mixer to prepare a coating composition containing the stimulable phosphor in the uniformly dispersed form wherein the mixing ratio of the binder to the stimulable phosphor was 1:10 and the viscosity was within the range of 25 to 35PS at 25° C.

A transparent glass plate (supporting material, thickness: 1mm) was placed horizontally, and the coating composition was applied uniformly onto the supporting material. The supporting material provided with a coating film of the coating composition was introduced into a dryer, and the coating film was dried by gradually increasing the temperature inside of the dryer from 25° C to 100° C. In this manner, a stimulable phosphor layer having a film thickness of 250 μm was formed on the supporting material.

On the other hand, a transparent glass plate (glass support, thickness: approximately 1mm) heated to approximately 350° C was introduced into a vacuum vessel, and a multi-layer optical filter (band pass filter) exhibiting the transmittance and reflectivity characteristics as shown in FIGS. 16 and 17 was formed to a total film thickness (total of approximately 20 layers overlaid one upon another) of approximately 2μm on the glass plate by alternately repeating vacuum deposition of TiO$_2$ and SiO$_2$ while controlling the film thickness of each layer. An adhesive was applied to a thickness of approximately 2μm to the filter side of the glass plate provided with the multi-layer optical filter, and the filter side was secured to the stimulable phosphor layer.

The stimulable phosphor sheet thus obtained and composed of the supporting material, the stimulable phosphor layer and the multi-layer optical filter was incorporated in the apparatus as shown in FIG. 31.

EXAMPLE OF EIGHTH EMBODIMENT

The same procedure as in the Example of the eighth embodiment was followed, except that the supporting material used in the Example of eighth embodiment was replaced by a dichroic filter (comprising a multi-layer film on a transparent glass support, trade name "DF-C" supplied by Hoya Garasu K.K.) exhibiting the transmittance and reflectivity characteristics as shown in FIG. 34. In this manner, a stimulable phosphor sheet composed of the first multi-layer optical filter (band pass filter), the stimulable phosphor layer, and the second multi-layer optical filter (dichroic filter) was formed and incorporated into the apparatus as shown in FIG. 31.

COMPARATIVE EXAMPLE

The same procedure as in the Example of the seventh embodiment was followed, except that the multi-layer optical filter was replaced by a transparent polyethylene terephthalate film having a thickness of 12μm. In this manner, a stimulable phosphor sheet composed of the supporting material, the stimulable phosphor layer, and the transparent sheet was formed and incorporated into the apparatus as shown in FIG. 31.

The apparatuses of the Examples of the seventh and eighth embodiments, and the apparatus of the Comparative Example were evaluated by conducting the sensitivity test as described below.

The stimulable phosphor sheet was exposed to X-rays emitted at a tube voltage of 80kVp, and then exposed to a He-Ne laser beam (wavelength: 633nm) to measure the sensitivity.

Table 3 shows the results obtained.

TABLE 3

|  | Relative sensitivity |
|---|---|
| Example (7th embodiment) | 180 |
| Example (8th embodiment) | 250 |
| Comparative Example | 100 |

As clear from Table 3, with the read-out apparatuses of the seventh and eighth embodiments using the stimulable phosphor sheet provided with the multi-layer optical filter on the stimulable phosphor layer in accordance with the present invention, the sensitivity was improved markedly as compared with the conventional read-out apparatus wherein the sheet provided with no multi-layer optical filter is used. Particularly, with the eighth embodiment using the sheet provided with the multi-layer optical filter on both surfaces of the stimulable phosphor layer, it was possible to improve the sensitivity to a very high extent.

It should be understood that, also in the aforesaid third and fifth embodiments wherein the multi-layer optical filter of the type reflecting the light emitted by the stimulable phosphor sheet is used and the emitted light is detected on the side opposite to the stimulating ray irradiation side provided with the multi-layer optical filter with respect to the stimulable phosphor sheet, the second multi-layer optical filter substantially reflecting the stimulating rays and substantially transmitting the light emitted by the stimulable phosphor sheet may be disposed on the emitted light detection side with respect to the sheet as in the eighth embodiment, thereby further improving the sensitivity of the apparatus. In the case where the second multi-layer optical filter is provided, it may be formed on the surface of the stimulable phosphor sheet on the emitted light detection side as in the eighth embodiment, or may be formed independently of the stimulable phosphor sheet and disposed in the vicinity of the sheet.

In the aforesaid sixth, seventh and eighth embodiments wherein the multi-layer optical filter whose reflectivity with respect to stimulating rays increases as the angle of incidence of the stimulating rays increases is applied to the built-in type apparatus I, the multi-layer optical filter is formed on the surface of the stimulable phosphor sheet on the stimulating ray irradiation side. However, the multi-layer optical filter may be formed independently of the stimulable phosphor sheet and disposed in the optical path of the stimulating rays in the vicinity of the stimulable phosphor sheet at the image read-out section. Also, though the multi-layer optical filter (i.e. the second multi-layer optical filter) which substantially reflects stimulating rays and substantially transmits the light emitted by the stimulable phosphor sheet and which is used together with the aforesaid multi-layer optical filter (i.e. the first multi-layer optical filter) is formed on the surface of the stimulable phosphor sheet on the emitted light detection side in the eighth embodiment, the second multi-layer optical filter may be formed independently of the stimulable phosphor sheet and disposed in the vicinity of the sheet on the emitted light detection side with respect to the stimulable phosphor sheet at the image read-out section. Also for the second multi-layer optical filter, the term "disposing a multi-layer optical filter in the vicinity of the emitted light detection side of a stimulable phosphor sheet" embraces the case where the multi-layer optical filter is disposed in contact with the sheet and the case where the multi-layer optical filter is disposed in slightly spaced relation to the sheet.

Ninth to seventeenth embodiments of the radiation image read-out apparatus, i.e. the radiation image recording and read-out apparatus, in accordance with the present invention wherein the multi-layer optical filter whose reflectivity with respect to stimulating rays increases as the angle of incidence of stimulating rays increases is applied to the built-in type apparatus II will be described hereinbelow.

Figure 35:
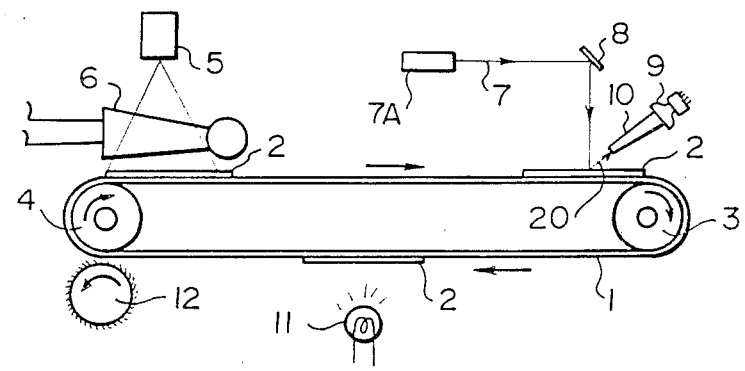
FIG. 35 is a schematic view showing a ninth embodiment of the radiation image read-out apparatus in accordance with the present invention.

FIG. 35 shows the ninth embodiment of the radiation image read-out apparatus in accordance with the present invention. In FIG. 35, and endless conveyor 1, e.g. a belt conveyor or a chain conveyor, is used as the supporting material for supporting the three stimulable phosphor sheets. The stimulable phosphor sheets 2 are fixed in equally spaced relation on the conveyor 1. The conveyor 1 provided with the stimulable phosphor sheets 2 is engaged with a driving roller 3 and a driven roller 4, and moved in the direction as indicated by the arrow by the driving roller 3 which is rotated by a drive unit (not shown). In the vicinity of the driven roller 4 is disposed a radiation source 5 to face the conveyor 1. The radiation source 5 may be an X-ray source or the like, and projects a radiation image of an object 6 positioned between the sheets 2 and the radiation source 5 onto the sheets 2. In the vicinity of the driving roller 3 are disposed a stimulating ray source 7A for emitting stimulating rays 7 such as a laser beam, a light deflector 8 constituted by a galvanometer mirror or the like for deflecting the stimulating rays 7 emitted by the stimulating ray source 7A in the width direction of the conveyor 1, and a photodetector 9 for reading out the light 20 emitted by the sheets 2 upon stimulation thereof by the stimulating rays 7. The photodetector 9 may be constituted by a head-on type photomultiplier, a photoelectric amplification channel plate or the like. The photodetector 9 detects the light 20 emitted by the sheets 2 upon stimulation thereof and guided by a light guide member 10. An erasing light source 11 is disposed facing the conveyor 1 on the side opposite to the radiation source 5, the stimulating ray source 7A and the photodetector 9. The erasing light source 11 emits light having a wavelength within the stimulation wavelength range of the stimulable phosphor sheets 2 irradiated onto the sheets 2 to cause them to release the radiation energy stored thereon. The erasing light source 11 may be constituted by, e.g., a tungsten-filament lamp, a halogen lamp, an infrared lamp, or a laser source as disclosed in U.S. Pat. No. 4,400,619. Since the radiation energy stored on the sheets 2 can also be eliminated by heating them as disclosed in, for example, Japanese Unexamined Patent Publication No. 56(1981)-12599, the erasing light source 11 may be replaced by a heating means. A cylindrical cleaning roller 12 is opposed to the driven roller 4 with the conveyor 1 intervening therebetween. The cleaning roller 12 is rotated counterclockwise in the drawing by a drive unit (not shown), and removes dust from the surfaces of the sheets 2 moving in contact with the cleaning roller 12. If necessary, the cleaning roller 12 may be of an electrostatic attraction type which collects dust and the like by an electrostatic force.

The light guide member 10 may be of a material and a construction as disclosed in U.S. Pat. Nos. 4,346,265 and 4,369,367, U.S. patent application Ser. No. 168,805, and Japanese Unexamined Patent Publication No. 56(1981)-11395, and may be used by the method disclosed therein.

The ninth embodiment shown in FIG. 35 is operated as described below. The conveyor 1 is intermittently moved by the distance corresponding to one-third of the entire circumference thereof at a time by the driving roller 3. The stopping position of the conveyor 1 is adjusted so that one sheet 2 faces the radiation source 5 when the conveyor 1 stops. When the conveyor 1 is stopped, the radiation source 5 is turned on to cause the sheet 2 facing the radiation source 5 to store the radiation image of the object 6. After the radiation image is recorded on the sheet 2, the conveyor 1 is further moved by the distance of one-third the conveyor circumference and stopped. At this time, the sheet 2 carrying the radiation image stored thereon is stopped in the position facing the light deflector 8 and the photodetector 9, and scanned with the stimulating rays 7 emitted by the stimulating ray source 7A. Scanning is conducted in the width direction of the conveyor 1 (main scanning) by the light deflector 8, and also in the length direction of the conveyor 1 (sub-scanning) by the movement of a stage (not shown) carrying the stimulating ray source 7A, the light deflector 8, the photodetector 9 and the light guide member 10 in the length direction of the conveyor 1. The stage can be easily formed by use of a known linear movement mechanism. Upon exposure to the stimulating rays 7, the sheet 2 emits light 20 in proportion to the stored radiation energy. The emitted light 20 enters the photodetector 9 via the light guide member 10, and an electric signal corresponding to the radiation image stored on the sheet 2 is generated by the photodetector 9. After the radiation image is read out in this manner, the conveyor 1 is further moved by the distance of one-third the circumference thereof and stopped. In this condition, the sheet 2 from which the radiation image has been read out is opposed to the erasing light source 11, and exposed to the erasing light emitted thereby to eliminate the radiation energy of the radiation image remaining on the sheet 2 after the read-out step, the radiation emitted by radioactive isotopes such as Ra266 and K40 existing in trace amounts in the stimulable phosphor, and environmental radiations stored in the stimulable phosphor. In this manner, the sheet 2 is recovered to the condition reusable for further image recording. Thereafter, the conveyor 1 is moved by the distance of one third the conveyor circumference until the erased sheet 2 faces the radiation source 5. Midway during this movement, dust on the surface of the sheet 2 is removed by the cleaning roller 12. The sheet 2 free from any radiation energy and dust is reused to record a radiation image at the radiation source 5.

As mentioned above, the stimulable phosphor sheets 2 are circulated and reused through the erasing step conducted by the erasing light source 11 and the cleaning step effected by the cleaning roller 12. One sheet 2 passes through the image recording, image read-out and image erasing steps while the conveyor 1 rotates one turn. It is, of course, possible to simultaneously conduct these three steps for the three sheets 2, respectively, when the conveyor 1 is stopped. In this case, it is possible to improve the image processing speed.

In the ninth embodiment of FIG. 35, since the sheets 2 are fixed on the endless conveyor 1 and reused through the circulation of the conveyor 1, there is no risk of the stimulable phosphor being damaged unlike the method in which independent sheets are conveyed one by one. Further, since the mechanism for circulating the sheets 2 can be formed of a simple conveyor mechanism, the apparatus is easy to design and manufacture. Also, since the three sheets 2 are always used in the predetermined sequence, the quality of the reproduced images does not fluctuate among the sheets 2.

The electric image signal generated by the photodetector 9 may immediately be sent to a reproducing apparatus to reproduce the radiation image as a hard copy or display it on a CRT, or may be digitized and temporarily stored on a high-density recording medium such as a magnetic tape, a magnetic disk or an optical disk to later reproduce the radiation image therefrom. When the apparatus is loaded on a traveling X-ray diagnostic station or the like for obtaining radiation images for medical diagnosis, it is possible to reduce the number of equipment to be loaded on the traveling station by conducting the read-out and storing of the electric image signals on the high-density recording medium at the site of recording and read-out operation, and bringing the recording medium to a medical center or the like for reproducing the radiation images. The electric image signals may also be simultaneously sent to the reproducing apparatus and the recording medium. Namely, when the read-out apparatus is used in a hospital, the electric image signals may be transferred from the recording and read-out station to the recording medium for storage station where the image signals are temporarily stored on a recording medium and, at the same time, they may be transferred to the reproducing apparatus, e.g. a CRT, in the diagnostic room in order to immediately use them for diagnosis.

It is possible and preferable for obtaining a radiation image having an improved image quality, particularly a high diagnostic efficiency and accuracy, to process the electric image signal in order to intensify the image and change the contrast. In the present invention, it is preferable to conduct the frequency processing as disclosed in U.S. Pat. No. 4,315,318, 4,346,295 or 4,387,428, or European Patent Publication No. 31, 952, and/or the gradation processing as disclosed in U.S. Pat. No. 4,302,672, 4,276,473 or 4,310,886.

In the ninth embodiment of FIG. 35, the sub-scanning of the stimulable phosphor sheets 2 is conducted by moving the stimulating ray source and the read-out system with respect to the stationary sheets 2. However, it is also possible to maintain the stimulating ray source and the read-out system stationary, and move the sheets 2 to conduct the sub-scanning. In order to move the sheets 2 for this purpose, it is possible to mount the sheets 2 on the conveyor 1 via a stage, instead of directly fixing them thereon, move the stage on the conveyor 1 when the conveyor 1 is being halted to read out the radiation image, and return the stage to a predetermined position after the read-out is over. Alternatively, the sheets 2 may be directly mounted on the conveyor 1, and the sub-scanning may be conducted by moving the conveyor 1. In the latter case, the distance between the image recording section and the image read out section may be made different from the intervals between the adjacent sheets 2, and after the conveyor 1 has been moved to scan one sheet 2 in the sub-scanning direction, the conveyor 1 may be moved to a position to locate the next sheet 2 at the image recording section. In this case, the image recording and the image read-out are not conducted at the same time. Further, in order to speed up the recording and read-out operation by carrying out the image recording and the image read-out in parallel with each other, it is possible to move the conveyor 1 to scan one sheet 2 in the sub-scanning direction while a radiation image is being recorded on the next sheet 2, which is being moved together with the conveyor 1, by use of the slit exposure method. It is also possible to use several conveyors that can automatically transfer the sheets 2 therebetween, and operate the conveyors in such a manner that the sheets 2 are ultimately circulated via these conveyors. In this case, when the read-out speed is extremely lower than the recording speed, it becomes possible to increase the read-out speed by installing a plurality of image read-out sections for one image recording section, connecting the conveyors branched from the image recording section to the respective image read-out sections, and supplying the sheets 2 to the respective image read-out sections. Further, when the sheets 2 are transferred among a plurality of conveyors as mentioned above, it is possible to connect two conveyors via one stage for temporarily storing the sheets 2. This connection method is convenient since deteriorated stimulable phosphor sheets can be removed from the apparatus or new sheets can be added thereto by use of this stage without stopping the system.

Figure 36:
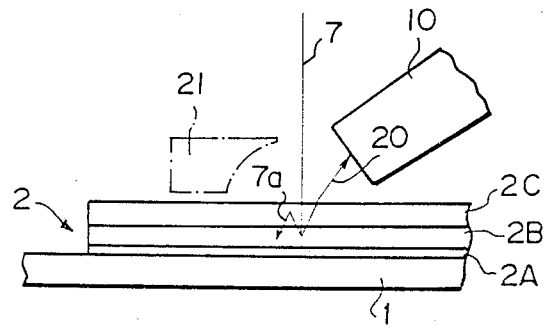
FIG. 36 is an enlarged side view showing the major part of the ninth embodiment.

The image read-out will be described in more detail with reference to FIG. 36 which is an enlarged view showing the major part of the image read-out zone in the ninth embodiment of FIG. 35. As shown in FIG. 36, the stimulable phosphor sheet 2 is composed of a flexible supporting material 2A formed of, for example, carbon-containing PET, a stimulable phosphor layer 2B overlaid on the supporting material 2A, and a multi-layer optical filter 2C overlaid on the stimulable phosphor layer 2B. The stimulable phosphor sheet 2 is fixed on the conveyor 1 so that it is exposed to a radiation from the side of the multi-layer optical filter 2C. At the image read out zone, the stimulable phosphor sheet 2 is disposed with the multi-layer optical filter 2C facing the stimulating ray irradiation side, and therefore the stimulating rays 7 are irradiated onto the stimulable phosphor layer 2B via the multi-layer optical filter 2C. The supporting material 2A need not necessarily be provided, and the stimulable phosphor layer 2B may be directly formed on the conveyor 1.

By way of example, the multi-layer optical filter 2C is of the same type as the short pass filter used in the aforesaid first, second, fourth and sixth embodiments, and exhibits the spectral transmittance characteristics as shown in FIG. 3 . In this embodiment, as in the embodiments mentioned above, a beam having a wavelength of 633nm emitted by a He-Ne laser is used as the stimulating rays 7, and the stimulable phosphor layer 2B is of the type emitting the light 20 having a wavelength within the range of 360nm to 420nm (mainly a wavelength of 390nm) when the stimulable phosphor layer 2B is stimulated by said stimulating rays 7. Dependency of the transmittance of the multi-layer optical filter 2C with respect to the light having a wavelength of 390nm and the light having a wavelength of 633nm on the angle of incidence is as shown in FIG. 8.

As shown in FIG. 36, the stimulating rays 7 are made to impinge upon the stimulable phosphor sheet 2 at an angle of incidence near 0°. Therefore, the multi-layer optical filter 2C has the same effects as in the aforesaid first, second, fourth and sixth embodiments. Thus, since the multi-layer optical filter 2C is used, the stimulating rays 7 are confined between the multi-layer optical filter 2C and the stimulable phosphor layer 2B, and is efficiently utilized for stimulating the stimulable phosphor layer 2B. Experiments conducted by the inventors revealed that, when the efficiency of utilization of stimulating rays is increased in this manner, it is possible to increase the read-out sensitivity by approximately two times the sensitivity obtained without providing the multi-layer optical filter 2C. On the other hand, though the light 20 emitted by the stimulable phosphor sheet 2 impinges upon the multi-layer optical filter 2C at various angles of incidence, the multi-layer optical filter 2C substantially reflects the emitted light 20 regardless of the angle of incidence as shown in FIGS. 3 and 8. Therefore, the emitted light 20 efficiently impinges upon the light guide member 10. Also, when a mirror 21 for reflecting the light 20, which is emitted to the side opposite to the light guide member 10, towards the light guide member 10 is disposed facing the light guide member 10 with the scanning position of the stimulating rays 7 intervening therebetween, it becomes possible to further increase the efficiency of guiding the light 20.

Also in the ninth embodiment, it is possible to use a stimulable phosphor sheet comprising the stimulable phosphor layer, and a multi-layer optical filter overlaid on the stimulable phosphor layer and formed as a band pass filter exhibiting the spectral transmittance characteristics as shown in FIG. 7 and the dependency of the transmittance on the angle of incidence as shown in FIG. 9.

Also in the ninth embodiment, the multi-layer optical filter formed on the stimulable phosphor sheet should preferably be adjusted so that the stimulating ray transmittance is not lower than 70%, more preferably not lower than 80%, when the angle of incidence of stimulating rays is not larger than 5° (i.e. the stimulating ray reflectivity is not higher than 30%, more preferably not higher than 20% when the angle of incidence of stimulating rays is not larger than 5°), the stimulating ray reflectivity is not lower than 60%, more preferably not lower than 70%, when the angle of incidence of stimulating rays is not smaller than 30°, and the transmittance with respect to the light emitted by the stimulable phosphor sheet is not lower than 60%, more preferably not lower than 80%, when the angle of incidence of the emitted light is within the range of 0° to 40°.

In the ninth embodiment, since the stimulable phosphor sheets 2 are fixed on the conveyor 1 in engagement with the rollers 3 and 4, the sheets 2 must be flexible. However, from the viewpoints of durability of the stimulable phosphor and formation of radiation images of high quality, it is desirable to avoid bending of the sheets. FIGS. 37, 38, 39A and 39B show the tenth to twelfth embodiments in which the stimulable phosphor sheets are fixed on rigid supporting materials formed to circulate the sheets without bending them. Also in these embodiments, each of the stimulable phosphor sheets is provided with a multi-layer optical filter of the same type as in the ninth embodiment.

In the tenth embodiment shown in FIG. 37, four stimulable phosphor sheets 102 provided with the multi-layer optical filter are fixed on the sides of a quadrangular prism-like turret 101. The turret 101 is provided with a shaft 101a on which a rotation member 101b such as a sprocket wheel is fixed. The rotation member 101b receives the driving force of a drive unit 103 via a driving force transfer member 103a formed of a chain or the like. The turret 101 is rotated at 90° intervals in the direction of the arrow by the drive unit 103A. A radiation source 105 is opposed to one side of the turret 101, and a stimulating ray source 107A, a light deflector 108, a photodetector 109 and a light guide member 110 are disposed in the vicinity of the side opposite to the aforesaid side. An erasing light source 111 is disposed facing the side of the turret 101 adjacent to the aforesaid side facing the radiation source 105 on the side upstream of turret rotation from the aforesaid side. The radiation source 105, the stimulating ray source 107A and the other parts disposed around the turret 101 may be of the same types as those used in the ninth embodiment of FIG. 35, and the means for supporting and circulating the sheets employed in the apparatus of FIG. 37 differs from that in FIG. 35. In the same manner as in FIG. 35, when the turret 101 is stopped, the radiation source 105 is turned on to have the sheet 102 store a radiation image of an object 106. After the turret 101 is rotated 90° twice, the sheet 102 carrying the radiation image stored thereon is stopped at the position facing the light deflector 108, the photodetector 109 and the like, and scanned with the stimulating rays 107 emitted by the stimulating ray source 107A to have the sheet 102 emit light upon stimulation thereof. By the effects of the multi-layer optical filter formed on the sheet 102, the stimulating rays 107 are utilized efficiently for stimulation of the sheet 102. The light emitted by the sheet 102 is photoelectrically read out by the photodetector 109, which outputs an electric image signal corresponding to the radiation image. In the tenth embodiment of FIG. 37, since it is difficult to conduct the sub-scanning of the stimulating rays by rotation of the turret 101, the other sub-scanning methods mentioned above are employed. After the radiation image is read out from the sheet 102, the turret 101 is rotated 90° to dispose the sheet 102 at the erasing light source 111, where the radiation energy remaining on the sheet 102 is erased for making it reusable.

In FIG. 37, the stimulable phosphor sheet 102 is free of any process at one of the four stages of the turret 101. The process-free stage is not limited to the position shown in FIG. 37. Accordingly, it is also possible to form the apparatus in which three stimulable phosphor sheets are fixed on a triangular prism-like turret. When it takes a long time to conduct the erasing step, two erasing stages may be provided.

In the tenth embodiment, any number of stimulable phosphor sheets may be fixed on the supporting material, and the erasing zone need not be disposed independently of the zone for conducting the image recording or the image read-out. For example, in the eleventh embodiment shown in FIG. 38, a plate-like supporting material 201 rotatable at 180° intervals around a drive shaft 203 is used, and two stimulable phosphor sheets 202a and 202b are mounted on both sides of the supporting material 201. A radiation source 205 is opposed to the sheet 202a, while a stimulating ray source 207A, a light deflector 208, a photodetector 209, a light guide member 210, and an erasing light source 211 are opposed to the sheet 202b. The supporting material 201 is rotated at 180° intervals via the drive shaft 203, and the image recording and the image read-out are repeated for the sheets 202a and 202b. The erasing light source 211 is turned off when the image read-out is conducted, and is turned on after the image read-out is finished. After the erasing light source 211 is turned off, the supporting material 201 is rotated to move the sheets 202a and 202b. When the plate-like supporting material 201 is used, it is of course possible to fix the stimulable phosphor sheet on only one side thereof. In this case, however, the image recording and read-out speed becomes low since the image recording and the image read-out cannot be conducted simultaneously. In the eleventh and tenth embodiments, a means for cleaning the stimulable phosphor sheets, such as the cleaning roller 12 used in the ninth embodiment, is not provided. However, if necessary, it is possible to use a self-traveling type cleaning roller which moves to clean the surfaces of the stimulable phosphor sheets after the erasing step.

Figure 39A:
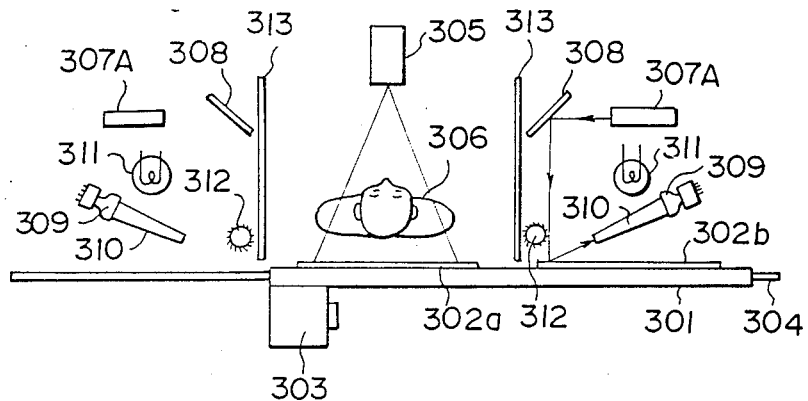
FIGS. 39A and 39B are schematic views showing a twelfth embodiment of the radiation image read-out apparatus in accordance with the present invention.
Figure 39B:
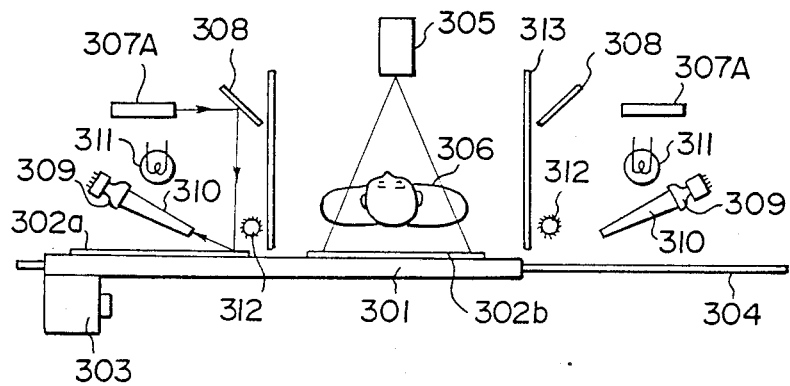

In the just mentioned three embodiments of the built-in type apparatus II, instead of rotating the sheet supporting material as mentioned above, it may be moved in any other manners, for example, may be linearly reciprocated. In the twelfth embodiment shown in FIGS. 39A and 39b, a plate-like supporting material 301 is placed on a rail 304 for reciprocation therealong by use of a drive unit 303 for driving, for example, a pinion gear which is engaged with a rack on the side cf the rail 304 to form a rack-pinion mechanism. Two stimulable phosphor sheets 302a and 302b are fixed on the supporting material 301. A radiation source 305 is disposed on the side facing the center of the rail 304, where the sheet 302a is positioned in the drawing. The image read-out sections comprising a stimulating ray source 307A, a light deflector 308, a photodetector 309 and a light guide member 310 are positioned on both sides of the radiation source 305. Each image read-out section is also provided with an erasing light source 311, and isolated from the radiation source 305 by a light shielding plate 313. Cleaning rollers 312 are disposed in the exteriors of and near to the light shielding plates 313. The supporting material 301 is reciprocated on the rail 304 by the drive unit 303, and alternately positioned as shown in FIGS. 39A and 39B. When the supporting material 301 is set in the position shown in FIG. 39A, a radiation image is recorded on the left sheet 302a, and the image read-out is conducted for the right sheet 302b. The sub-scanning in the image read-out step may be effected by moving the stimulating ray source and the read-out system or by moving the supporting material 301 as mentioned above. After the image read-out is finished, the erasing light source 311 is turned on for a predetermined time to erase the residual radiation energy on the sheet 302b. At this time, since the light emitted by the erasing light source 311 is shielded by the light shielding plate 313, the radiation image stored on the sheet 302a is not adversely affected by the erasing light. After the erasing step for the sheet 302b is finished, the supporting material 301 is moved to left. At this time, the cleaning roller 312 is moved from the retracting position shown in the drawing to the position contacting the sheet 302a, and cleans the surface of the sheet 302b being moved to left. After the sheet 302b has passed through the cleaning roller 312, the cleaning roller 312 is returned to the retracting position. After the supporting material 301 is moved to the position shown in FIG. 39B, the radiation image stored on the left sheet 302a in the condition shown in FIG. 39A is read out, and the image recording is conducted for the erased and cleaned right sheet 302b. Thereafter, the supporting material 301 is returned to the position shown in FIG. 39A while the erasing and cleaning are effected for the left sheet 302a to make it reusable. When it is not necessary to increase the speed of the apparatus, only one stimulable phosphor sheet may be used, and the image recording and the image read-out may be conducted alternately.

In order to obtain a radiation image having an improved image quality, particularly a high diagnostic efficiency and accuracy, it is preferable to investigate the recording condition or the recording pattern of the radiation image stored on the stimulable phosphor sheets before conducting the read-out, and adjust the read-out gain of the photoelectric read out means, the scale factor, and/or the signal processing conditions based on the recording condition or pattern. For this purpose, it has been proposed in, for example, U.S. patent application Ser. No. 434,886 or European patent application Ser. No. 82305530.6, to read out the pattern of the radiation image in advance by use of stimulating rays of low energy (this operation is referred to as the preliminary read-out), and then to adjust the read-out condition and conduct the read-out for obtaining a radiation image for viewing, particularly for diagnostic purposes (this operation is referred to as the final read-out). In the present invention, the preliminary read-out may be conducted by disposing the preliminary read-out section on the side upstream from the aforesaid image read-out section, or by using the aforesaid image read-out section both for preliminary read-out and for final read-out.

In the ninth to twelfth embodiments, at least one stimulable phosphor sheet is fixed on the supporting material. However, it is also possible to use an endless supporting material provided with a stimulable phosphor layer directly formed thereon. For example, the stimulable phosphor layer may be formed on the surface of an endless belt or a rotatable drum. The thirteenth to fifteenth embodiments having such a configuration will be described below with reference to FIGS. 40 to 43.

Figure 40:
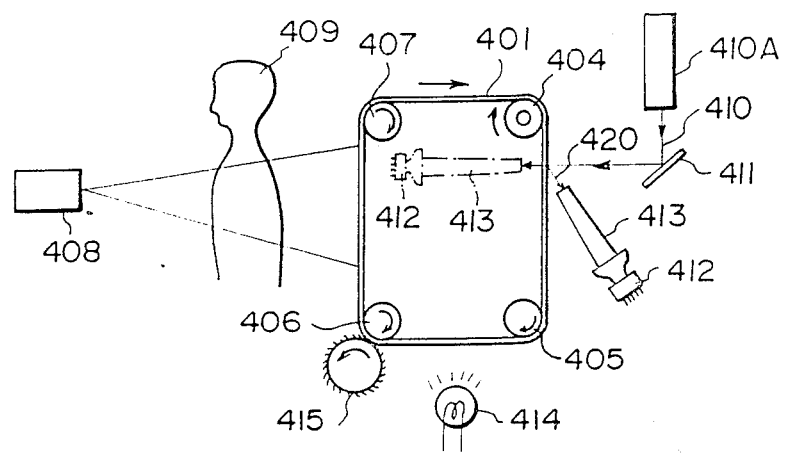
FIG. 40 is a schematic view showing a thirteenth embodiment of the radiation image read-out apparatus in accordance with the present invention.

In FIG. 40 showing the thirteenth embodiment, an endless belt-like recording member 401 is used. The recording member 401 is composed of a flexible endless belt-like supporting material, a stimulable phosphor layer (recording material) overlaid on the surface of the supporting material, and the aforesaid multi-layer optical filter formed on the stimulable phosphor layer. The recording member 401 is applied on a cylindrical driving roller 404 and cylindrical driven rollers 405, 406 and 407, and is moved in the direction as indicated by the arrow by the driving roller 404 which is rotated by a drive unit (not shown). A radiation source 408 is disposed on the side facing the portion of the recording member 401 between the driven rollers 406 and 407. The radiation source 408 may be an X-ray source or the like, and projects a radiation image of an object 409 positioned between the radiation source 408 and the portion of the recording member 401 between the driven rollers 406 and 407 onto the recording member 401. A stimulating ray source 410A for emitting stimulating rays 410 such as a laser beam, a light deflector 411 constituted by a galvanometer mirror or the like for deflecting the stimulating rays 410 emitted by the stimulating ray source 410A in the width direction of the recording member 401, and a photodetector 412 for reading out the light 420 emitted by the stimulable phosphor layer upon stimulation thereof by the stimulating rays 410 are opposed to the portion of the recording member 401 between the driving roller 404 and the driven roller 405. The photodetector 412 may be constituted by a head-on type photomultiplier, a photoelectric amplification channel plate or the like, and photoelectrically detects the light emitted by the stimulable phosphor layer upon stimulation thereof and guided by a light guide member 413. An erasing light source 414 is disposed to face the portion of the recording member 401 between the driven rollers 405 and 406. The erasing light source 414 emits light having a wavelength within the stimulation wavelength range of the stimulable phosphor layer on the to stimulable phosphor layer to cause it to release the radiation energy stored thereon. The erasing light source 414 may be constituted by, e.g., a tungsten-filament lamp, a halogen lamp, an infrared lamp, or a laser source as disclosed in U.S. Pat. No. 4,400,619. Since the radiation energy stored on the stimulable phosphor layer can also be eliminated by heating it as disclosed in, for example, Japanese Unexamined Pat. Publication No. 56(1981)-12599, the erasing light source 414 may be replaced by a heating means. A cylindrical cleaning roller 415 is opposed to the driven roller 406 with the recording member 401 intervening therebetween. The cleaning roller 415 is rotated counterclockwise in the drawing by a drive unit (not shown), and removes dust from the surfaces of the recording member 401 moving in contact with the cleaning roller 415. If necessary, the cleaning roller 415 may be of an electrostatic attraction type.

The light guide member 413 may be of the same type as the light guide member 10 shown in FIG. 35.

The thirteenth embodiment shown is operated as described below. The recording member 401 is intermittently moved by the distance corresponding to one-fourth of the entire circumference thereof at a time by the driving roller 404. When the recording member 401 is stopped, the radiation source 408 is turned on to cause the stimulable phosphor layer of the recording member 401 between the driven rollers 406 and 407 to store the radiation image of the object 409. After the recording member 401 is moved twice by the distance of one-fourth its circumference each time, the portion of the stimulable phosphor layer carrying the radiation image stored thereon is positioned between the driving roller 404 and the driven roller 405, and scanned with the stimulating rays 410 emitted by the stimulating ray source 410A. Scanning is conducted in the width direction of the recording member 401 (main scanning) by the light deflector 411, and also in the length direction of the recording member 401 (sub-scanning) by the movement of a stage (not shown) carrying the stimulating ray source 410A, the light deflector 411, the photodetector 412 and the light guide member 413 in the length direction of the recording member 401. The stage can be easily formed by use of a known linear movement mechanism. Upon exposure to the stimulating rays 410, the stimulable phosphor layer emits light 420 in proportion to the stored radiation energy. The emitted light 420 is received by the photodetector 412 via the light guide member 413, and an electric signal corresponding to the radiation image stored on the stimulable phosphor layer is generated by the photodetector 412. After the radiation image is read out in this manner, the recording member 401 is further moved by the distance of one-fourth the circumference thereof and stopped. In this condition, the portion of the stimulable phosphor layer from which the radiation image has been read out is positioned between the driven rollers 405 and 406, and exposed to the erasing light emitted by the erasing light source 44 to eliminate the radiation energy of the radiation image remaining on the stimulable phosphor layer after the read-out step, the radiation emitted by radioactive isotopes such as Ra266 and K40 existing in trace amounts in the stimulable phosphor, and environmental radiations stored in the stimulable phosphor. In this manner, the stimulable phosphor layer is recovered to the condition reusable for image recording.

Thereafter, the recording member 401 is moved until the erased portion of the stimulable phosphor layer is positioned between the driven rollers 406 and 407. Midway during this movement, dust on the surface of the recording member 401 is removed by the cleaning roller 415. The recording member 401 free from any radiation energy and dust is reused to record a radiation image at the radiation source 408.

As mentioned above the recording member 401 is circulated and reused through the erasing step conducted by the erasing light source 414 and the cleaning step effected by the cleaning roller 415. A portion of the recording member 401 passes through the image recording, image read-out and image erasing steps while the recording member 401 rotates one turn. It is, of course, possible to simultaneously conduct these three steps for the three different portions of the recording member 401, respectively, when the recording member 401 is stopped. In this case, it becomes possible to increase the image processing speed.

In the thirteenth embodiment, since the stimulable phosphor layer is fixed on the endless belt-like supporting material and reused through the circulation of the supporting material, there is no risk of the stimulable phosphor being damaged unlike the method wherein independent stimulable phosphor sheets are conveyed one by one. Further, since the mechanism for circulating the stimulable phosphor can be formed only of a simple endless belt drive mechanism, the apparatus is easy to design and manufacture. Also, since a single recording member 401 is circulated and reused, the quality of the reproduced visible images does not fluctuate.

In the same manner as in the ninth embodiment, the electric image signal generated by the photodetector 412 may immediately sent to a reproducing apparatus to reproduce the radiation image as a hard copy or display it on a CRT, or may be digitized and temporarily stored on a high-density recording medium such as a magnetic tape, a magnetic disk or an optical disk to later reproduce the radiation image therefrom.

In the thirteenth embodiment, the sub-scanning for reading out the radiation image is conducted by moving the stimulating ray source and the read-out system with respect to the recording member 401 when it is being halted. However, it is also possible to maintain the stimulating ray source and the read-out system stationary, and move the recording member 401 to conduct the sub-scanning. For this purpose, the recording member 401 may be moved at the sub-scanning speed after the image recording is over, and the read-out may be carried out during this movement of the recording member 401. It is also possible to conduct the image recording by use of the slit exposure method while the recording member 401 is being moved, thereby to effect the image recording an the image read-out without stopping the recording member 401.

Also, in the thirteenth embodiment, when the supporting material of the recording member 401 is transparent, it is also possible to detect the light emitted by the stimulable phosphor layer on the side opposite to the stimulating ray irradiation side. In this case, as indicated by the chain line in FIG. 40, the photodetector 412 and the light guide member 413 may be disposed on the side opposite to the stimulating ray irradiation side with respect to the recording member 401. Detection of the emitted light on the side opposite to the stimulating ray irradiation side will hereinbelow be described with reference to FIG. 41.

The recording member 401 is composed of a transparent supporting material 401A, a stimulable phosphor layer 401B formed on the supporting material 401A, and a multi-layer optical filter 401C overlaid on the stimulable phosphor layer 401B. The multi-layer optical filter 401C is of the same type as used in the aforesaid third, fifth, seventh and eighth embodiments, and its reflectivity with respect to the stimulating rays 410 increases as the angle of incidence of the stimulating rays 410 increases. The multi-layer optical filter 401C substantially reflects the light 420 emitted by the stimulable phosphor layer 401B regardless of the angle of incidence thereof. Specifically, in the apparatus shown, the light 420 is emitted also toward the stimulating ray irradiation side opposite to the light detection side. When the light 420 emitted toward the side opposite to the detection side is reflected by the multi-layer optical filter 401C, it is possible to increase the efficiency of guiding the emitted light 420. As the multi-layer optical filter 401C satisfying such a requirement, it is possible to use a band pass filter of the same type as used in the third, fifth seventh and eighth embodiments, and exhibiting the spectral transmittance characteristics as shown in FIG. 16 when the angle of incidence upon the filter is 0°. Also in this embodiment, a beam having a wavelength of 633 nm emitted by a He-Ne laser is used as the stimulating rays 410, and the stimulable phosphor layer 401B of the recording member 401 subjected to radiation image read-out is of the type emitting the light 420 having a wavelength within the range of 360 nm to 420 nm (mainly a wavelength of 390 nm) when the stimulable phosphor layer 401B is stimulated by said stimulating rays 410. Dependency of the transmittance of the multi-layer optical filter 401C with respect to the light having a wavelength of 390 nm and the light having a wavelength of 633 nm on the angle of incidence is as shown in FIG. 17.

Figure 41:
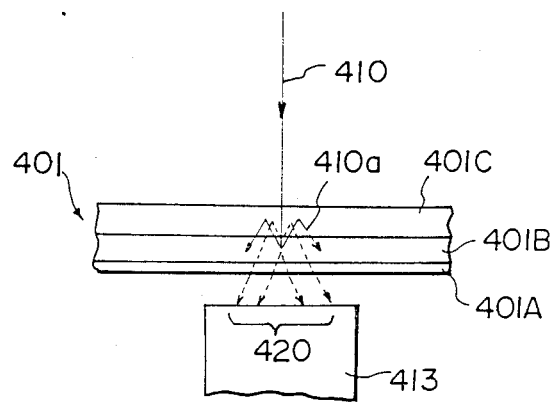
FIG. 41 is an enlarged side view showing the major part of the thirteenth embodiment of FIG. 40.

As mentioned above, the stimulating rays 410 are made to impinge upon the recording member 401 at an angle of incidence near 0°. Therefore, the multi-layer optical filter 401C has the same effects as in the third, fifth, seventh and eighth embodiments. Thus, since the multi-layer optical filter 401C is provided, the stimulating rays 410 are confined between the multi-layer optical filter 401C and the stimulable phosphor layer 401B, and are efficiently utilized for stimulating the stimulable phosphor layer 401B. On the other hand, though the light 420 emitted by the stimulable phosphor layer 401B impinges upon the multi-layer optical filter 401C at various angles of incidence, the multi-layer optical filter 401C always reflects nearly 100% of the emitted light 420 regardless of the angle of incidence as shown in FIG. 17. Therefore, as shown in FIG. 41, most of the light 420 emitted toward the multi-layer optical filter 401C is reflected by the multi-layer optical filter 401C, and made to enter the light guide member 413 disposed below the recording member 401. With this embodiment, since the multi-layer optical filter 401C is used, it is possible to increase the amount of the light emitted by the stimulable phosphor layer by efficiently utilizing the stimulating rays, and to efficiently detect the emitted light, thereby markedly increasing the sensitivity of the read-out apparatus as compared with the conventional apparatus.

Figure 42:
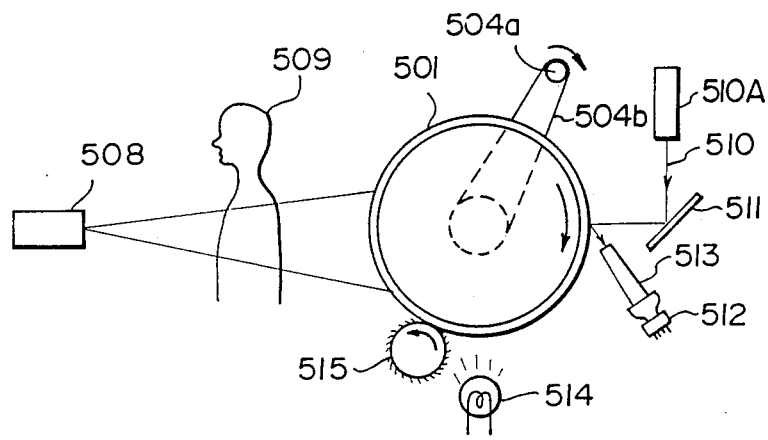
FIG. 42 is a schematic view showing a fourteenth embodiment of the radiation image read-out apparatus in accordance with the present invention.
Figure 43:
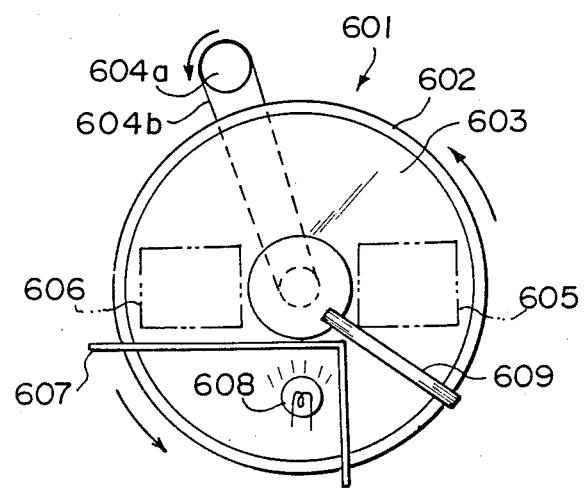
FIG. 43 is a schematic view showing a fifteenth embodiment of the radiation image read-out apparatus in accordance with the present invention.

In the thirteenth embodiment mentioned above, the endless belt-like recording member 401 which is flexible and can be bent freely is used. However, from the viewpoint of durability of the recording material and formation of fine radiation images, it is desirable that the recording material be rigid and is not bent during its use. FIGS. 42 and 43 show the fourteenth and fifteenth embodiments wherein a rigid recording material is used.

In the fourteenth embodiment of FIG. 42, a recording member 501 is composed of a drum-like supporting material, and a stimulable phosphor overlaid on the peripheral surface of the supporting material and provided with the multi-layer optical filter of the same type as in the ninth embodiment. To the recording member 501 is transferred the driving force of a driving shaft 504a of a drive unit (not shown) via a chain 504b, and the recording member 501 is intermittently rotated in the direction as indicated by the arrow. Around the drum-like recording member 501 are disposed a radiation source 508, a stimulating ray source 510A, a light deflector 511, a photodetector 512, a light guide member 513, an erasing light source 514, and a cleaning roller 515, which are of the same types as those employed in the thirteenth embodiment. The embodiment shown in FIG. 42 is similar to that shown in FIG. 40, except that the recording member 501 has a different shape and is driven in the different manner. In the same manner as in FIG. 40, the recording member 501 is exposed to a radiation passing through an object 509 to have a radiation image stored thereon, and scanned with stimulating rays 510 emitted by the stimulating ray source 510A to obtain an electric signal corresponding to the radiation image from the photodetector 512.

In the fifteenth embodiment of FIG. 43, a recording member 601 is composed of a stimulable phosphor layer 603 provided on the side of a disk-like supporting material 602. The recording member 601 is intermittently rotated one-fourth turn at a time in the direction as indicated by the arrow by a driving shaft 604a of a drive unit (not shown) via a chain 604b. Above the stimulable phosphor layer 603 is disposed an image recording zone 605, in which the stimulable phosphor layer 603 is exposed to a radiation passing through an object (not shown) to have a radiation image stored thereon. In the position 180° spaced apart from the image recording zone 605 is disposed an image read-out zone 606 provided with an image read-out system (not shown) comprising a stimulating ray source, a scanning means such as a light deflector, a photodetector and a light guide member of the type as mentioned above. Downstream from the image read-out zone 606 is disposed an erasing light source 608 surrounded by a light shielding member 607. A cleaning roller 609 is disposed downstream of the erasing light source 608 and upstream of the image recording zone 605. Also in the embodiment of FIG. 43, the recording member 601 is circulated and reused while the erasing and cleaning are conducted by use of the erasing light source 608 and the cleaning roller 609. In this fifteenth embodiment, since the stimulable phosphor layer 603 is moved on a plane, the light shielding member 607 is employed to prevent the erasing light emitted by the erasing light source 608 from adversely affecting the image recording zone 605 and the image read-out zone 606. The light shielding member may also be employed in the thirteenth and fourteenth embodiments, if necessary.

In the fifteenth and fourteenth embodiments, since the recording material is formed rigidly and is not bent during operation, it exhibits higher durability, yields a finer visible image, and is easier to manufacture than an endless belt-like recording material.

In the aforesaid thirteenth, fourteenth and fifteenth embodiments, the recording material is intermittently rotated one-fourth turn at a time. However, it is of course possible to rotate the recording material at different intervals. For example, in the embodiment of FIG. 42, the recording material may be provided in a triangular form and intermittently rotated one-third turn each time. Also, it is not always necessary to dispose the erasing zone independently of the image recording zone or the image read-out zone. For example, the erasing light source may be disposed in the interior of the image read-out zone, and used in such a manner that it is turned off during the image read-out operation and turned on after the image read-out is finished. In this case, it is possible to rotate the recording material a half turn at a time. Though it is not always necessary to clean the recording material by use of the cleaning roller, the cleaning is effective to improve the quality of the reproduced radiation image.

In the aforesaid ninth to fifteenth embodiments of the built-in type apparatus II, a plurality of stimulable phosphor sheets or a plurality of portions of a stimulable phosphor layer are sequentially passed through the recording, read-out and erasing steps to sequentially conduct the recording, read-out and erasing for each sheet or each phosphor layer portion. However, it is also possible to first conduct the recording for all sheets or phosphor layer portions, and then collectively carry out the read-out for all radiation images stored thereon, followed by the collective erasing. The erasing may be conducted immediately after reading out each radiation image. This method is useful for continuous radiography, for example, angiography and kymography.

For this purpose, for example, in the ninth embodiment of FIG. 35, the stimulable phosphor sheets 2 may be disposed on the endless belt 1 over the entire circumference thereof in closely and equally spaced relation, and the recording may first be conducted for all sheets 2 by rotating the endless belt 1 one turn (at this time, the read-out system and the erasing system are turned off). In this case, the read-out and the erasing may be conducted during the next rotation of the endless belt 1. Or, in the thirteenth embodiment of FIG. 40, a stacker section may be formed to temporarily store a part of the endless belt-like recording member 401 in the zigzag form after a plurality of radiation images are recorded thereon, and then to send this part to the read-out section to collectively read out the radiation images stored on that part. In FIG. 40, it is of course possible to collectively conduct the recording, read-out and/or erasing as in the modified form of the ninth embodiment. Conversely, the aforesaid stacker section may be provided in the embodiment of FIG. 35. It should be understood that the aforesaid method wherein the recording is collectively conducted, followed by collective read-out/erasing (or collective readout and collecting erasing), can be employed in any of the ninth to fifteenth embodiments mentioned above.

It is also possible to use one recording material fixed on a plate-like supporting material, and repeat the image recording, read-out, and erasing steps for the recording material, as shown in FIGS. 44 to 50.

Figure 44:
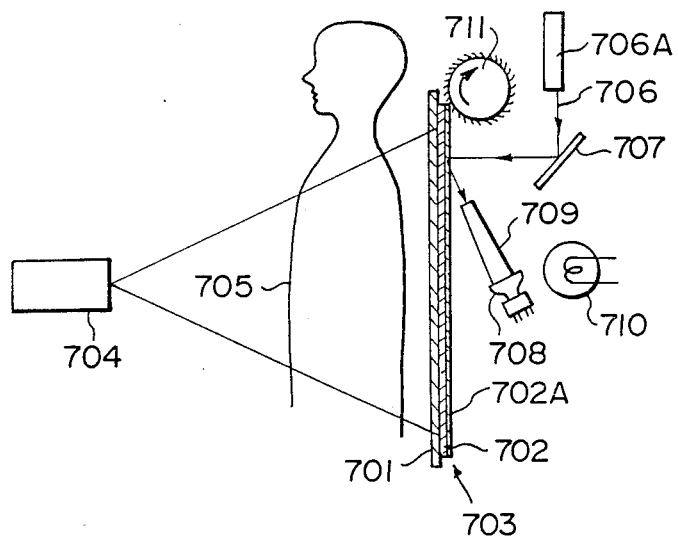
FIG. 44 is a schematic view showing a sixteenth embodiment of the radiation image read-out apparatus in accordance with the present invention.

In FIG. 44 showing the sixteenth embodiment, a recording member 703 is composed of a stationary supporting material 701 which is formed of a plate-like radiation-permeable material, a stimuleable phosphor layer 702 overlaid on the surface of the supporting material 701, and a multi-layer optical filter 702A of the same type as in the ninth embodiment and overlaid on the stimulable phosphor layer 702. A radiation source 704 is opposed to the supporting material 701 of the recording member 703. The radiation source 704 may be an X-ray source or the like, and projects a radiation image of an object 705, which is positioned between the radiation source 704 and the recording member 703, onto the stimulable phosphor 702 through the supporting material 701 to have the radiation image stored on the stimulable phosphor layer 702. On the phosphor layer side of the recording member 703 are positioned a stimulating ray source 706A for emitting stimulating rays 706 such as laser beam, a light deflector 707 constituted by a galvanometer mirror or the like for deflecting the stimulating rays 706 emitted by the stimulating ray source 706A in the width direction of the recording member 703, a photodetector 708 for reading out the light emitted by the stimulable phosphor layer 702 upon stimulation thereof by the stimulating rays 706, and a light guide member 709 for guiding the light emitted by the stimulable phosphor layer 702, which are mounted on a common stage (not shown). The photodetector 708 may be constituted by a head-on type photomultiplier, a photoelectric amplification channel plate or the like, and photoelectrically detects the light emitted by the stimulable phosphor layer 702 and guided by the light guide member 709.

The light guide member 709 may be of the same type as those employed in the aforesaid embodiments. An erasing light source 710 is opposed to the stimulable phosphor layer 702 of the recording member 703, and the aforesaid stage also supports a cylindrical cleaning roller 711 which is rotated in the direction as indicated by the arrow by a drive unit (not shown). The erasing light source 710 emits light having a wavelength within the stimulation wavelength range of the stimulable phosphor layer 702 on the to stimulable phosphor layer 702 to cause it to release the radiation energy stored thereon. The erasing light source 710 may be constituted by, e.g., a tungsten-filament lamp, a halogen lamp, an infrared lamp, or a laser source as disclosed in U.S. Pat. No. 4,400,619. Since the radiation energy stored on the stimulable phosphor layer 702 can also be eliminated by heating it as disclosed in, for example, Japanese Unexamined Patent Publication No. 56(1981)-12599, the erasing light source 710 may be replaced by a heating means. The cleaning roller 711 rotates and moves in contact with the recording member 703 to remove dust from the surface of the stimulable phosphor layer 702. If necessary, the cleaning roller 711 may be of an electrostatic attraction type.

The sixteenth embodiment of FIG. 44 is operated as described below. After the object 705 is positioned between the recording member 703 and the radiation source 704, the radiation source 704 is turned on to cause the stimulable phosphor layer 702 to store the radiation image of the object 705. After the recording of the radiation image is over, the stimulating ray source 706A is activated to scan the stimulable phosphor layer 702 with the stimulating rays 706. Scanning is conducted in the width direction of the recording member 703 (main scanning) by the light deflector 707, and also in the vertical direction of the recording member 703 (sub-scanning) by the downward movement of the stage carrying the stimulating ray source 706A, the light deflector 707, the photodetector 708, the light guide member 709 and the cleaning roller 711. The stage can be easily formed by use of a known linear movement mechanism. Upon exposure to the stimulating rays 706, the stimulable phosphor layer 702 emits light in proportion to the stored radiation energy. Since the multi-layer optical filter 702A is formed on the stimulable phosphor layer 702, the stimulating rays 706 are efficiently utilized for stimulation of the stimulable phosphor layer 702. The emitted light is received by the photodetector 708 via the light guide member 709, and an electric signal corresponding to the radiation image stored on the stimulable phosphor layer 702 is generated by the photodetector 708. When the stage is moved down to conduct the sub-scanning, the cleaning roller 711 mounted on the stage is rotated to clean the surface of the stimulable phosphor layer 702. When the image read-out is finished and the whole surface of the stimulable phosphor layer 702 has been cleaned, the stage is returned to the waiting position above the recording member 703. Then, the erasing light source 710 is activated for a predetermined time, and the stimulable phosphor layer 702 is exposed to the erasing light emitted thereby to eliminate the radiation energy of the radiation image remaining on the stimulable phosphor layer 702 after the read-out step, the radiation emitted by radioactive isotopes such as Ra266 and K40 existing in trace amounts in the stimulable phosphor, and environmental radiations stored in the stimulable phosphor. In this manner, the stimulable phosphor layer 702 is recovered to the condition reusable for image recording. The recording member 703 which is now free from any radiation energy and dust is reused to record a radiation image.

In the sixteenth embodiment of FIG. 44, since the stimulable phosphor is not moved, the mechanism is very simple, and the apparatus can be easily designed and manufactured. Also, since one recording material is used repeatedly, the sheet control is easy and uniform visible images can be obtained.

Figure 45:
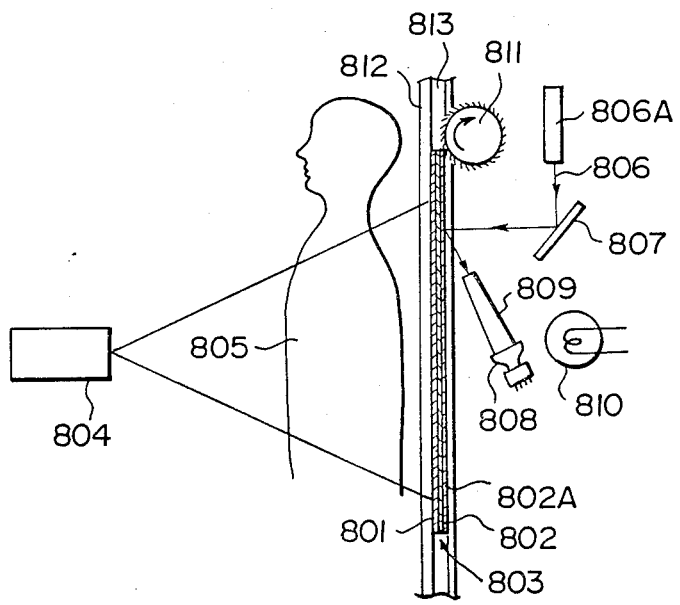
FIG. 45 is a schematic view showing a modified form of the sixteenth embodiment.

FIG. 45 shows a modified form of the sixteenth embodiment, wherein the sub-scanning for reading out the radiation image is conducted by moving the recording material with respect to the stimulating ray source and the image read-out system fixed in the image read-out zone. Like the embodiment of FIG. 44, the embodiment of FIG. 45 employs a recording member 803 composed of a supporting material 801 permeable to a radiation, a stimulable phosphor layer 802 overlaid on the supporting material, and a multi-layer optical filter 802A overlaid on the stimulable phosphor layer 802. Also, this embodiment is provided with a radiation source 804, a stimulating ray source 806A, a light deflector 807, a photodetector 808, a light guide member 809, an erasing light source 810, and a cleaning roller 811, which are of the same types as those employed in FIG. 44. However, the stimulating ray source 806, the light deflector 807, the photodetector 808, and the light guide member 809 are fixed and do not move. The edges of the recording member 803 are fitted to the central grooves 813 of two vertically extending rails 812, and the recording member 803 can be vertically moved along the rails 812 by use of a linear movement mechanism (not shown) such as a rack-pinion mechanism. After the recording member 803 is exposed to a radiation coming from the radiation source 804 through an object 805 to have a radiation image stored thereon, the recording member 803 is scanned with the stimulating rays to read out the radiation image. At this time, the main scanning is conducted by use of the light deflector 807 in the same manner as in FIG. 44, and the sub-scanning is effected by moving up the recording member 803 by use of the linear movement mechanism. As the recording member 803 is moved, the rotating cleaning roller 811 contacts it to remove dust therefrom. After the image read-out is finished and the recording member 803 is returned downward, the erasing light source 810 is turned on to erase the residual radiation image on the recording member 803.

In the embodiment of FIG. 45, the stimulable phosphor is moved to conduct the sub-scanning by moving the plate-like supporting material. The movement mechanism of this type can be formed more easily than a mechanism for conveying the sheet-like phosphors one by one.

In the aforesaid sixteenth embodiment, the stimulable phosphor is provided on the supporting material formed of a radiation-permeable material and disposed on the side of the supporting material opposite to the radiation source. However, this configuration may be changed as desired. For example, the stimulable phosphor may be formed on a supporting material made of a material which is not permeable to a radiation, and may be disposed on the side facing the radiation source. In this case, it is possible to constitute the apparatus so that, after the object moves away from the recording material, the stimulating ray source and the read-out system are moved to the vicinity of the recording material. In the case where the supporting material is permeable to the stimulating rays and the light emitted by the stimulable phosphor, it is possible to dispose the radiation source on the side facing the stimulable phosphor, and dispose the read-out system on the side facing the supporting material.

In the sixteenth embodiment, after the movement of the stimulable phosphor relative to the image read-out section conducted for the sub-scanning is finished for one radiation image, the stimulable phosphor and the image read-out section are returned to the original position with respect to each other, and the sub scanning movement is repeated. The movement for returning them to the original position corresponds to the movement of the stimulable phosphor sheets for passing through the read-out section one after another in the aforesaid ninth to fifteenth embodiments in which many stimulable phosphor sheets are provided on the supporting material.

In the aforesaid sixteenth embodiment, the multi-layer optical filter is formed on the stimulable phosphor layer of the recording member and is integral with the recording member. However, the multi-layer optical filter may be independent from the recording member and disposed in the optical path of the stimulating rays in the vicinity of the recording member. Such an embodiment will be described hereinbelow.

Figure 46:
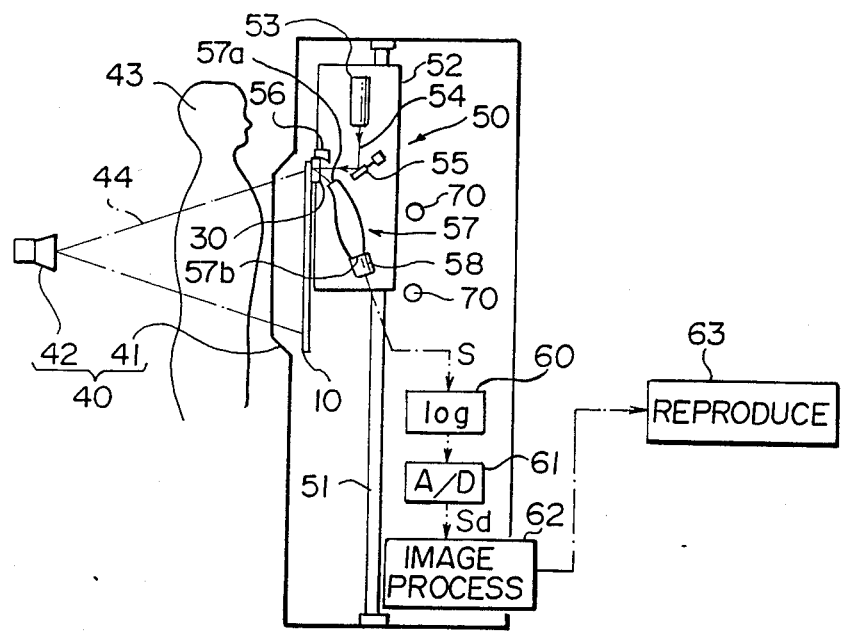
FIG. 46 is a schematic side view showing a seventeenth embodiment of the radiation image read-out apparatus in accordance with the present invention.
Figure 47:
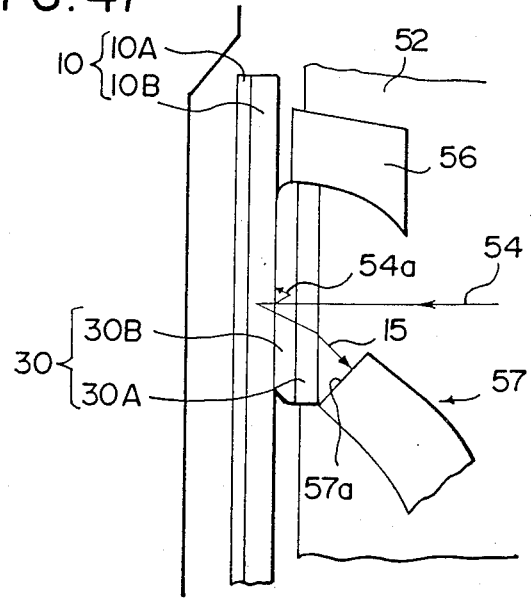
FIG. 47 is an enlarged side view showing the major part of the seventeenth embodiment of FIG. 46, FIGS. 48 and 49 are side views showing modified forms of the seventeenth embodiment.

FIG. 46 shows a seventeenth embodiment of the radiation image read-out apparatus in accordance with the present invention, and FIG. 47 is an enlarged view showing the image read-out section in the seventeenth embodiment. A recording member 10 composed of a plate-like radiation-permeable supporting material 10A, and a stimulable phosphor layer 10B overlaid on the supporting material 10A as shown in FIG. 47 is secured nearly vertically on the rear side of an image recording stand 41. A radiation source 42 constituted by an X-ray tube or the like is disposed on the side opposite to the recording member 10 with respect to the image recording stand 41 to face the image recording stand 41. An image recording section 40 is constituted by the radiation source 42 and the image recording stand 41. As shown in FIG. 46, when a radiation image of an object 43 is to be recorded, the radiation source 42 is activated to emit a radiation 44 with the object 43 standing in front of the image recording stand 41. In this manner, the radiation image of the object 43 is projected onto the recording member 10 and is stored thereon.

A moveable stage 52 vertically moveable along a rail 51 disposed in parallel with the recording member 10 is positioned on the rear side of the recording member 10, i.e. on the side opposite to the image recording stand 41 with respect to the recording member 10. A laser beam source 53 for emitting a laser beam 54, a galvanometer mirror 55 for scanning the laser beam 54 on the recording member 10 in its width (horizontal) direction, a light guiding mirror 56, a light guide member 57, and a photomultiplier 58 coupled as a photoelectric means with the light guide member 57 are mounted on the moveable stage 52 to constitute the image read-out section 50. When the radiation image is to be read out from the recording member 10, the laser beam source 53 is activated to emit the laser beam 54 as stimulating rays, which is deflected by the galvanometer mirror 55 to scan the recording member 10 in the horizontal direction (main scanning). At the same time, the moveable stage 52 is moved by a drive means (not shown) downwardly from the position shown in FIG. 46 along the rail 51, and sub-scanning is conducted thereby. As a result, the recording member 10 is two-dimensionally scanned by the laser beam 54. A multi-layer optical filter 30 is disposed in the optical path of the laser beam 54 in the moveable stage 52, and the laser beam 54 passes through the multi-layer optical filter 30 and impinges upon the recording member 10. As shown in FIG. 47, when the recording member 10 is exposed to the laser beam 54, the exposed portion of the recording member 54 emits light 15 in proportion to the stored radiation energy. The emitted light 15 passes through the multi-layer optical filter 30, is guided by the light guide member 57, and is then photoelectrically detected by the photomultiplier 58. The light guide member 57 is made by forming a light guiding material such as an acrylic plate, and has a linear light input face 57a positioned to extend along the beam scanning line on the recording member 10, and a ring-shaped light output face 57b closely contacted with a light receiving face of the photomultiplier 58. The emitted light 15 entering the light guide member 57 from its light input face 57a is guided through total reflection inside of the light guide member 57, emanates from the light output face 57b, and is received by the photomultiplier 58. In this manner, the amount of the emitted light 15 carrying the radiation image information is detected by the photomultiplier 58. The light guiding mirror 56 is disposed along the main scanning line on the recording member 10 in the vicinity of the surface of the recording member 10. The emitted light 15 advancing to sides other than the light guide member 57 is reflected by the light guiding mirror 56 and is efficiently guided to the light guide member 57.

An analog output signal (read-out image signal) S generated by the photomultiplier 58 is amplified by a logarithmic amplifier 60, and digitized with a predetermined scale factor by an A/D converter 61. A digital read-out image signal Sd thus obtained is sent to an image reproducing apparatus 63 such as a light beam scanning recording apparatus via an image processing device 62, and the radiation image which was stored on the recording member 10 is reproduced as a visible image by the image reproducing apparatus 63.

When the image read-out is finished as mentioned above and the moveable stage 52 moves down away from the recording member 10, the erasing light source 70 disposed to face the recording member 10 is activated. The erasing light source 70 mainly emits light having a wavelength within the stimulation wavelength range for the stimulable phosphor of the recording member 10 to have the recording member 10 release the radiation energy remaining thereon after the image read-out is finished.

After the residual radiation energy on recording member 10 is erased to such an extent that the recording member 10 becomes reusable for image recording, the moveable stage 52 is moved up along the rail 51, and thus returned to the position as shown in FIG. 46 for the next image recording.

By way of example, the multi-layer optical filter 30 is a short pass filter exhibiting the spectral transmittance characteristics as shown in FIG. 3. As shown in FIG. 47, the multi-layer optical filter 30 is composed of a glass support 30A and a multi-layer film 30B formed on the surface of the glass support 30A. In this embodiment, the multi-layer optical filter 30 is disposed so that the multi-layer film 30B directly contacts a stimulable phosphor layer 10B of the recording member 10. Also in this embodiment, a beam having a wavelength of 633 nm emitted by a He-Ne laser is used as the laser beam 54 acting as stimulating rays, and the recording member 10 subjected to image read-out is of the type emitting the light 15 having a wavelength within the range of 360 nm to 420 nm (mainly a wavelength of 390 nm) when the recording member 10 is stimulated by said laser beam 54. Dependency of the transmittance of the multi-layer optical filter 30 with respect to the light having a wavelength of 390 nm and the light having a wavelength of 633 nm on the angle of incidence is shown in FIG. 8.

As shown in FIG. 47, the laser beam 54 as stimulating rays is made to impinge upon the recording member 10 at an angle of incidence near 0°. Therefore, in this embodiment, for the aforesaid reasons, the laser beam 54 as stimulating rays is confined between the multi-layer optical filter 30 and the recording member 10, and is efficiently utilized for stimulating the stimulable phosphor layer 10B. Though also the light 15 emitted by the recording member 10 impinges upon the multi-layer optical filter 30 at various angles of incidence, since the multi-layer optical filter 30 substantially allows the emitted light 15 to pass therethrough regardless of the angle of incidence as mentioned above, the emitted light 15 efficiently impinges upon the light guide member 57.

The effects of the multi-layer optical filter 30 will hereinbelow be described in more detail with reference to nonlimitative examples. Image read-out was conducted with the apparatuses (1) and (2) (comparative examples) and with the apparatuses (3), (4) and (5) (examples in accordance with the present invention) as described below, and the read-out sensitivity was measured in each case in the same manner as mentioned in the aforesaid first embodiment. In the respective comparative examples and the examples in accordance with the present invention, the configuration of the apparatus other than the requirement specified below was the same as the configuration of the apparatus shown in FIG. 46.

(1) An apparatus provided with no multi-layer optical filter 30.

(2) An apparatus wherein only the glass support 30A is disposed in lieu of the multi-layer optical filter 30.

(3) An apparatus wherein the multi-layer optical filter exhibiting the spectral transmittance as shown in FIG. 4 is used in lieu of the multi-layer optical filter 30.

Figure 48:
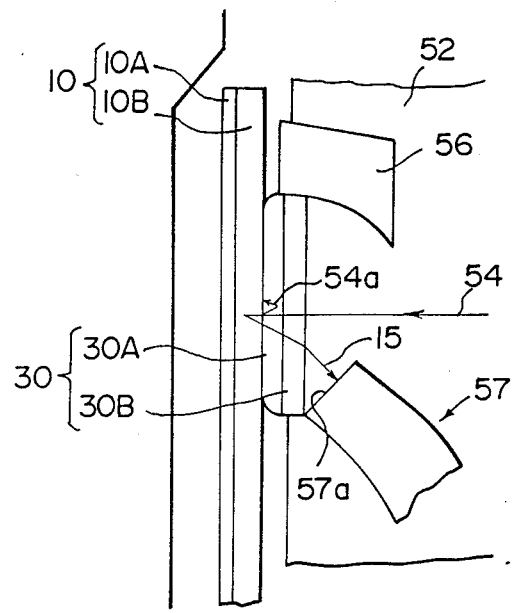

(4) An apparatus as shown in FIG. 48 wherein the same multi-layer optical filter as in (3) is used, and the glass support 30A is disposed on the side of the recording member 10.

(5) An apparatus of the seventeenth embodiment.

The results of the read-out sensitivity measurement for the apparatuses (1) to (5) were respectively almost the same as listed for the apparatuses (1) to (5) in Table 1 shown above. Thus, with the radiation image readout apparatus of the seventeenth embodiment in accordance with the present invention (apparatuses (3), (4) and (5)), it is possible to increase the read-out sensitivity by approximately two times the sensitivity obtained with the conventional apparatus while maintaining the energy of stimulating rays at the same level as in the conventional apparatus. As clear from Table 1, with the seventeenth embodiment of the present invention, the contrast transfer function of the read-out image deteriorates as compared with the conventional apparatus. This will presumably be because stimulating rays scattered on the recording member 10 are utilized for stimulation of the recording member 10, and therefore stimulation is effected with partially blurred stimulating rays. However, as mentioned above, it is possible to improve the contrast transfer function by, for example, making the stimulable phosphor layer 10B of the recording member 10 thin. Also, in the case where the contrast transfer function need not be so much high and a high sensitivity is required, processing for improving the contrast transfer function need not be conducted.

Figure 49:
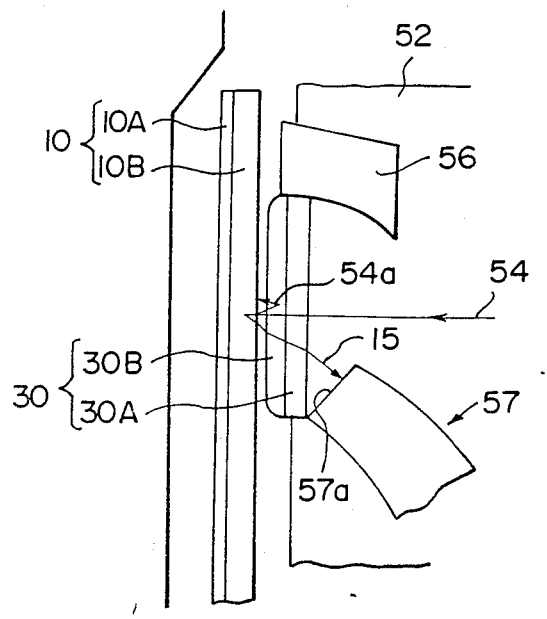

In the seventeen embodiment, though the multi-layer optical filter 30 is disposed to contact the recording member 10, the multi-layer optical filter 30 may also be disposed in slightly spaced relation to the recording member 10 as shown in FIG. 49. When the multi-layer optical filter 30 is disposed in slightly spaced relation to the recording member 10, it becomes possible to prevent the recording member 10 and the multi-layer optical filter 30 from wearing. In the case where the multi-layer optical filter 30 is disposed in this manner, since the contrast transfer function further deteriorates, the aforesaid processing for improving the contrast transfer function should be conducted when necessary.

Though the short pass filter exhibiting the spectral transmittance characteristics as shown in FIG. 3 or in FIG. 4 is used as the multi layer optical filter in the seventeenth embodiment, it is also possible to use, as the multi-layer optical filter, a band pass filter exhibiting the spectral transmittance characteristics as shown in FIG. 7 and the dependency of the transmittance on the angle of incidence as shown in FIG. 9.

Figure 50:
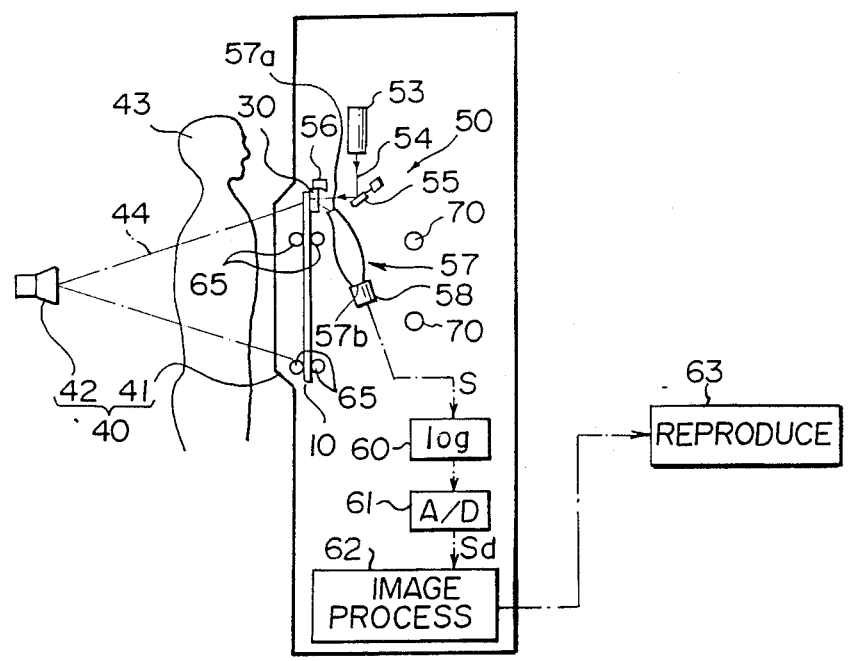
FIG. 50 is a schematic side view showing a further modified form of the sixteenth embodiment.

In the seventeenth embodiment of FIG. 46, the sub-scanning is conducted by maintaining the recording member 10 stationary and moving the read-out system comprising the stimulating ray source (laser beam source 53) and the photoelectric read-out means (photomultiplier 58) with respect to the recording member 10. However, as shown in FIG. 50, it is also possible to move the recording member 10 in the sub-scanning direction by use of a recording member conveyance means constituted by nip rollers 65 or the like for grasping the end portion of the recording member 10. The configuration of FIG. 46 is advantageous in that, in the case where the size of the recording member 10 is large, since no space for the movement of the recording member 10 need be provided, it is possible to make the apparatus small. Also, as the photoelectric read-out means, besides the photomultiplier 58, it is possible to use, for example, a line sensor composed of solid state photoelectric conversion devices as disclosed in Japanese Unexamined Patent Publication No. 60(1985)-230132 or 60(1985)-236354.

In the aforesaid sixteenth and seventeenth embodiments of the built-in type apparatus II, since a single recording member is used repeatedly, the recording member may be replaced by a new one when the image quality of the image reproduced from the recording member becomes low, and it is very easy to conduct quality control. Also, since the multi-layer optical filter and the image read-out section are disposed on the side opposite to the side of radiation emission to the recording member, it is easy to adjust the layout of these means and the auxiliary equipment.

In the aforesaid ninth to seventeenth embodiments, the multi-layer optical filter whose reflectivity with respect to stimulating rays increases as the angle of incidence of stimulating rays increases is applied to the built-in type apparatus II. Also in the ninth to fifteenth embodiments, the multi-layer optical filter may be formed independently of the recording member and disposed in the optical path of stimulating rays in the vicinity of the recording member as in the seventeenth embodiment. In the case where a multi-layer optical filter of the type reflecting the light emitted by the stimulable phosphor layer is used and detection of the emitted light is conducted on the side opposite to the stimulating ray irradiation side on which the multi-layer optical filter is disposed as in the case of FIG. 41, a second multi-layer optical filter substantially reflecting the stimulating rays and substantially transmitting the light emitted by the stimulable phosphor layer may be disposed on the side of detecting the emitted light with respect to the recording member as in the aforesaid eighth embodiment. In this case, it becomes possible to improve the sensitivity of the apparatus to a higher extent. In the case where the second multi-layer optical filter is provided, the filter may be formed on the surface of the recording member on the emitted light detection side, or may be disposed in the vicinity of the recording member independently of the recording member.

We claim:

1. A radiation image read-out apparatus for two-dimensionally scanning a stimulable phosphor sheet, which carries a radiation image stored thereon, with stimulating rays which cause said stimulable phosphor sheet to emit light in proportion to the stored radiation energy, and photoelectrically reading out the light emitted by the scanned portion of said stimulable phosphor sheet by use of a photodetector, wherein the improvement comprises the provision of a first multi-layer optical filter whose reflectively with respect to said stimulating rays increases as the angle of incidence of said stimulating rays upon said multi-layer optical filter increases, said first multi-layer optical filter being disposed in the optical path of said stimulating rays in the vicinity of said stimulable phosphor sheet or formed on the surface of said stimulable phosphor sheet on the stimulating ray irradiation side, and a second multi-layer optical filter substantially reflecting said stimulating rays and substantially transmitting said light emitted by said stimulable phosphor sheet disposed in the vicinity of said stimulable phosphor sheet on the emitted light detection side with respect to said stimulable phosphor sheet, or is formed on the surface of said stimulable phosphor sheet on the emitted light detection side.

2. An apparatus as defined in claim 1 wherein said photodetector is disposed on emitted light detection side with respect to said stimulable phosphor sheet, and said first multi-layer optical filter substantially transmits said light emitted by said stimulable phosphor sheet regardless of the angle of incidence of said emitted light upon said first multi-layer optical filter.

3. An apparatus as defined in claim 2 wherein said first multi-layer optical filter exhibits such characteristics that the stimulating ray transmittance is not lower than 70% when the angle of incidence of said stimulating rays upon said first multi-layer optical filter is within the range of 0° to 5°, the stimulating ray reflectivity is not lower than 60% when the angle of incidence of said stimulating rays upon said first multi-layer optical filter is not smaller than 30°, and the transmittance with respect to said light emitted by said stimulable phosphor sheet is not lower than 60%.

4. An apparatus as defined in claim 3 wherein said first multi-layer optical filter exhibits such characteristics that the stimulating ray transmittance is not lower than 80% when the angle of incidence of said stimulating rays upon said first multi-layer optical filter is within the range of 0° to 5°, the stimulating ray reflectivity is not lower than 70% when the angle of incidence of said stimulating rays upon said first multi-layer optical filter is not smaller than 30°, and the transmittance with respect to said light emitted by said stimulable phosphor sheet is not lower than 80%.

5. An apparatus as defined in claim 1 wherein said photodetector is disposed on the side opposite to the stimulating ray irradiation side with respect to said stimulable phosphor sheet, and said first multi-layer optical filter substantially reflects said light emitted by said stimulable phosphor sheet regardless of the angle of incidence of said emitted light upon said first multi-layer optical filter.

6. An apparatus as defined in claim 5 wherein said first multi-layer optical filter exhibits such characteristics that the stimulating ray transmittance is not lower than 70% when the angle of incidence of said stimulating rays upon said first multi-layer optical filter is within the range of 0° to 5°, the stimulating ray reflectivity is not lower than 60% when the angle of incidence of said stimulating rays upon said first multi-layer optical filter is not smaller than 30°, and the reflectivity with respect to said light emitted by said stimulable phosphor sheet is not lower than 60%.

7. An apparatus as defined in claim 6 wherein said first multi-layer optical filter exhibits such characteristics that the stimulating ray transmittance is not lower than 80% when the angle of incidence of said stimulating rays upon said first multi-layer optical filter is within the range of 0° to 5°, the stimulating ray reflectivity is not lower than 70% when the angle of incidence of said stimulating rays upon said first multi-layer optical filter is not smaller than 30°, and the reflectivity with respect to said light emitted by said stimulable phosphor sheet is not lower than 80%.

8. An apparatus as defined in claim 1 wherein said second multi-layer optical filter exhibits such characteristics that the stimulating ray reflectivity is not lower than 60%, and the transmittance with respect to said light emitted by said stimulable phosphor sheet is not lower than 60%.

9. A radiation image read-out apparatus for two-dimensionally scanning a stimulable phosphor sheet, which carries a radiation image stored thereon, with stimulating rays which cause said stimulable phosphor sheet to emit light in proportion to the stored radiation energy, and photoelectrically reading out the light emitted by the scanned portion of said stimulable phosphor sheet by use of a photodetector, wherein the improvement comprises the provision of a multi-layer optical filter whose reflectivity with respect to said stimulating rays increases as the angle of incidence of said stimulating rays upon said multi-layer optical filter increases, said multi-layer optical filter being disposed in the optical path of said stimulating rays in the vicinity of said stimulable phosphor sheet or formed on the surface of said stimulable phosphor sheet on the stimulating ray irradiation side, and wherein said apparatus is constituted to conduct two-dimensional scanning of said stimulating rays by scanning said stimulable phosphor sheet with said stimulating rays in a main scanning direction and conveying said stimulable phosphor sheet in a sub-scanning direction approximately normal to said main scanning direction, and provided with a filter feed means for feeding said multi-layer optical filter, which is disposed independently of said stimulable phosphor sheet, together with said stimulable phosphor sheet in said sub-scanning direction with said multi-layer optical filter closely contacting said stimulable phosphor sheet at least at the portion wherein said stimulating rays impinge upon said stimulable phosphor sheet.

10. A radiation image read-out apparatus including a stimulating ray source for emitting stimulating rays to a stimulable phosphor sheet carrying a radiation image stored thereon, and a photodetector constituted by a photoelectric conversion device, which is divided into picture elements, and disposed to face said stimulable phosphor sheet, wherein the improvement comprises the provision of a first multi-layer optical filter whose reflectivity with respect to said stimulating rays increases as the angle of incidence of said stimulating rays upon said multi-layer optical filter increases, said first multi-layer optical filter being disposed in the optical path of said stimulating rays in the vicinity of said stimulable phosphor sheet or formed on the surface of said stimulable phosphor sheet on the stimulating ray irradiation side, and a second multi-layer optical filter substantially reflecting said stimulating rays and substantially transmitting said light emitted by said stimulable phosphor sheet disposed in the vicinity of said stimulable phosphor sheet on the emitted light detection side with respect to said stimulable phosphor sheet, or formed on the surface of said stimulable phosphor sheet on the emitted light detection side.

11. An apparatus as defined in claim 10 wherein said photodetector is disposed on the emitted light detection side with respect to said stimulable phosphor sheet, and said first multi-layer optical filter substantially transmits said light emitted by said stimulable phosphor sheet regardless of the angle of incidence of said emitted light upon said first multi-layer optical filter.

12. An apparatus as defined in claim 11 wherein said first multi-layer optical filter exhibits such characteristics that the stimulating ray transmittance is not lower than 70% when the angle of incidence of said stimulating rays upon said first multi-layer optical filter is within the range of 0° to 5°, the stimulating ray reflectivity is not lower than 60% when the angle of incidence of said stimulating rays upon said first multi-layer optical filter is not smaller than 30°, and the transmittance with respect to said light emitted by said stimulable phosphor sheet is not lower than 60%.

13. An apparatus as defined in claim 12 wherein said first multi-layer optical filter exhibits such characteristics that the stimulating ray transmittance is not lower than 80% when the angle of incidence of said stimulating rays upon said first multi-layer optical filter is within the range of 0° to 5°, the stimulating ray reflectivity is not lower than 70% when the angle of incidence of said stimulating rays upon said first multi-layer optical filter is not smaller than 30°, and the transmittance with respect to said light emitted by said stimulable phosphor sheet is not lower than 80%.

14. An apparatus as defined in claim 10 wherein said photodetector is disposed on the side opposite to the stimulating ray irradiation side with respect to said stimulable phosphor sheet, and said first multi-layer optical filter substantially reflects said light emitted by said stimulable phosphor sheet regardless of the angle of incidence of said emitted light upon said first multi-layer optical filter.

15. An apparatus as defined in claim 14 wherein said first multi-layer optical filter exhibits such characteristics that the stimulating ray transmittance is not lower than 70% when the angle of incidence of said stimulating rays upon said first multi-layer optical filter is within the range of 0° to 5°, the stimulating ray reflectivity is not lower than 60% when the angle of incidence of said stimulating rays upon said first multi-layer optical filter is not smaller than 30°, and the reflectivity with respect to said light emitted by said stimulable phosphor sheet is not lower than 60%.

16. An apparatus as defined in claim 15 wherein said first multi-layer optical filter exhibits such characteristics that the stimulating ray transmittance is not lower than 80% when the angle of incidence of said stimulating rays upon said first multi-layer optical filter is within the range of 0° to 5°, the stimulating ray reflectivity is not lower than 70% when the angle of incidence of said stimulating rays upon said first multi-layer optical filter is not smaller than 30°, and the reflectivity with respect to said light emitted by said stimulable phosphor sheet is not lower than 80%.

17. An apparatus as defined in claim 10 wherein said second multi-layer optical filter exhibits such characteristics that the stimulating ray reflectivity is not lower than 60%, and the transmittance with respect to said light emitted by said stimulable phosphor sheet is not lower than 60%.

18. A radiation image recording and read-out apparatus including:
   (i) a circulation and conveyance means for conveying at least one stimulable phosphor sheet for recording a radiation image thereon along a predetermined circulation path,
   (ii) an image recording section positioned on said circulation path for recording a radiation image on said stimulable phosphor sheet by exposing said stimulable phosphor sheet to a radiation carrying image information,
   (iii) an image read-out section positioned on said circulation path and provided with a stimulating ray source for emitting stimulating rays for scanning said stimulable phosphor sheet carrying said radiation image stored thereon at said image recording section, and a photoelectric read-out means for detection or light emitted by said stimulable phosphor sheet scanned by said stimulating rays to obtain an electric image signal, and
   (iv) an erasing section positioned on said circulation path for, prior to the next image recording on said stimulable phosphor sheet for which the image read-out has been conducted at said image read-out section, having said stimulable phosphor sheet release the radiation energy remaining on said stimulable phosphor sheet, wherein the improvement comprises using, as said stimulable phosphor sheet, a sheet composed of a stimulable phosphor layer and a first multi-layer optical filter whose reflectivity with respect to said stimulating rays increases as the angle of incidence of said stimulating rays upon said first multi-layer optical filter increases and which is formed on the surface of said stimulable phosphor layer, said stimulable phosphor sheet being disposed with said first multi-layer optical filter facing the stimulating ray irradiation side at said image read-out section, or disposing said first multi-layer optical filter in the optical path of said stimulating rays in the vicinity of said stimulable phosphor sheet at said image read-out section, and wherein a second multi-layer optical filter substantially reflecting said stimulating rays and substantially transmitting said light emitted by said stimulable phosphor sheet is disposed in the vicinity of said stimulable phosphor sheet on the emitted light detection side with respect to said stimulable phosphor sheet at said image read-out section, or is formed on the surface of said stimulable phosphor sheet on the emitted light detection side.

19. An apparatus as defined in claim 18 wherein said photoelectric read-out means is disposed on the emitted light deflection side with respect to said stimulable phosphor sheet at said image read-out section, and said first multi-layer optical filter substantially transmits said light emitted by said stimulable phosphor sheet regardless of the angle of incidence of said emitted light upon said first multi-layer optical filter.

20. An apparatus as defined in claim 19 wherein said first multi-layer optical filter exhibits such characteristics that the stimulating ray transmittance is not lower than 70% when the angle of incidence of said stimulating rays upon said first multi-layer optical filter is within the range of 0° to 5°, the stimulating ray reflectivity is not lower than 60% when the angle of incidence of said stimulating rays upon said first multi-layer optical filter is not smaller than 30°, and the transmittance with respect to said light emitted by said stimulable phosphor sheet is not lower than 60%.

21. An apparatus as defined in claim 20 wherein said first multi-layer optical filter exhibits such characteristics that the stimulating ray transmittance is not lower than 80% when the angle of incidence of said stimulating rays upon said first multi-layer optical filter is within the range of 0° to 5°, the stimulating ray reflectivity is not lower than 70% when the angle of incidence of said stimulating rays upon said first multi-layer optical filter is not smaller than 30°, and the transmittance with respect to said light emitted by said stimulable phosphor sheet is not lower than 80%.

22. An apparatus as defined in claim 18 wherein said photoelectric read-out means is disposed on the side opposite to the stimulating ray irradiation side with respect to said stimulable phosphor sheet at said image read-out section, and said first multi-layer optical filter substantially reflects said light emitted by said stimulable phosphor sheet regardless of the angle of incidence of said emitted light upon said first multi-layer optical filter.

23. An apparatus as defined in claim 22 wherein said first multi-layer optical filter exhibits such characteristics that the stimulating ray transmittance is not lower than 70% when the angle of incidence of said stimulating rays upon said first multi-layer optical filter is within the range of 0° to 5°, the stimulating ray reflectivity is not lower than 60% when the angle of incidence of said stimulating rays upon said first multi-layer optical filter is not smaller than 30°, and the reflectivity with respect to said light emitted by said stimulable phosphor sheet is not lower than 60%.

24. An apparatus as defined in claim 23 wherein said first multi-layer optical filter exhibits such characteristics that the stimulating ray transmittance is not lower than 80% when the angle of incidence of said stimulating rays upon said first multi-layer optical filter is within the range of 0° to 5°, the stimulating ray reflectivity is not lower than 70% when the angle of incidence of said stimulating rays upon said first multi-layer optical filter is not smaller than 30°, and the reflectivity with respect to said light emitted by said stimulable phosphor sheet is not lower than 80%.

25. An apparatus as defined in claim 18 wherein said second multi-layer optical filter exhibits such characteristics that the stimulating ray reflectivity is not lower than 60%, and the transmittance with respect to said light emitted by said stimulable phosphor sheet is not lower than 60%.

26. A radiation image recording and read-out apparatus including:
  (a) a supporting material,
  (b) at least one recording material fixed on said supporting material and comprised of a stimulable phosphor layer capable of storing a radiation image,
  (c) an image recording section for exposing said recording material to a radiation passing through an object to have a radiation image of the object stored on said recording material,
  (d) an image read-out section provided with a stimulating ray source for emitting stimulating rays for scanning said recording material carrying said radiation image stored thereon, and a photoelectric read-out means for obtaining an electric image signal by reading out light emitted by said recording material scanned and stimulated with the stimulating rays,
  (e) a means for circulating said recording material on said supporting material with respect to said image read-out section for enabling reuse of said recording material by repeatedly moving said supporting material and said image read-out section with respect to each other, and
  (f) an erasing means for eliminating the radiation energy remaining on said recording material after the radiation image is read out therefrom at said image read-out section,
  wherein the improvement comprises the provisions of a first multi-layer optical filter whose reflectivity with respect to said stimulating rays increases as the angle of incidence of said stimulating rays increases as the angle of incidence of said stimulating rays upon said first multi-layer optical filter increases, and first multi-layer optical filter being formed on the surface of said recording material on the stimulating ray irradiation side, or disposed in the optical path of said stimulating rays in the vicinity of said recording material at said image read-out section, and
  wherein a second multi-layer optical filter substantially reflecting said stimulating rays and substantially transmitting light emitted by said recording material is disposed in the vicinity of said recording material on the emitted light detection side with respect to said recording material at said image read-out section, or is formed on the surface of said recording material on the emitted light detection side.

27. An apparatus as defined in claim 26 wherein said first multi-layer optical filter exhibits such characteristics that the stimulating ray transmittance is not lower than 70% when the angle of incidence of said stimulating rays upon said first multi-layer optical filter is within the range of 0° to 5°, the stimulating ray reflectivity is not lower than 60% when the angle of incidence of said stimulating rays upon said first multi-layer optical filter is not smaller than 30°, and the reflectivity with respect to said light emitted by said stimulable phosphor sheet is not lower than 60%.

28. An apparatus as defined in claim 27 wherein said first multi-layer optical filter exhibits such characteristics that the stimulating ray transmittance is not lower than 80% when the angle of incidence of said stimulating rays upon said first multi-layer optical filter is within the range of 0° to 5°, the stimulating ray reflectivity is not lower than 70% when the angle of incidence of said stimulating rays upon said first multi-layer optical filter is not smaller than 30°, and the transmittance with respect to said light emitted by said recording material is not lower than 80%.

29. An apparatus as defined in claim 26 wherein said stimulating ray source and said photoelectric read-out means at said image read-out section are disposed on the sides opposite to each other with respect to said recording material with said recording material intervening therebetween, and said first multi-layer optical filter substantially reflects said light emitted by said recording material regardless of the angle of incidence of said emitted light upon said first multi-layer optical filter.

30. An apparatus as defined in claim 29 wherein said first multi-layer optical filter exhibits such characteristics that the stimulating ray transmittance is not lower than 70% when the angle of incidence of said stimulating rays upon said first multi-layer optical filter is within the range of 0° to 5°, the stimulating ray reflectivity is not lower than 60% when the angle of incidence of said stimulating rays upon said first multi-layer optical filter is not smaller than 30°, and the reflectivity with respect to said light emitted by said recording material is not lower than 60%.

31. An apparatus as defined in claim 30 wherein said first multi-layer optical filter exhibits such characteristics that the stimulating ray transmittance is not lower than 80% when the angle of incidence of said stimulating rays upon said first multi-layer optical filter is within the range of 0° to 5°, the stimulating ray reflectivity is not lower than 70% when the angle of incidence of said stimulating rays upon said first multi-layer optical filter is not smaller than 30°, and the reflectivity with respect to said light emitted by said recording material is not lower than 80%.

32. An apparatus as defined in claim 26 wherein said second multi-layer optical filter exhibits such characteristics that the stimulating ray reflectivity is not lower than 60%, and the transmittance with respect to said light emitted by said recording material is not lower than 60%.

33. An apparatus as defined in claim 26 wherein said supporting material is an endless supporting material.

34. An apparatus as defined in claim 33 wherein said endless supporting material is an endless belt.

35. An apparatus as defined in claim 33 wherein said endless supporting material is a rotatable drum.

36. An apparatus as defined in any of claims 26-35 wherein said recording material is a stimulable phosphor layer overlaid on said supporting material.

37. An apparatus as defined in any of claims 26-35 wherein said recording material is a stimulable phosphor sheet releasably secured to said supporting material.

38. An apparatus as defined in any of claims 26-35 or further including means for circulating said supporting material between said image recording section and said image read-out section.

39. An apparatus as defined in claim 26 wherein said supporting material is a plate-like supporting material.

40. An apparatus as defined in claim 39 wherein said plate-like supporting material is formed of a radiation-permeable material and maintained stationary with respect to said image read-out section, and said apparatus is constituted so that said image recording section conducts image recording on said recording material from one side of said supporting material, and said image read-out section conducts image read-out from the other side of said supporting material.

41. An apparatus as defined in claim 39, further including means for moving said plate-like supporting material with respect to said image read-out section for conducting scanning with said stimulating rays.

42. A radiation image read-out apparatus for exposing a recording material provided with a stimulable phosphor and carrying a radiation image stored thereon to stimulating rays which cause said recording material to emit light in proportion to the stored radiation energy, and photoelectrically detecting the emitted light to read out said radiation image,
   wherein the improvement comprises the provision of
      a first multi-layer optical filter whose reflectivity with respect to said stimulating rays increases as the angle of incidence of said stimulating rays upon said multi-layer optical filter increases, said first multi-layer optical filter being disposed in the optical path of said stimulating rays in the vicinity of said recording material or formed on the surface of said recording material on the stimulating ray irradiation side, and
      a second multi-layer optical filter substantially reflecting said stimulating rays and substantially transmitting said light emitted by said recording material disposed in the vicinity of said recording material on the emitted light detection side with respect to said recording material, or formed on the surface of said recording material on the emitted light detection side.

43. An apparatus as defined in claim 42 wherein the photoelectric detection of said light emitted by said recording material is conducted from the emitted light detection side with respect to said recording material, and said first multi-layer optical filter substantially transmits said light emitted by said recording material regardless of the angle of incidence of said emitted light upon said first multi-layer optical filter.

44. An apparatus as defined in claim 43 wherein said first multi-layer optical filter exhibits such characteristics that the stimulating ray transmittance is not lower than 70% when the angle of incidence of said stimulating rays upon said first multi-layer optical filter is within the range of 0° to 5°, the stimulating ray reflectivity is not lower than 60% when the angle of incidence of said stimulating rays upon said first multi-layer optical filter is not smaller than 30°, and the transmittance with respect to said light emitted by said recording material is not lower than 60%.

45. An apparatus as defined in claim 44 wherein said first multi-layer optical filter exhibits such characteristics that the stimulating ray transmittance is not lower than 80% when the angle of incidence of said stimulating rays upon said first multi-layer optical filter is within the range of 0° to 5°, the stimulating ray reflectivity is not lower than 70% when the angle of incidence of said stimulating rays upon said first multi-layer optical filter is not smaller than 30°, and the transmittance with respect to said light emitted by said recording material is not lower than 80%.

46. An apparatus as defined in claim 42 wherein the photoelectric detection of said light emitted by said recording material is conducted from the side opposite to the stimulating ray irradiation side with respect to said recording material, and said first multi-layer optical filter substantially reflects said light emitted by said recording material regardless of the angle of incidence of said emitted light upon said first multi-layer optical filter.

47. An apparatus as defined in claim 46 wherein said first multi-layer optical filter exhibits such characteristics that the stimulating ray transmittance is not lower than 70% when the angle of incidence of said stimulating rays upon said first multi-layer optical filter is within the range of 0° to 5°, the stimulating ray reflectivity is not lower than 60% when the angle of incidence of said stimulating rays upon said first multi-layer optical filter is not smaller than 30°, and the reflectivity with respect to said light emitted by said recording material is not lower than 60%.

48. An apparatus as defined in claim 47 wherein said multi-layer optical filter exhibits such characteristics that the stimulating ray transmittance is not lower than 80% when the angle of incidence of said stimulating rays upon said multi-layer optical filter is within the range of 0° to 5°, the stimulating ray reflectivity is not lower than 70% when the angle of incidence of said stimulating rays upon said multi-layer optical filter is not smaller than 30°, and the reflectivity with respect to said light emitted by said recording material is not lower than 80%.

49. An apparatus as defined in claim 42 wherein said second multi-layer optical filter exhibits such characteristics that the stimulating ray reflectivity is not lower than 60%, and the transmittance with respect to said light emitted by said recording material is not lower than 60%.

* * * * *